United States Patent [19]

Kondo et al.

[11] Patent Number: 5,755,994
[45] Date of Patent: May 26, 1998

[54] ESTER DERIVATIVE, LIQUID CRYSTAL COMPOSITION AND LIQUID CRYSTAL DISPLAY ELEMENT

[75] Inventors: Tomoyuki Kondo; Shuichi Matsui; Yasuyuki Koizumi; Koichi Shibata; Yasuhiro Haseba; Norihisa Hachiya; Etsuo Nakagawa; Kazutoshi Miyazawa, all of Ichihara, Japan

[73] Assignee: Chisso Corporation, Osaka-fu, Japan

[21] Appl. No.: 605,776

[22] Filed: Feb. 22, 1996

[30] Foreign Application Priority Data

Feb. 22, 1995 [JP] Japan .................. 7-059822
May 12, 1995 [JP] Japan .................. 7-138625

[51] Int. Cl.$^6$ .......... C09K 19/30; C09K 19/20; C07C 69/76; C07C 41/00
[52] U.S. Cl. .......... 252/299.61; 252/299.63; 252/299.66; 252/299.67; 568/647; 568/650; 558/425; 560/61; 560/65; 560/102; 544/298
[58] Field of Search .......... 252/299.61, 299.66, 252/299.63, 299.67; 568/650, 647; 558/425; 560/61, 65, 102; 544/298

[56] References Cited

U.S. PATENT DOCUMENTS

| | | | |
|---|---|---|---|
| 5,213,710 | 5/1993 | Reiffenrath et al. | 252/299.63 |
| 5,230,829 | 7/1993 | Bartmann et al. | 252/299.63 |
| 5,324,449 | 6/1994 | Kurmeier et al. | 252/299.01 |
| 5,389,292 | 2/1995 | Dorsh et al. | 252/299.61 |
| 5,389,295 | 2/1995 | Wachtler et al. | 252/299.63 |
| 5,397,505 | 3/1995 | Rieger et al. | 252/299.67 |
| 5,560,865 | 10/1996 | Nakagawa et al. | 252/299.01 |

FOREIGN PATENT DOCUMENTS

| | | |
|---|---|---|
| 0155792 | 9/1985 | European Pat. Off. |
| 0171040 | 2/1986 | European Pat. Off. |
| 0456235 | 11/1991 | European Pat. Off. |
| 0708106 | 4/1996 | European Pat. Off. |
| 3729071 | 6/1988 | Germany . |
| 2232156 | 12/1990 | United Kingdom . |
| 2266714 | 11/1993 | United Kingdom . |

OTHER PUBLICATIONS

Chem. ABs. 93:114125, 1980.
Chem Abs. 93: 114158, 1980.
Chem. Abs. 94:46978, 1981.
Chem. Abs 108: 159116, 1988.
Chemical Abstracts 101:110427, 1984.
Chemical Abstracts 101:191383, 1984.

(List continued on next page.)

*Primary Examiner*—C. H. Kelly
*Attorney, Agent, or Firm*—Wenderoth, Lind & Ponack

[57] ABSTRACT

A novel liquid crystalline compound having a large dielectric anisotropy value, a small change in the threshold voltage depending upon temperatures, and an improved solubility in other liquid crystal materials at low temperatures, and a liquid crystal composition containing the compound are provided, which liquid crystalline compound is expressed by the formula (1)

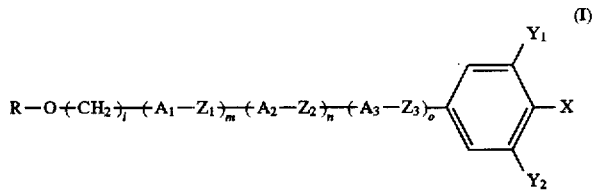

wherein R is H or an alkyl group of 1 to 10C; l is an integer of 1 to 9; m, n and o are each independently 0 or 1; $A_1$, $A_2$ and $A_3$ are each independently trans-1,4-cyclohexylene group, 1,4-phenylene group, one or more H atoms on the ring of which group may be replaced by F, or the like group; $Z_1$, $Z_2$ and $Z_3$ are each independently —COO—, etc., but at least one of them is —COO—; X is $CF_3$, etc.; and $Y_1$, and $Y_2$ are each independently H or F.

17 Claims, 1 Drawing Sheet

OTHER PUBLICATIONS

Chemical Abstracts 118:91088, 1993.
Chemical Abstracts 118:113347, 1993.
Chemical Abstracts 118:202240, 1993.
Chemical Abstracts 97:72114, 1982.
Chemical Abstracts 119:83035, 1993.
Chemical Abstracts 101:210757, 1984.
Chemical Abstracts 101:238500, 1984.

ESTER DERIVATIVE, LIQUID CRYSTAL COMPOSITION AND LIQUID CRYSTAL DISPLAY ELEMENT

BACKGROUND OF THE INVENTION

1. Field of the Invention

This invention relates to a liquid crystalline compound and a liquid crystal composition, and more particularly, it relates to a novel ester compound having a 4-substituted phenyl group, a 3-fluoro-4-substituted phenyl group or a 3,5-difluoro-4-substituted phenyl group, a liquid crystal composition containing the compound, and a liquid crystal display element containing the liquid crystal composition.

2. Description of the Related Art

Display elements using liquid crystalline compounds have been broadly utilized for watch, electric calculator, word processor, etc. These display elements are those utilizing the optical anisotropy, dielectric anisotropy, etc. of liquid crystalline compounds.

Liquid crystal phases include nematic liquid crystal phase, smectic liquid crystal phase and cholesteric liquid crystal phase, and among these, materials utilizing nematic liquid crystal phase have been most broadly used. Further, display modes include dynamic scattering (DS) mode, deformation of vertical aligned phase (DAP) mode, guest-host (GH) mode, twisted nematic (TN) mode, super-twisted nematic (STN) mode, thin-film transistor (TFT) mode, etc.

Liquid crystalline compounds used in these display modes must exhibit liquid crystal phases within a broad temperature range around room temperature, have a sufficient stability under conditions under which display elements are used, and have characteristics sufficient for driving display elements, but at present, a single liquid crystalline compound satisfying these conditions has not yet been found. Thus, it is an actual state that liquid crystal compositions provided with required characteristics have been prepared by blending liquid crystalline compounds of several kinds to several tens of kinds and if necessary, further non-liquid crystalline compounds. It is required for these liquid crystal compositions to be stable to light, heat and air which are usually present under conditions wherein display elements are used, and further to be stable to electric field or electromagnetic irradiation, and still further to be chemically stable to compounds to be blended. Further, it is required for liquid crystal compositions that the values of various physical properties such as optical anisotropy value ($\Delta n$), dielectric anisotropy value ($\Delta \epsilon$), etc. are suitable, depending upon the display mode and the shape of the display element. Further, the respective components in the liquid crystal compositions are important to have a good compatibility with each other.

Among these requirements, there has been increasing a requirement for further reduction in the threshold voltage greatly contributing to a high speed response necessary for making a large picture surface of liquid crystal display elements. A liquid crystalline compound having a large $\Delta \epsilon$ value is necessary therefor. (E. Jakeman et al, Phys. Lett., 39A, 69 (1972)).

Further, in order to make a high picture surface quality possible, a liquid crystalline compound having a small change in the threshold voltage depending upon temperatures is needed.

In order to achieve these objects, compounds of the formulas (a) and (b) are respectively disclosed in Japanese patent application Hyo No. Hei 3-503637 and Japanese patent application laid-open No. Hei 4-279560. Further, compounds disclosed in Japanese patent application laid-open No. Sho 55-40660, Japanese patent application Hyo No. Hei 2-501311, and Japanese patent application Hyo No. Hei 3-500413 are known.

However, these compounds have problems that change in the threshold voltage depending upon temperatures can not be yet regarded as being sufficiently small and further the solubility thereof in liquid crystal compositions at low temperatures is insufficient.

SUMMARY OF THE INVENTION

The object of the present invention is to provide an ester compound which has overcome the above drawbacks of the prior art, and has a particularly large $\Delta \epsilon$, a small change in the driving voltage depending upon temperatures, and an improved solubility in other liquid crystal compositions at low temperatures; a liquid crystal composition containing the above compound; and a liquid crystal display element composed using the liquid crystal composition.

The present invention has the following aspects of items (1) to (13):

(1) A liquid crystalline compound expressed by the formula (1):

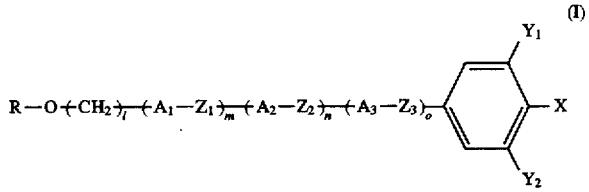

wherein R represents an alkyl group of 1 to 10 carbon atoms; l represents an integer of 1 to 9; m, n and o each independently represent 0 or 1; $A_1$, $A_2$ and $A_3$ each independently represent trans-1,4-cyclohexylene group, 1,4-phenylene group, pyrimidine-2,5-diyl group, pyridine-2,5-diyl group or 1,3-dioxane-2,5-diyl group, one or more hydrogen atoms on the rings of which groups may be replaced by F; $Z_1$, $Z_2$ and $Z_3$ each independently represent —COO—, —(CH$_2$)$_2$— or a covalent bond at least one of which represents —COO—; X represents CN, CF$_3$, CF$_2$H, CFH$_2$, OCF$_3$ or OCF$_2$H; $Y_1$ and $Y_2$ each independently represent H or F, but when X represents CN, $Y_1$ and $Y_2$ both represent F.

(2) A liquid crystalline compound according to item (1), wherein m represents 1; n and o represents 0; $A_1$ represents 1,4-phenylene group, one or more hydrogen atoms on the ring of which group may be replaced by F; and $Z_1$ represents —COO—.

(3) A liquid crystalline compound according to item (1), wherein m and n each represent 1; o represents 0; $A_1$ and $A_2$ each represent 1,4-phenylene group, one or more hydrogen atoms on the ring of which group may be replaced by F; and $Z_1$ represents —COO—.

(4) A liquid crystalline compound according to item (1), wherein m and n each represent 1; o represents 0; $A_1$ represents 1,4-phenylene group, one or more hydrogen atoms on the ring of which group may be replaced by F; $A_2$ represents trans-1,4-cyclohexylene group; and $Z_1$ represents —COO—.

(5) A liquid crystalline compound according to item (1), wherein m and n each represent 1; o represents 0; $A_1$ represents trans-1,4-cyclohexylene group; $A_2$ represents 1,4-phenylene group, one or more hydrogen atoms on the ring of which group may be replaced by F; and $Z_2$ represents —COO—.

(6) A liquid crystalline compound according to item (1), wherein m and n each represent 1; o represents 0; $A_1$ and $A_2$ each represent 1,4-phenylene group, one or more hydrogen atoms on the ring of which group may be replaced by F; and $Z_2$ represents —COO—.

(7) A liquid crystalline compound according to item (1), wherein m and n each represent 1; o represents 0; $A_1$ represents trans-1,4-cyclohexylene; $A_2$ represents 1,4-phenylene group, one or more hydrogen atoms on the ring of which group may be replaced by F; $Z_1$ represents —(CH$_2$)—; and $Z_2$ represents —COO—.

(8) A liquid crystalline compound according to item (1), wherein m, n and o each represent 1; $A_1$ represents trans-1,4-cyclohexylene group; $A_2$ and $A_3$ each represent 1,4-phenylene group, one or more hydrogen atoms on the ring of which group may be replaced by F; $Z_1$ and $Z_3$ each represent a covalent bond; and $Z_2$ represents —COO—.

(9) A liquid crystal composition characterized by containing at least one member of the liquid crystalline compound set forth in either one of items (1) to (8).

(10) A liquid crystal composition characterized by containing as a first component, at least one member of the liquid crystalline compounds set forth in either one of items (1) to (8), and as a second component, at least one member selected from the group consisting of compounds expressed by the following formulas (2), (3) and (4):

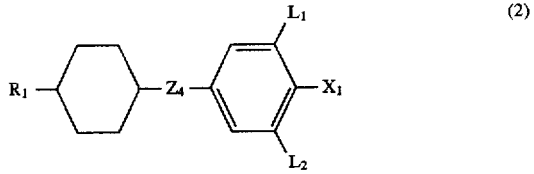

(2)

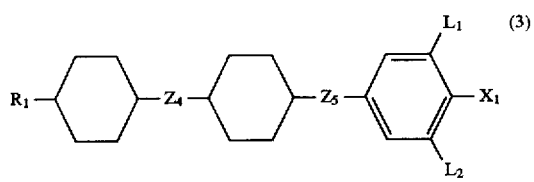

(3)

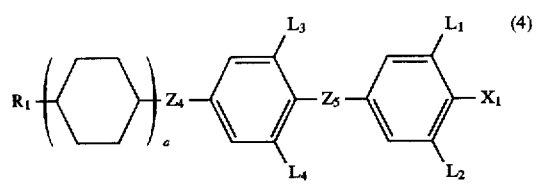

(4)

In these formulas, $R_1$ represents an alkyl group of 1 to 10 carbon atoms; $X_1$ represents F, Cl, OCF$_3$, OCF$_2$H, CF$_3$, CF$_2$H or CFH$_2$; $L_1$, $L_2$, $L_3$ and $L_4$ each independently represent H or F; $Z_4$ and $Z_5$ each independently represent —(CH$_2$)$_2$—, —CH═CH— or a covalent bond; and a represents 1 or 2.

(11) A liquid crystal composition characterized by containing as a first component, at least one member of the liquid crystalline compounds set forth in either one of items (1) to (8), and as a second component, at least one member selected from the group consisting of compounds expressed by the following formulas (5), (6), (7), (8) and (9):

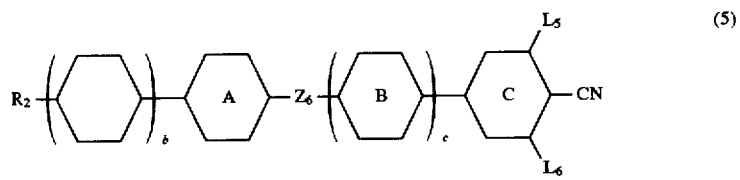

(5)

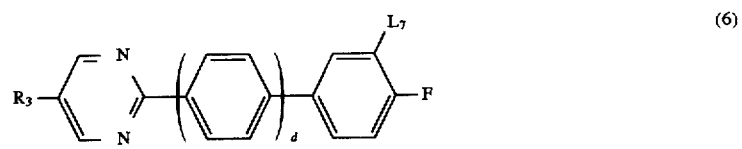

(6)

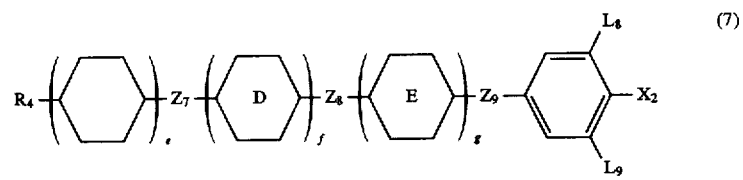

(7)

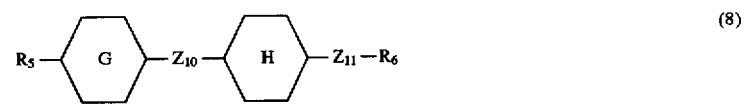

(8)

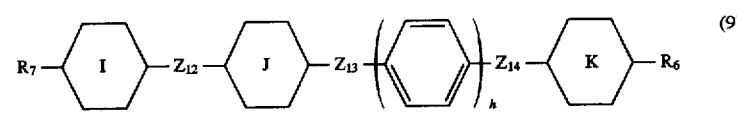

(9)

In the formula (5), $R_2$ represents F, an alkyl group of 1 to 10 carbon atoms or an alkenyl group of 2 to 10 carbon atoms, and an optional methylene group (—CH$_2$—) in the alkyl group or the alkenyl group may be replaced by oxygen atom (—O—), but two or more methylene groups are not successively replaced by oxygen atom; ring A represents trans-1,4-cyclohexylene group, 1,4-phenylene group, pyrimidine-2,5-diyl group or 1,3-dioxane-2,5-diyl group; ring B represents trans-1,4-cyclohexylene group, 1,4-phenylene group or pyrimidine-2,5-diyl group; ring C represent trans-1,4-cyclohexylene group or 1,4-phenylene group; $Z_6$ represents —(CH$_2$)$_2$—, —COO— or a covalent bond; $L_5$ and $L_6$ each independently represent H or F; b and c each independently represent 0 or 1.

In the formula (6), $R_3$ represents an alkyl group of 1 to 10 carbon atoms; $L_7$ represents H or F; and d represents 0 or 1.

In the formula (7), $R_4$ represents an alkyl group of 1 to 10 carbon atoms; rings D and E each independently represent trans-1,4-cyclohexylene group or 1,4-phenylene group; $Z_7$ and $Z_8$ each independently represent —COO— or a covalent bond; $Z_9$ represents —COO— or —C≡C—; $L_8$ and $L_9$ each independently represent H or F; $X_2$ represents F, OCF$_3$, OCF$_2$H, CF$_3$, CF$_2$H or CFH$_2$, but when X2 represents OCF$_3$, OCF$_2$H$_2$, CF$_3$, CF$_2$H or CFH$_2$, $L_8$ and $L_9$ both represent H; and e, f and g each independently represent 0 or 1.

In the formula (8), $R_5$ and $R_6$ each independently represent an alkyl group of 1 to 10 carbon atoms or an alkenyl group of 2 to 10 carbon atoms, and in either of the groups, an optional methylene group (—CH$_2$—) may be replaced by oxygen atom (—O—), but two or more methylene groups are not continuously replaced by oxygen atom; ring G represents trans-1,4-cyclohexylene group, 1,4-phenylene group or pyrimidine-2,5-diyl group; ring H represents trans-1,4-cyclohexylene group or 1,4-phenylene group; $Z_{10}$ represents —C≡C—, —COO—, —(CH$_2$)$_2$—, —CH═CH— C≡C— or a covalent bond; and $Z_{11}$ represents —COO— or a covalent bond.

In the formula (9), $R_7$ and $R_8$ each independently represent an alkyl group of 1 to 10 carbon atoms or an alkenyl group of 2 to 10 carbon atoms, and in either of the groups, an optional methylene group (—CH$_2$—) therein are not continuously replaced by oxygen atom; ring I represents trans-1,4-cyclohexylene group, 1,4-phenylene group or pyrimidine-2,5-diyl group; ring J represents trans-1,4-cyclohexylene group, or 1,4-phenylene group, or pyrimidine-2,5-diyl group, one or more hydrogen atoms on the rings of which groups may be replaced by F, ring K represents trans-1,4-cyclohexylene group or 1,4-phenylene group; $Z_{12}$ and $Z_{14}$ each independently represent —COO—, —(CH$_2$)$_2$— or a covalent bond; $Z_{13}$ represents —CH═CH—, —C≡C—, —COO— or a covalent bond; and h represents 0 or 1.

(12) A liquid crystal composition, characterized by containing as a first component, at least one member of the liquid crystalline compounds set forth in either one of items (1) to (8), as a part of a second component, at least one member selected from the group consisting of the compounds expressed by the formulas (2), (3) and (4) set forth in item (10), and as another part of the second component, at least one member selected from the group consisting of the compounds expressed by the formulas (5), (6), (7), (8) and (9) set forth in item (11).

(13) A liquid crystal display element composed of a liquid crystal composition set forth in either one of items (9) to (12).

(14) A phenol derivative as a raw material for a liquid crystalline compound, expressed by the formula (1-a):

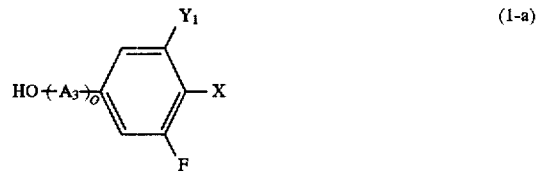

(1-a)

wherein $A_3$ represents trans-1,4-cyclohexylene group or 1,4-phenylene group one or more of hydrogen atoms on the ring of which group may be replaced by F, X represents CF$_3$, CF$_2$H, CFH$_2$, OCF$_3$ or OCF$_2$H, $Y_1$ represents H or F, o represents an integer of 0 or 1, but when o represents 0, and X represents CF$_3$, $Y_1$ represents H.

BRIEF DESCRIPTION OF THE ACCOMPANYING DRAWINGS

Figure 1:
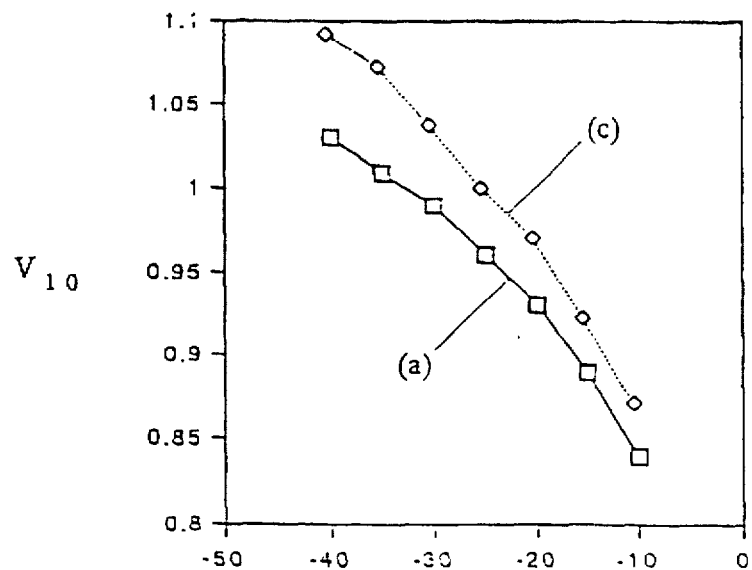
FIG. 1 is a graph for explaining the effectiveness of a liquid crystal composition as an example of the present invention.

(a) A liquid crystal composition of the present invention.

(b) Another liquid crystal composition of the present invention.

(c) A comparative liquid crystal composition.

(d) another comparative liquid crystal.

DESCRIPTION OF PREFERRED EMBODIMENTS

The liquid crystalline compound of the present invention expressed by the formula (1) has a large Δε, a small change in the threshold voltage depending upon temperatures and a good solubility in other liquid crystal compositions even at low temperatures. Further, these liquid crystalline compounds are physically and chemically sufficiently stable under conditions where display elements are usually used, and further, when the six-membered ring, substituent and/or bonding group, among the molecule-constituting elements are suitably selected, it is possible to derive them into those having desired physical properties. Thus, when the compound of the present invention is used as a component of liquid crystal composition, it is possible to provide a novel liquid crystal composition having preferred characteristics.

The compound of the present invention expressed by the formula (1) is classified into those expressed by the following formulas (1a) to (1l):

Compound having 2 six-membered rings:

   (1a)

Compounds having 3 six-membered rings:

   (1b)

   (1c)

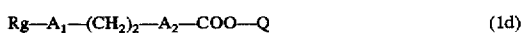   (1d)

   (1e)

Compounds having 4 six-membered rings:

   (1f)

   (1g)

| | |
|---|---|
| Rg—A₁—A₂—A₃—COO—Q | (1h) |
| Rg—A₁—COO—A₂—COO—A₃—Q | (1i) |
| Rg—A₁—(CH₂)₂—A₂—COO—A₃—Q | (1j) |
| Rg—A₁—(CH₂)₂—A₂—A₃—COO—Q | (1k) |
| Rg—A₁—A₂—(CH₂)₂—A₃—COO—Q | (1l) |

In these formulas, Rg is a group expressed below:

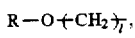

Q is a group expressed below:

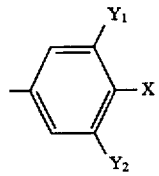

The compounds expressed by the formula (1a) are further developed into the following formulas (1aa) to (1ae):

| | |
|---|---|
| Rg—Cyc—COO—Q | (1aa) |
| Rg—Phe—COO—Q | (1ab) |
| Rg—Pyr—COO—Q | (1ac) |
| Rg—Pyd—COO—Q | (1ad) |
| Rg—Dio—COO—Q | (1ae) |

Among these compounds, those expressed by (1aa) and (ab) are particularly preferred.

In the above formulas, Cyc represents trans-1,4-cyclohexylene group; Phe represents 1,4-phenylene group; Pyr represents pyrimidine-2,5-diyl group; Pyd represents pyridine-2,5-diyl group; Dio represents 1,3-dioxane-2,5-diyl group; one or more hydrogen atoms of the Phe may be replaced by F; A₁, A₂ and A₃ are selected from the group consisting of Cyc, Phe, Pyr, Pyd and Dio, and preferably two or more Pyr, Pyd, Dio are not contained in the molecule.

Compounds expressed by the formula (1b) are developed into those expressed by the following formulas (1ba) to (1bj):

| | |
|---|---|
| Rg—Cyc—Cyc—COO—Q | (1ba) |
| Rg—Cyc—Phe—COO—Q | (1bb) |
| Rg—Phe—Cyc—COO—Q | (1bc) |
| Rg—Phe—Phe—COO—Q | (1bd) |
| Rg—Pyr—Phe—COO—Q | (1be) |
| Rg—Pyr—Cyc—COO—Q | (1bf) |
| Rg—Pyd—Phe—COO—Q | (1bg) |
| Rg—Pyd—Cyc—COO—Q | (1bh) |
| Rg—Dio—Phe—COO—Q | (1bi) |
| Rg—Dio—Cyc—COO—Q | (1bj) |

Among these compounds, those expressed by the formulas (1ba) to (1be), (1bg) and (1bi) are particularly preferred.

The compounds expressed by the formula (1c) are further developed into those expressed by the following formulas (1ca) to (1cn):

| | |
|---|---|
| Rg—Cyc—COO—Cyc—Q | (1ca) |
| Rg—Cyc—COO—Phe—Q | (1cb) |
| Rg—Cyc—COO—Pyr—Q | (1cc) |
| Rg—Cyc—COO—Pyd—Q | (1cd) |
| Rg—Phe—COO—Cyc—Q | (1ce) |
| Rg—Phe—COO—Phe—Q | (1cf) |
| Rg—Phe—COO—Pyr—Q | (1cg) |
| Rg—Phe—COO—Pyd—Q | (1ch) |
| Rg—Pyr—COO—Phe—Q | (1ci) |
| Rg—Pyr—COO—Cyc—Q | (1cj) |
| Rg—Pyd—COO—Phe—Q | (1ck) |
| Rg—Pyd—COO—Cyc—Q | (1cl) |
| Rg—Dio—COO—Phe—Q | (1cm) |
| Rg—Dio—COO—Cyc—Q | (1cn) |

Among these compounds, those expressed by the formulas (1ca), (1cb), (1ce) and (1cf) are particularly preferred.

The compounds expressed by the formula (1d) are further developed into those expressed by the following formulas (1da) to (1dk):

| | |
|---|---|
| Rg—Cyc—(CH₂)₂Cyc—COO—Q | (1da) |
| Rg—Cyc—(CH₂)₂Phe—COO—Q | (1db) |
| Rg—Phe—(CH₂)₂Cyc—COO—Q | (1dc) |
| Rg—Phe—(CH₂)₂Phe—COO—Q | (1dd) |
| Rg—Phe—(CH₂)₂Pyr—COO—Q | (1de) |
| Rg—Pyr—(CH₂)₂Phe—COO—Q | (1df) |
| Rg—Pyr—(CH₂)₂Cyc—COO—Q | (1dg) |
| Rg—Pyd—(CH₂)₂Phe—COO—Q | (1dh) |
| Rg—Pyd—(CH₂)₂Cyc—COO—Q | (1di) |
| Rg—Dio—(CH₂)₂Phe—COO—Q | (1dj) |
| Rg—Dio—(CH₂)₂Cyc—COO—Q | (1dk) |

Among these compounds, compounds expressed by the formulas (1da) to (1dd) are particularly preferred.

The compounds expressed by the formula (1e) are further developed into compounds expressed by the following formulas (1ea) to (1ek):

| | |
|---|---|
| Rg—Cyc—COO Cyc—COO—Q | (1ea) |
| Rg—Cyc—COO Phe—COO—Q | (1eb) |
| Rg—Phe—COO Cyc—COO—Q | (1ec) |
| Rg—Phe—COO Phe—COO—Q | (1ed) |
| Rg—Phe—COO Pyr—COO—Q | (1ee) |
| Rg—Pyr—COO Phe—COO—Q | (1ef) |

| | |
|---|---|
| Rg—Pyr—COO—Cyc—COO—Q | (1eg) |
| Rg—Pyd—COO—Phe—COO—Q | (1eh) |
| Rg—Pyd—COO—Cyc—COO—Q | (1ei) |
| Rg—Dio—COO—Phe—COO—Q | (1ej) |
| Rg—Dio—COO—Cyc—COO—Q | (1ek) |

Among these compounds, compounds expressed by the formulas (1ea) to (1ed) are particularly preferred.

The compounds expressed by the formula (1f) are further developed into compounds expressed by the following formulas (1fa) to (1fh):

| | |
|---|---|
| Rg—Cyc—COO—Cyc—Cyc—Q | (1fa) |
| Rg—Cyc—COO—Cyc—Phe—Q | (1fb) |
| Rg—Cyc—COO—Phe—Phe—Q | (1fc) |
| Rg—Cyc—COO—Phe—Cyc—Q | (1fd) |
| Rg—Phe—COO—Cyc—Cyc—Q | (1fe) |
| Rg—Phe—COO—Cyc—Phe—Q | (1ff) |
| Rg—Phe—COO—Phe—Cyc—Q | (1fg) |
| Rg—Phe—COO—Phe—Phe—Q | (1fh) |

Among these compounds, compounds expressed by the formulas (1fb), (1fc), (1ff) and (1fh) are particularly preferred.

The compounds expressed by the formula (1g) are further developed into compounds expressed by the following formulas (1ga) to (1gh):

| | |
|---|---|
| Rg—Cyc—Cyc—COO—Cyc—Q | (1ga) |
| Rg—Cyc—Cyc—COO—Phe—Q | (1gb) |
| Rg—Cyc—Phe—COO—Cyc—Q | (1gc) |
| Rg—Cyc—Phe—COO—Phe—Q | (1gd) |
| Rg—Phe—Cyc—COO—Cyc—Q | (1ge) |
| Rg—Phe—Cyc—COO—Phe—Q | (1gf) |
| Rg—Phe—Phe—COO—Cyc—Q | (1gg) |
| Rg—Phe—Phe—COO—Phe—Q | (1gh) |

Among these compounds, those expressed by the formulas (1gb), (1gc) and (1gd) are particularly preferred.

The compounds expressed by the formula (1h) are further developed into compounds expressed by the following formulas (1ha) to (1hh):

| | |
|---|---|
| Rg—Cyc—Cyc—Cyc—COO—Q | (1ha) |
| Rg—Cyc—Cyc—Phe—COO—Q | (1hb) |
| Rg—Cyc—Phe—Phe—COO—Q | (1hc) |
| Rg—Cyc—Phe—Cyc—COO—Q | (1hd) |
| Rg—Phe—Cyc—Cyc—COO—Q | (1he) |
| Rg—Phe—Phe—Cyc—COO—Q | (1hf) |
| Rg—Phe—Cyc—Phe—COO—Q | (1hg) |
| Rg—Phe—Phe—Phe—COO—Q | (1hh) |

In all of the above mentioned compounds, $R_9$ represents an alkoxyalkyl group of 2 to 19 carbon atoms, and particularly preferred groups among them are methoxymethyl, methoxyethyl, methoxypropyl, methoxybutyl, methoxypentyl, methoxynonyl, ethoxymethyl, ethoxyethyl, ethoxypropyl, ethoxybutyl, propoxymethyl, propoxyethyl, propoxypropyl, butoxymethyl, butoxyethyl, pentyloxymethyl, hexyloxymethyl, heptyloxymethyl and decyloxymethyl.

As described above, compounds expressed by the formulas, (1aa), (1ab), (1ba), (1bb), (1bc), (1bd), (1be), (1bg), (1bi), (1ca), (1cb), (1ce), (1cf), (1da), (1db), (1dc), (1dd), (1ea), (1eb), (1ec), (1ed), (1fb), (1fc), (1ff), (1fh), (1gb), (1gc), (1gd) and (1hb) can be said to be particularly preferred, but among them as more preferred compounds, compounds expressed by the following formulas (1-1) to (1-24) can be mentioned:

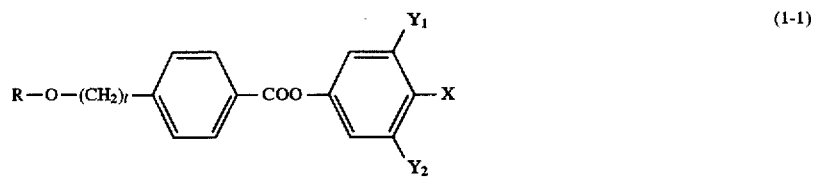

(1-1)

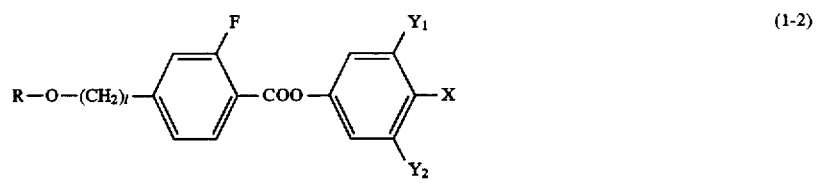

(1-2)

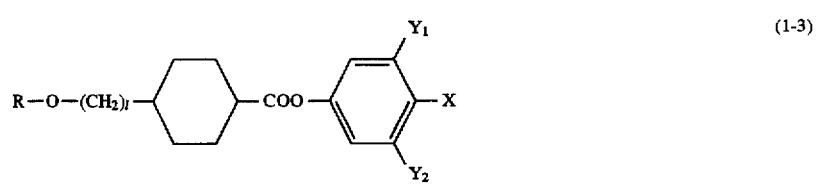

(1-3)

-continued
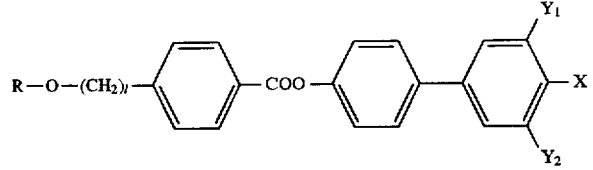 (1-4)
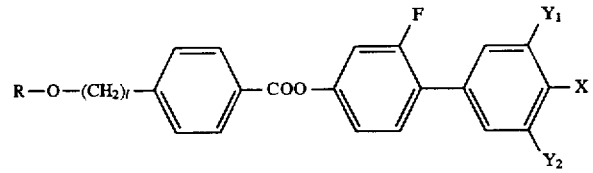 (1-5)
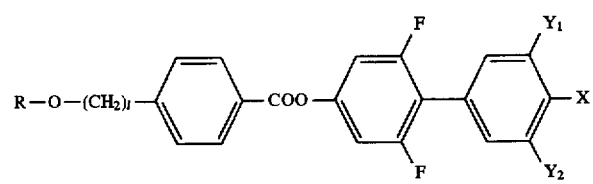 (1-6)
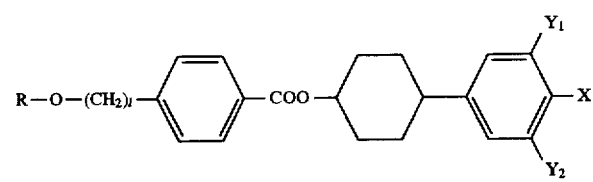 (1-7)
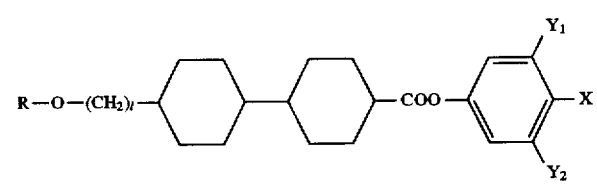 (1-8)
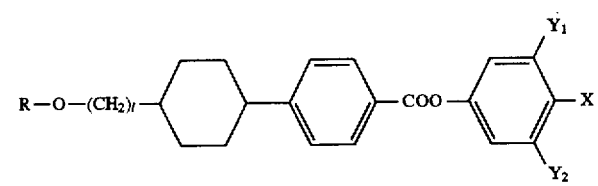 (1-9)
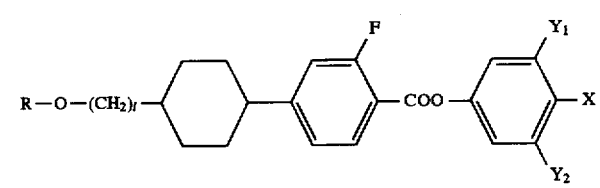 (1-10)
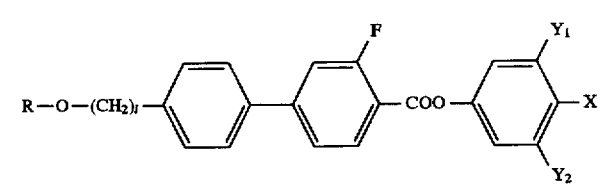 (1-11)
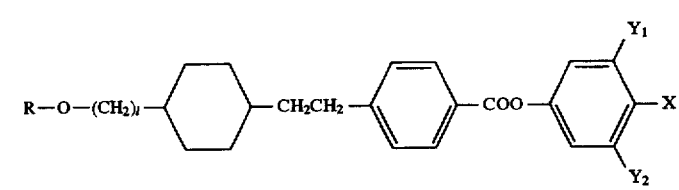 (1-12)

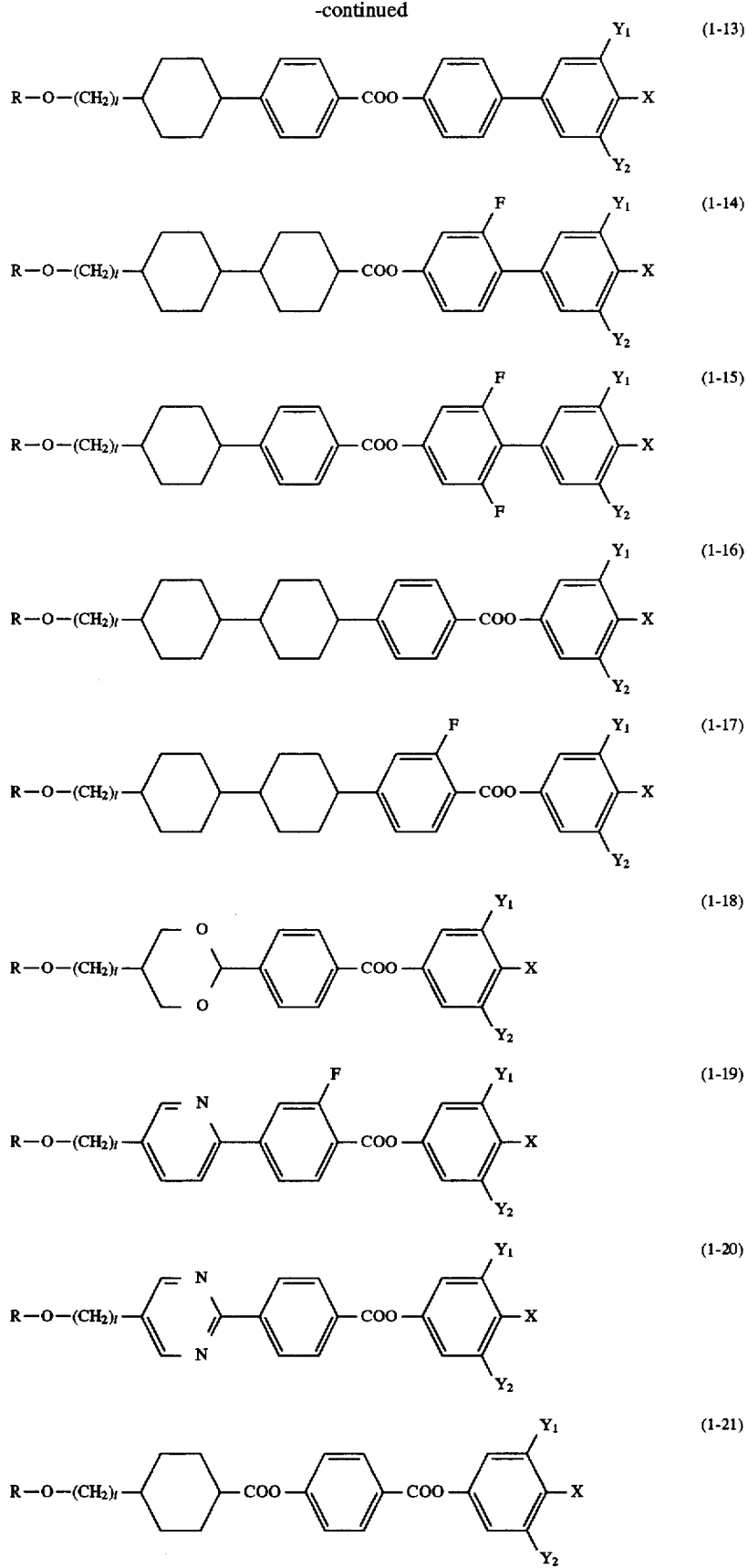

-continued

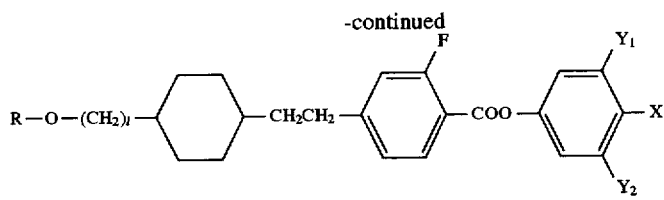
(1-22)

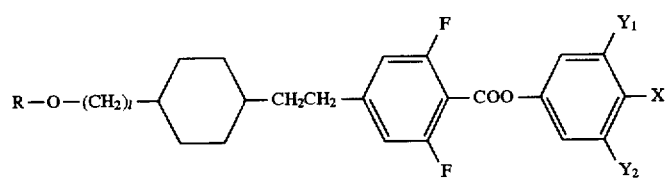
(1-23)

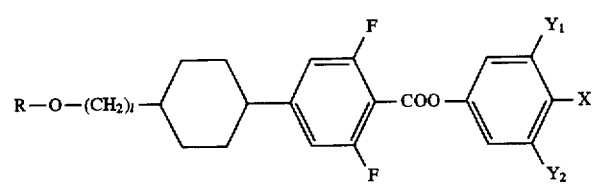
(1-24)

The liquid crystalline compound of the present invention expressed by the formula (1) can be prepared according to known, general organic synthesis process. For example, it can be conveniently prepared according to the following process:

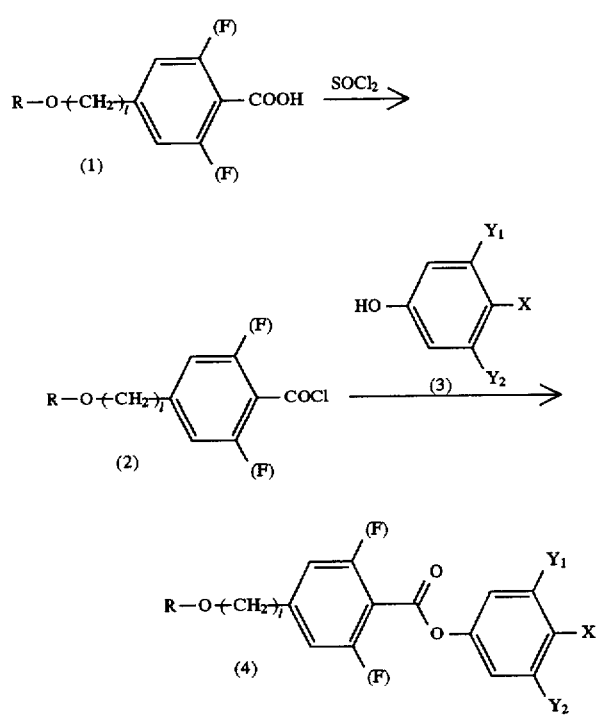

-continued

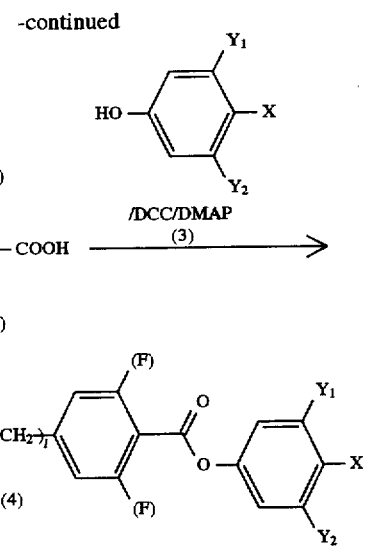

Namely, it is possible to prepare the compound of the formula (1), by esterification such as dehydration condensation.

In more details, a carboxylic acid derivative (1) is converted into an acid halide (2), by means of a halogenating reagent such as thionyl chloride etc., in a solvent such as toluene, benzene, etc. or in the absence of solvent, followed by reacting (2) with a phenol derivative (3) in a solvent such as toluene, benzene, etc., to obtain the objective compound example (4). The reactions in a series is preferably carried out at a temperature between room temperature and the boiling point of solvent, and further in the presence of a base such as pyridine, triethylamine, dimethylaniline, tetramethyl urea, etc. (E. J. Corey et al, Journal of Organic Chemistry, 38, 3223 (1973), C. Raha, Organic Synthesis, IV, 263 (1963), B. Iselin et al, Helvetica Chimica Acta, 40, 373 (1957), M. S. Newman et al, Tetrahedron Letters, 3267 (1967)).

Alternatively, when a carboxylic acid derivative (1) is reacted with a phenol derivative (3), in a solvent such as dichloromethane, chloroform, etc., and in the presence of dicyclohexylcarbodiimide (hereinafter abbreviated to DCC) and dimethylaminopyrimidine (hereinafter abbreviated to DMAP), it is also possible to obtain the objective compound example (4) (B. Neises et al, Organic Synthesis, 63, 183 (1985)).

The carboxylic acid derivative (1) as one of the raw materials can be prepared for example according to the following process:

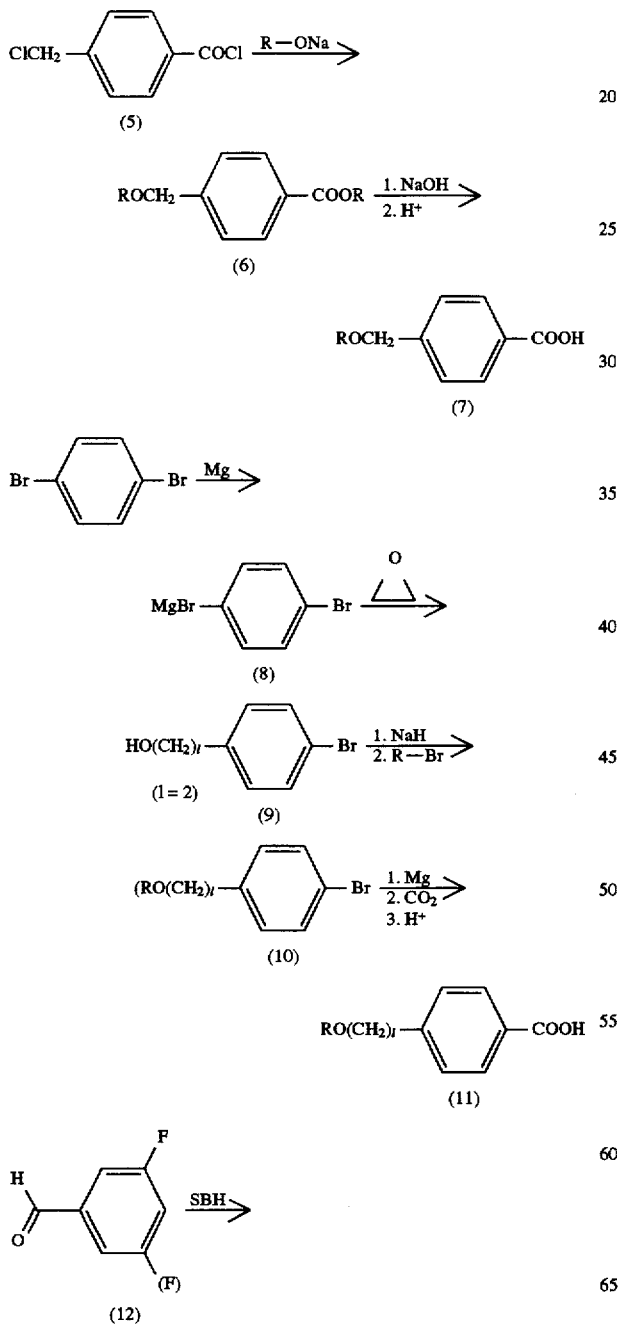

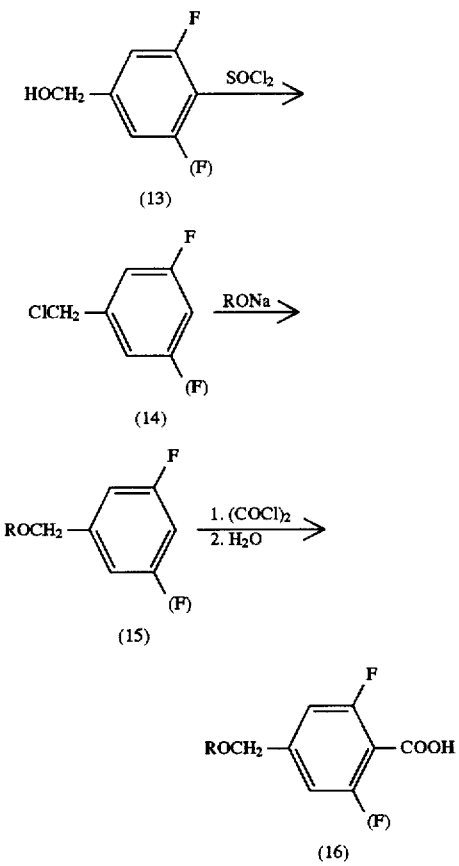

Namely, when compound (5) is reacted with a sodium alkoxide, to obtain a compound (6), followed by hydrolysis in the presence of a base such as NaOH, KOH, etc., it is possible to obtain a carboxylic acid derivative example (7).

Further, when a Grignard reagent (8), of a dihalogenobenzene is prepared, followed by reacting it with ethylene oxide, to obtain an alcohol (9) and then an ether (10), preparing a Grignard reagent of the ether and reacting it with $CO_2$, it is possible to obtain a carboxylic acid derivative example (11).

In the case of the alcohol (9), compounds having an l of 3 or more can be obtained by reacting with the corresponding ring-form ether in place of ethylene oxide. Alternatively, (9) can be easily obtained by carrying out carbon number-increasing reaction according to a known, general organic synthesis process, for example, to prepare the corresponding derivative of carboxylic acid, aldehyde, ester, etc., followed by reducing the derivative with a reducing agent such as sodium boron hydride (SBH), borane, lithium aluminum hydride (LAH), sodium bis(2-methoxyethoxy) aluminum hydride (SBMEA, Red-Al) or the like.

Alternatively, it is possible to obtain the carboxylic acid derivative example (16), by reducing aldehyde (12) with a reducing agent such as SBH, LAH, diisobutylaluminum hydride (DIBAL) or the like, to obtain alcohol (13), followed by reacting it with a halogenating agent such as thionyl chloride or the like, to obtain halide (14), reacting the halide with a sodium alkoxide to obtain ether (15) and reacting it with oxalyl chloride, to obtain an acid chloride; and hydrolyzing it to obtain a carboxylic derivative example (16).

Among the raw materials, the phenol derivative can be prepared for example according to the following processes:

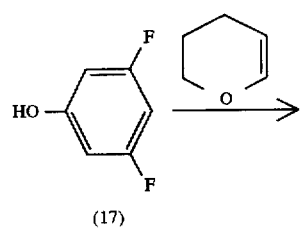
(17)
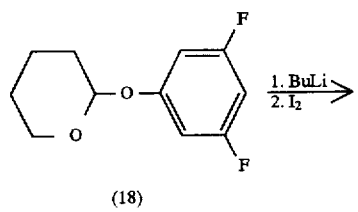
(18)
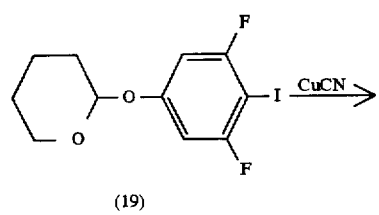
(19)
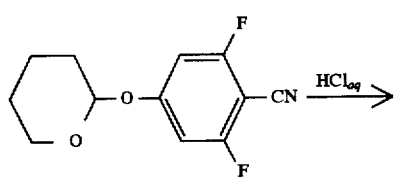
(20)
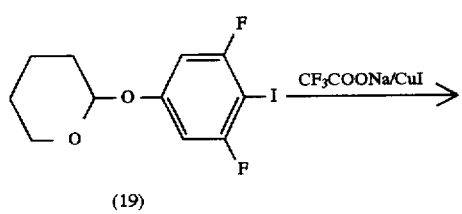
(19)
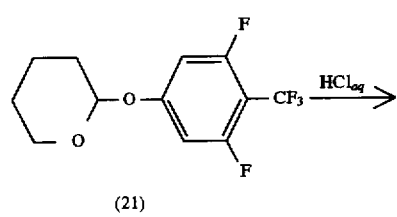
(21)
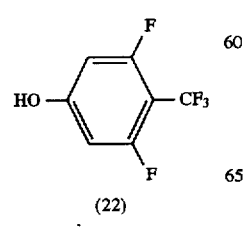
(22)
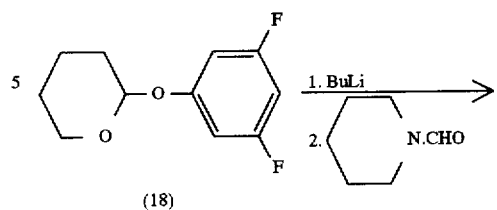
(18)
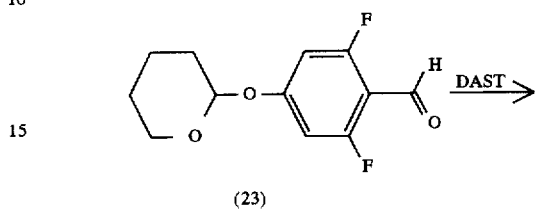
(23)
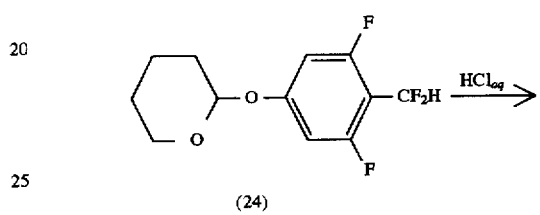
(24)
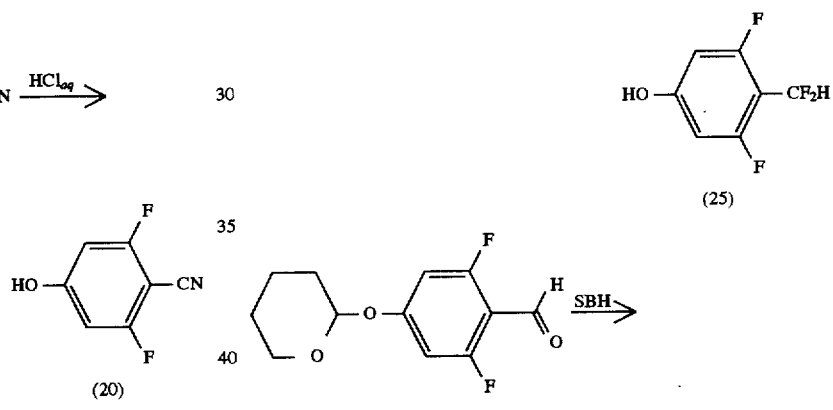
(25)
(23)
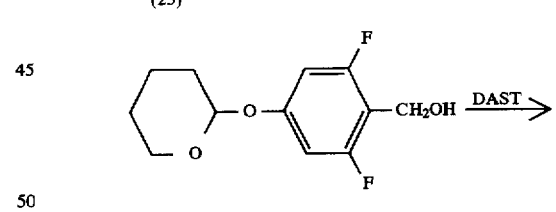
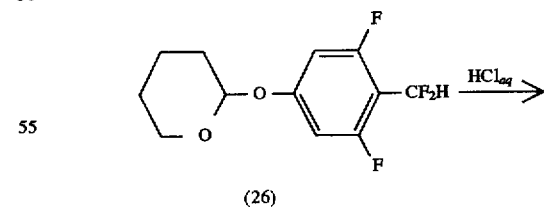
(26)
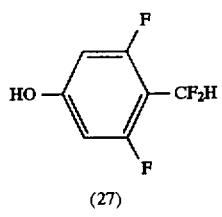
(27)

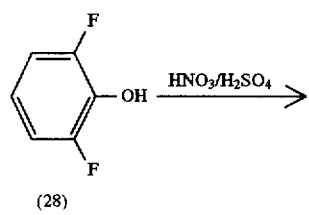

(28)

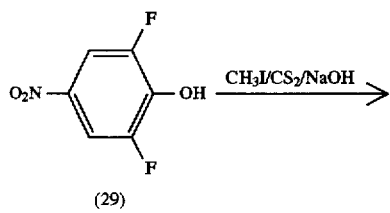

(29)

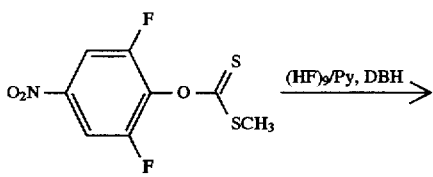

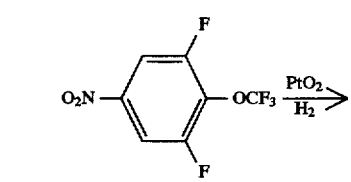

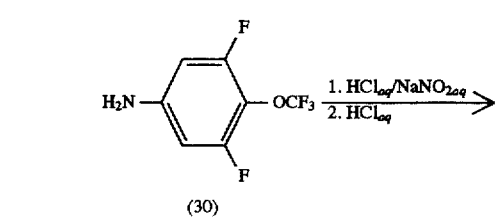

(30)

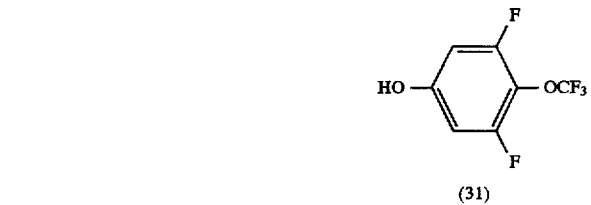

(31)

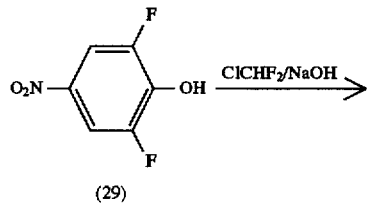

(29)

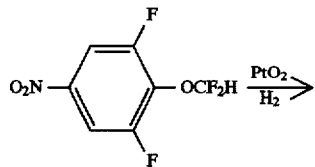

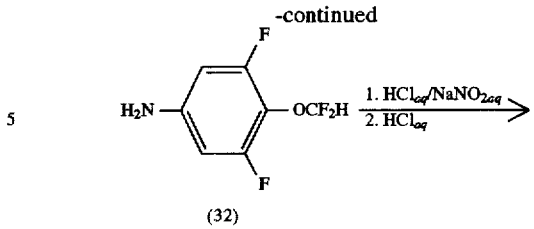

(32)

(33)

Namely, a substituted phenol (17), is converted into an ether substance (18) by means of tetrahydropyranyl group or the like, followed by reacting it with an organolithium reagent such as butyllithium or the like and iodine, to obtain an iodine substance (19), cyanogenating it, and deprotecting, to obtain a phenol derivative example (20).

Further, the above iodine derivative (19) is reacted with sodium trifluoroacetate/copper iodide (G. E. Carr et al, Journal of the Chemical Society Parkin Trans, Reactions I, 921 (1988)), or methyl fluorosulfonyldifluoroacetate/copper iodine (Q. Y. Chen et al, Journal of the Chemical Society, Chemical Communications, 705 (1989), to obtain a trifluoromethyl substance (21), followed by deprotecting it, to obtain a phenol derivative example (22).

Further, the above ether substance (18) is reacted with an organolithium reagent such as butyllithium or the like and formylpiperidine, to obtain an aldehyde substance (23), followed by reacting it with a fluorinating agent such as diethylaminosulfurtrifluoride (DAST) (W. J. Middleton et al, Journal of the Organic Chemistry, 40, 574 (1975), S. Rozen et al, Tetrahedron Letters, 41, 111 (1985), M. Hudlicky, Organic Reactions, 35, 513 (1988), P. A. Messina et al, Journal of Fluorine Chemistry, 42, 137 (1989)), to obtain a compound (24), and deprotecting it, to obtain a phenol derivative example (25).

Further, the above aldehyde substance (23) is reduced with a reducing agent such as sodium boron hydride (SBH), lithium aluminum hydride, diisobutylaluminum hydride, or bis(2-methoxyethoxy aluminum sodium hydride or the like, followed by reacting with a fluorinating agent such as DAST or the like, to obtain a compound (26), and deprotecting it, to obtain a phenol derivative example (27).

Further, another substituted phenol substance (28) is treated in the presence of nitric acid and sulfuric acid to obtain a nitro compound (29), followed by converting it into a xanthate according to Albert et al's method (Synthetic Communications, 19, 547–552, 1989), fluorinating it according to Kuroboshi et al's method (Tetrahedron Letters, 33, 29, 4173–4176, 1992), catalytically hydrogenating in the presence of Pt catalyst, to obtain a compound (30), reacting it with hydrochloric acid and sodium nitrite, and hydrolyzing the resulting diazonium salt, to obtain a phenol derivative example (33).

Further, the above nitro compound (29) is reacted in a system of chlorodifluoromethane/sodium hydroxide (Japanese patent application Hyo No. Hei 4-501575), for fluorination, followed by catalytically hydrogenating in the presence of Pt catalyst, to obtain a compound (32), reacting it with hydrochloric acid and sodium nitrite, and hydrolyzing the resulting diazonium salt, to obtain a phenol derivative example (33).

Either of the thus obtained liquid crystalline compound of the present invention exhibit a large Δε, and have a small change in the threshold voltage depending on temperatures, are easily blended with various liquid crystal materials, and have a good solubility therewith even at low temperatures; hence the compound is far superior as a constituting component of nematic liquid crystal compositions.

The compound of the present invention is usable as a constituting component in either of liquid crystal compositions of TFT mode, TN mode and STN mode which at present constituted main current, and compounds of X=CN in the formula (I) are particularly preferred for STN, and compounds having X replaced by fluorine are particularly preferred for TFT.

When the compound of the present invention is used as a constituting component of nematic liquid crystal compositions, compounds having a structure of two rings exhibit a relatively low liquid crystal temperature range and a low viscosity, and compounds having a structure of 3 or 4 rings exhibit a broad liquid crystal temperature range and a relatively high viscosity; hence when these compounds are adequately selected, it is possible to obtain liquid crystal compositions having desired physical properties.

Further, the compounds among those of the present invention having a 4-substituted phenyl group, a 3-fluoro-4-substituted phenyl group or 3,5-difluoro-4-substituted phenyl group exhibit a large Δε, and when hydrogen atoms in other ring structure are replaced by fluorine atoms, it is possible to impart a further large Δε.

The liquid crystal composition provided by the present invention may be composed only of a first component containing at least one member of the liquid crystalline compound expressed by the formula (1), but the composition is preferred to blend therewith, at least one member of compounds selected from the group consisting of those expressed by the above formulas (2), (3) and (4) (hereinafter abbreviated to the second A component), and/or at least one member of compounds selected from the group consisting of those expressed by the formulas (5), (6), (7), (8) and (9) (hereinafter abbreviated to the second B component), and further, it is possible to additionally blend known compounds as the third component, in order to adjust the threshold voltage, liquid crystal phase temperature range, optical anisotropy value, dielectric anisotropy value, viscosity, etc.

As preferred examples of compounds contained in those expressed by the formulas (2), (3) and (4), among the second A component, the following compounds of (2-1) to (2-15), (3-1) to (3-48) and (4-1) to (4-55) can be respectively mentioned:

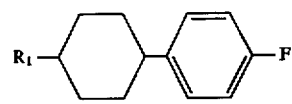
(2-1)

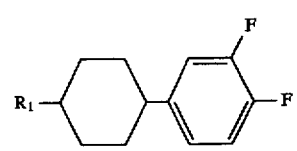
(2-2)

-continued

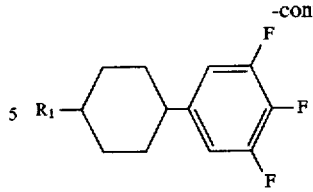
(2-3)

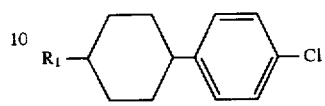
(2-4)

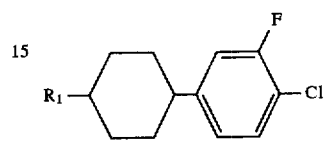
(2-5)

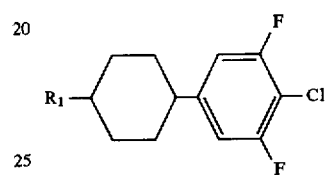
(2-6)

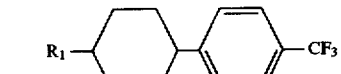
(2-7)

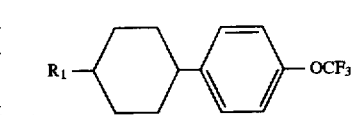
(2-8)

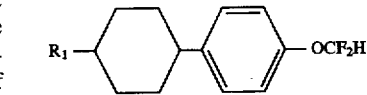
(2-9)

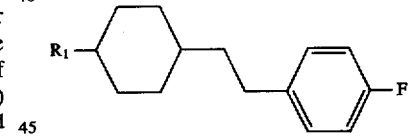
(2-10)

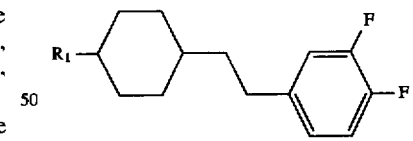
(2-11)

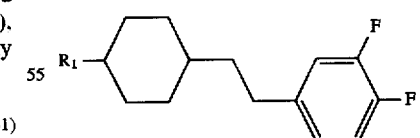
(2-12)

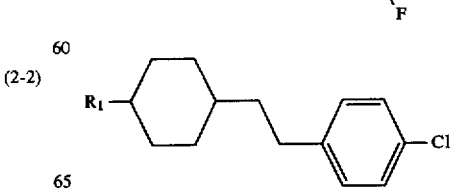
(2-13)

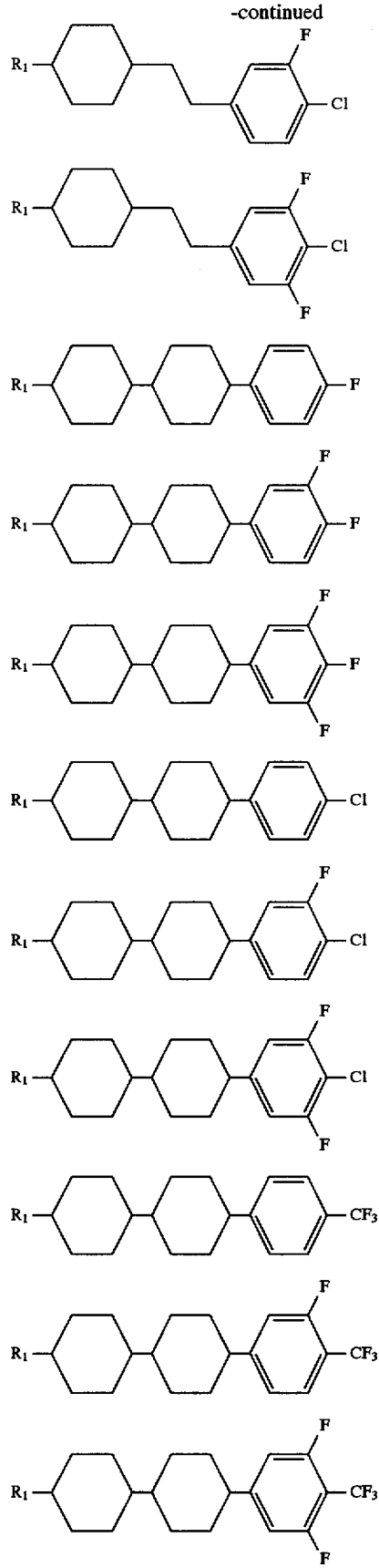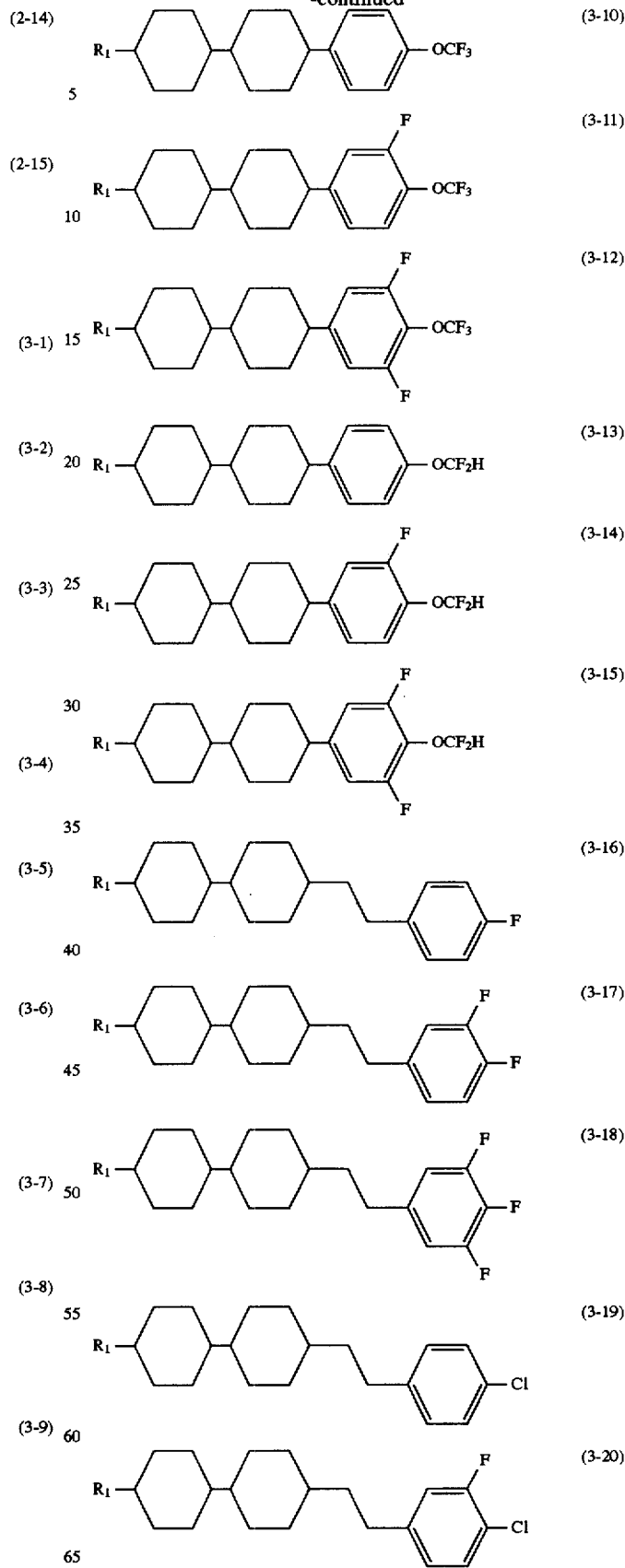

-continued
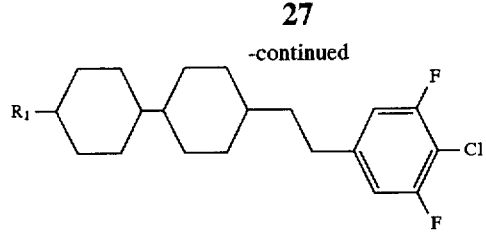 (3-21)
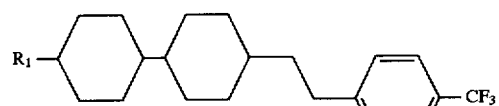 (3-22)
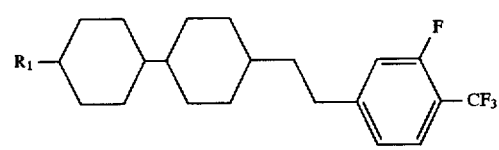 (3-23)
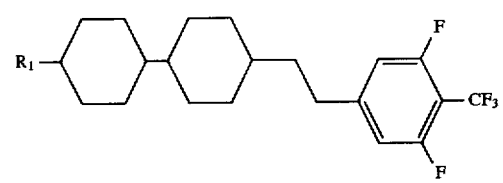 (3-24)
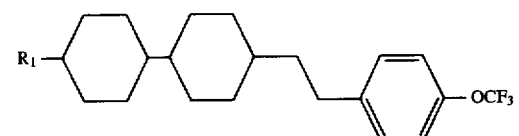 (3-25)
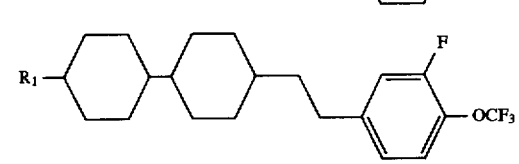 (3-26)
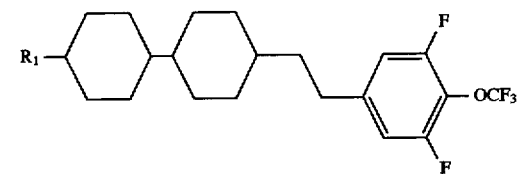 (3-27)
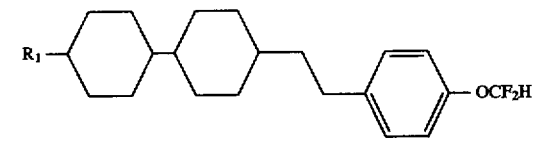 (3-28)
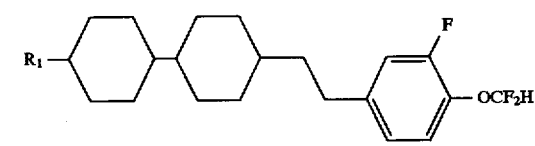 (3-29)
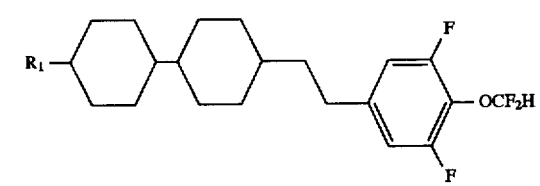 (3-30)
-continued
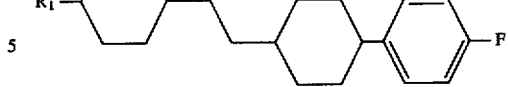 (3-31)
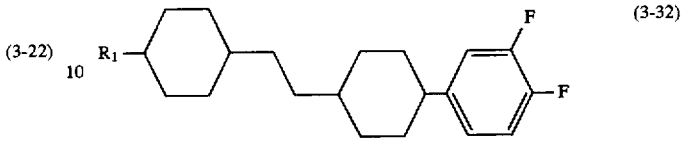 (3-32)
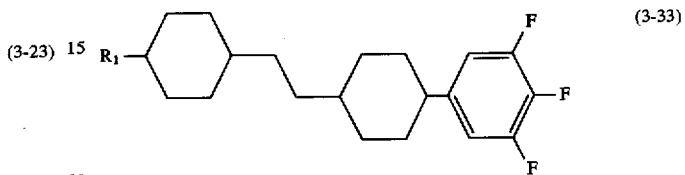 (3-33)
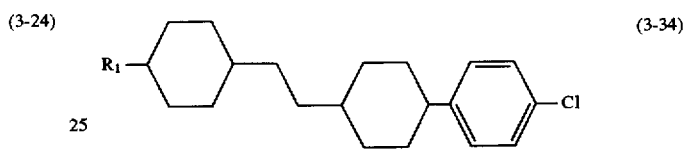 (3-34)
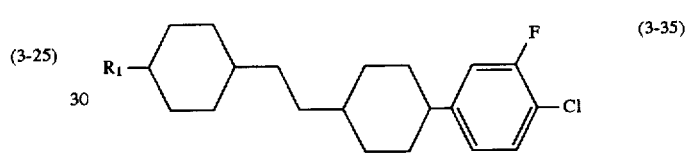 (3-35)
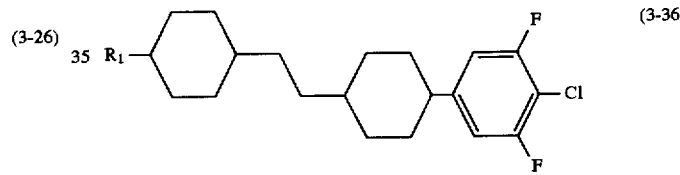 (3-36)
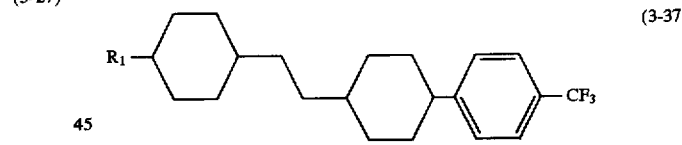 (3-37)
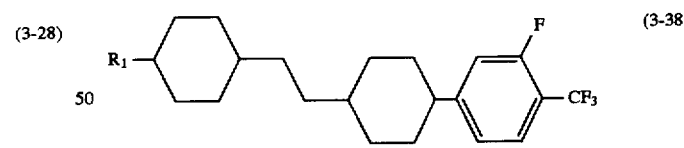 (3-38)
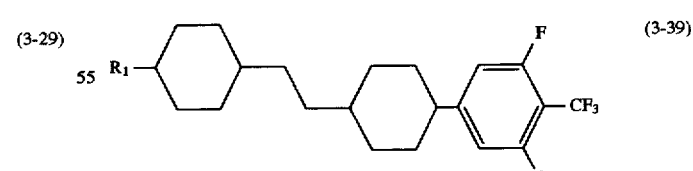 (3-39)
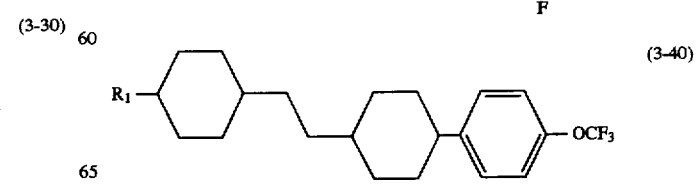 (3-40)

5,755,994

(3-41) through (3-48) and (4-1) through (4-13): structural formulas of liquid crystal compounds.

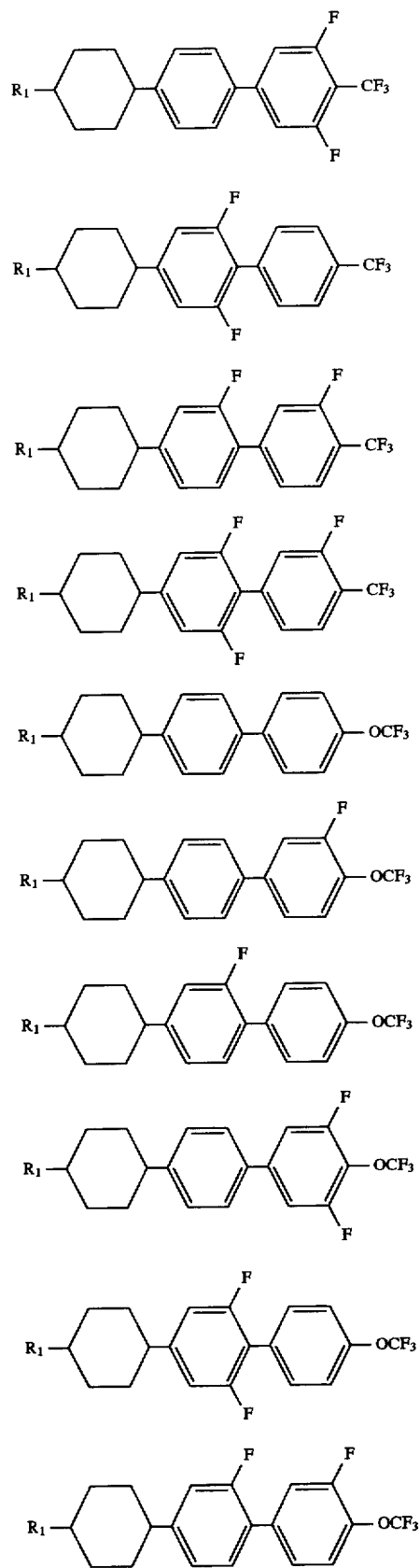
(4-14)
(4-15)
(4-16)
(4-17)
(4-18)
(4-19)
(4-20)
(4-21)
(4-22)
(4-23)
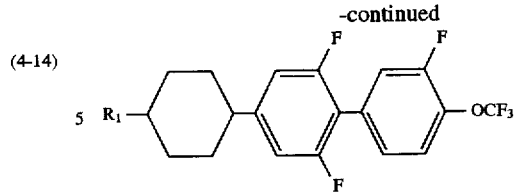
(4-24)
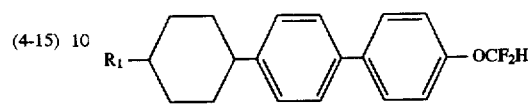
(4-25)
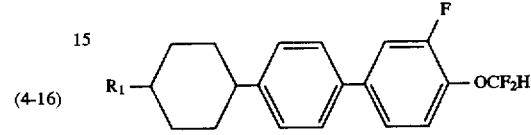
(4-26)
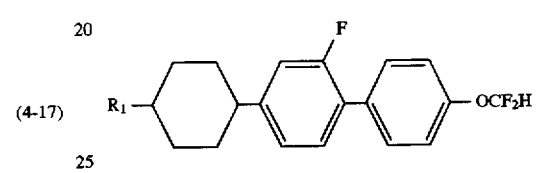
(4-27)
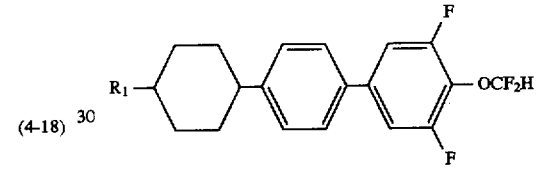
(4-28)
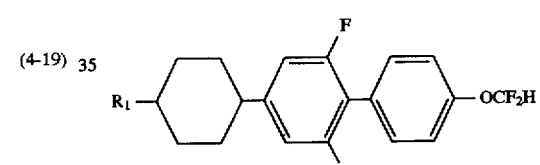
(4-29)
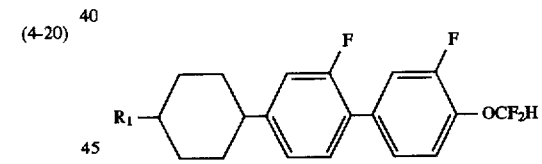
(4-30)
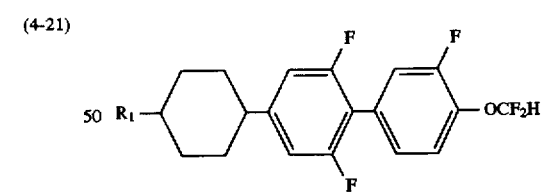
(4-31)
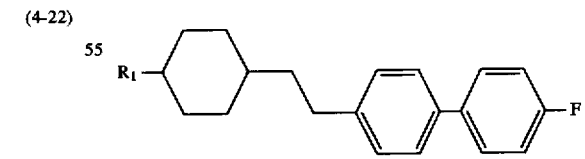
(4-32)
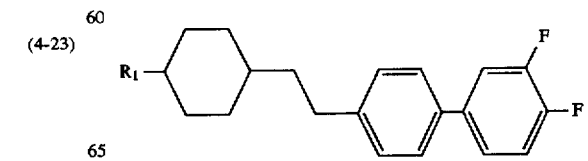
(4-33)

-continued
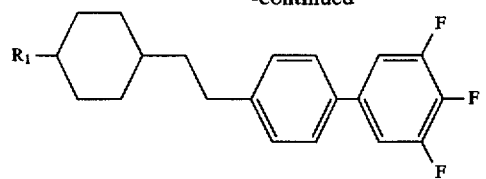 (4-34)
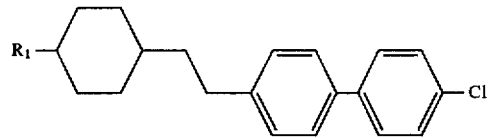 (4-35)
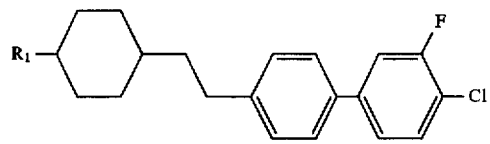 (4-36)
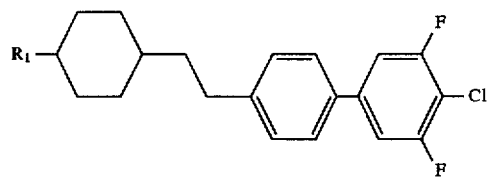 (4-37)
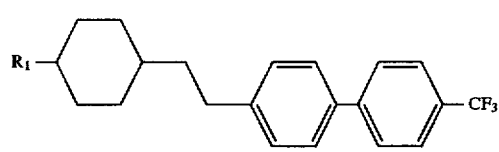 (4-38)
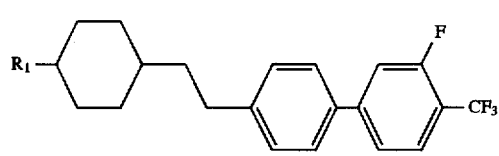 (4-39)
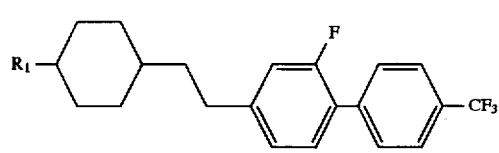 (4-40)
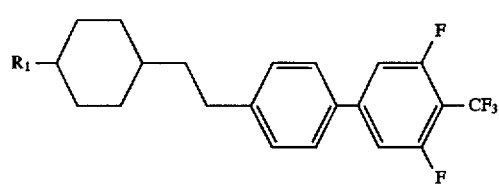 (4-41)
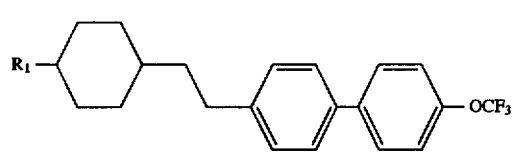 (4-42)
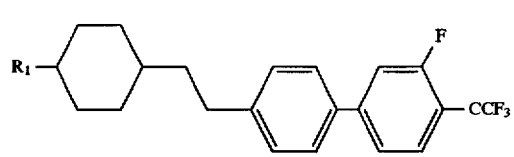 (4-43)
-continued
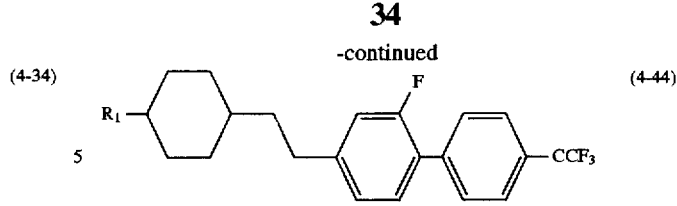 (4-44)
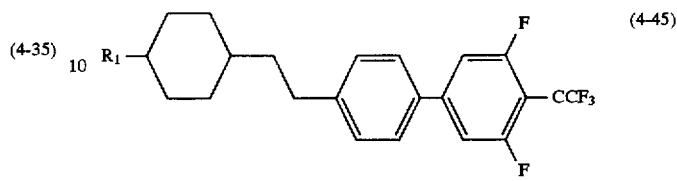 (4-45)
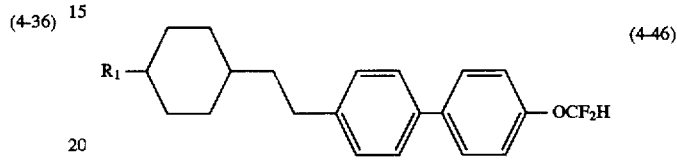 (4-46)
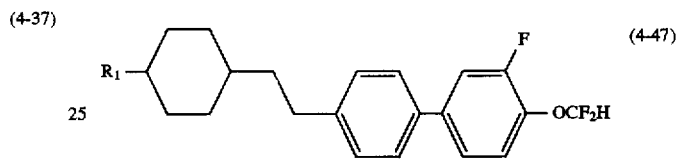 (4-47)
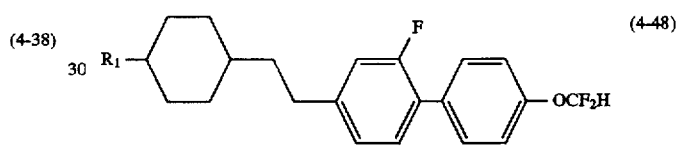 (4-48)
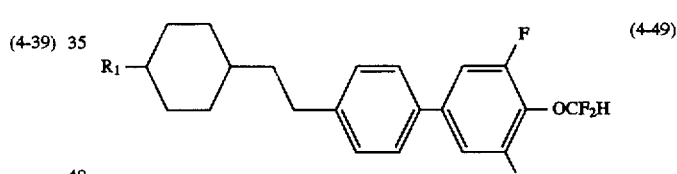 (4-49)
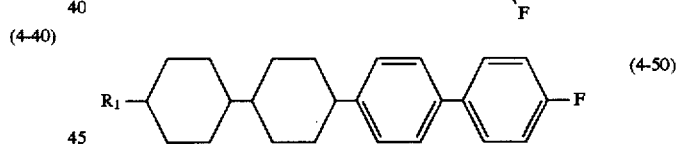 (4-50)
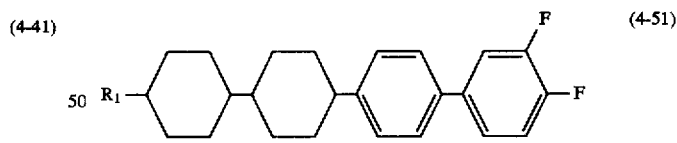 (4-51)
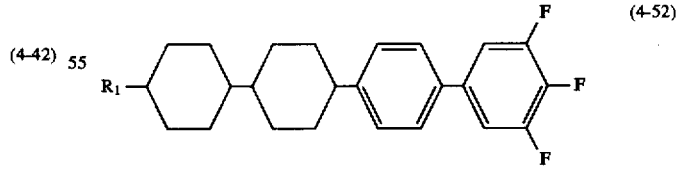 (4-52)
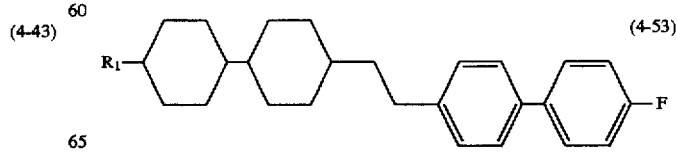 (4-53)

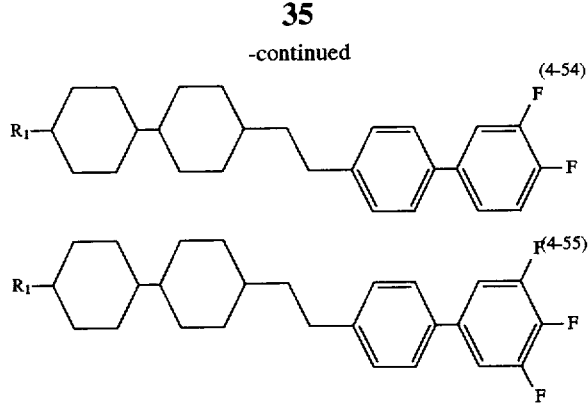

(4-54)

(4-55)

The compounds expressed by these formulas (2) to (4) exhibit a positive dielectric anisotropy value and far superior thermal stability and chemical stability.

As to the quantity of the compounds used, a range of 1 to 99% by weight based upon the total weight is suitable, and that of 10 to 97% by weight is preferred, and that of 40 to 95% by weight is more preferred.

Next, as preferred examples of the compounds expressed by the formulas (5), (6) and (7), among the above second B component, the following (5-1) to (5-29), (6-1) to (6-3) and (7-1) to (7-17) can be mentioned:

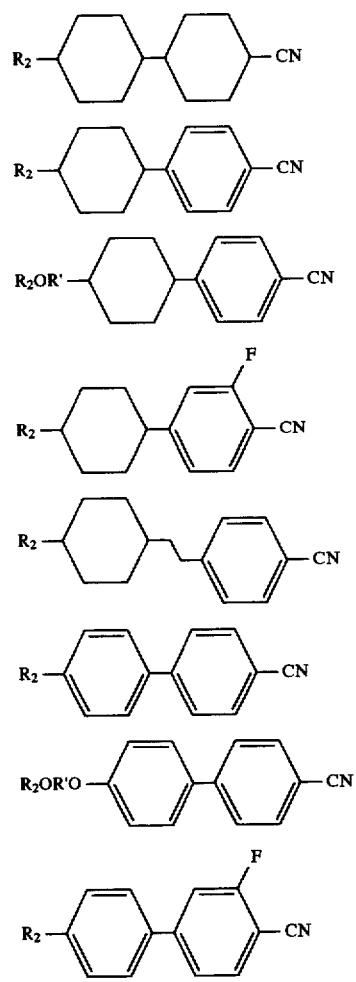

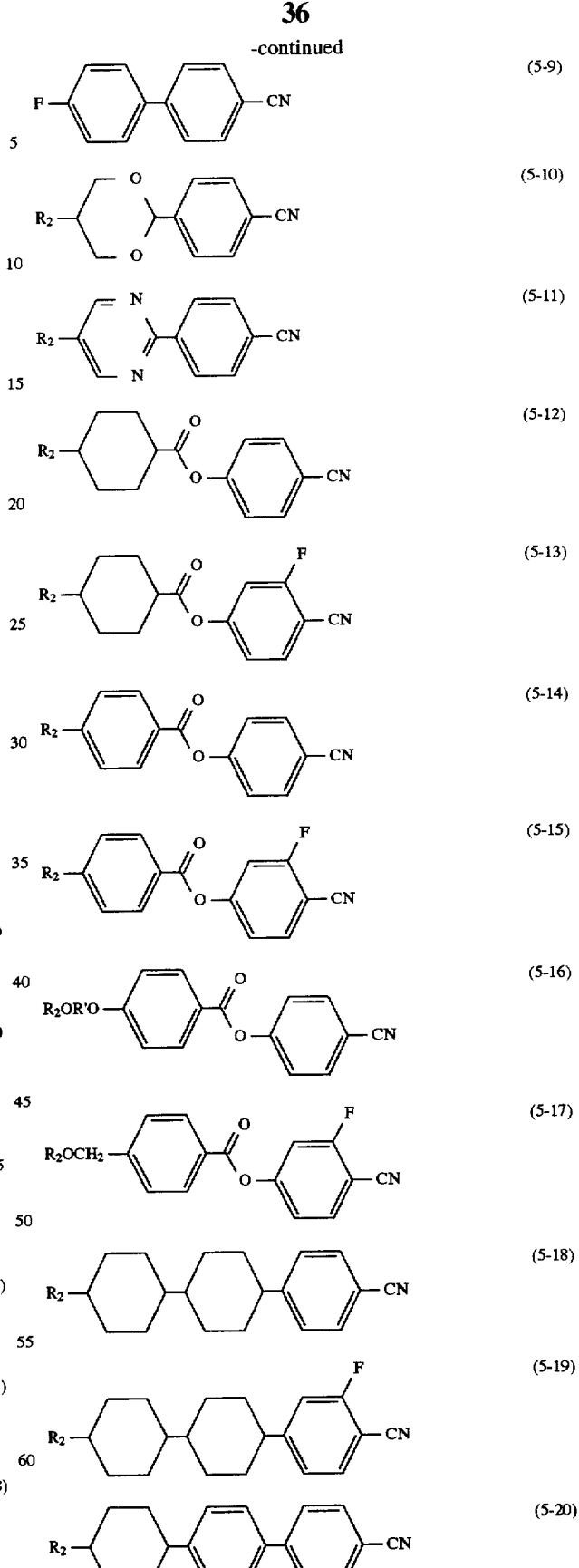

-continued
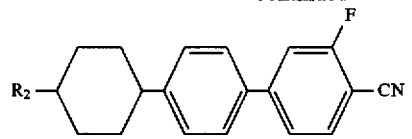 (5-21)
 (5-22)
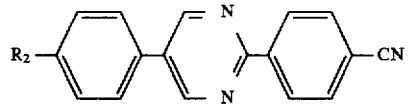 (5-23)
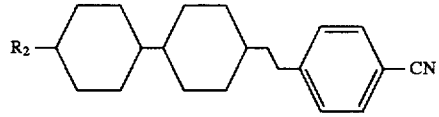 (5-24)
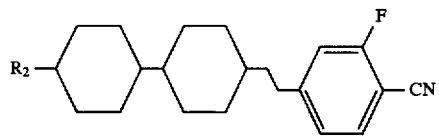 (5-25)
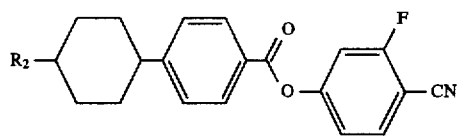 (5-26)
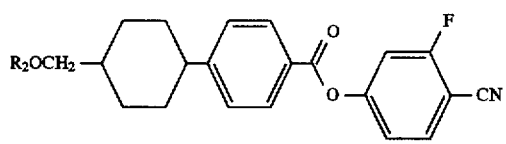 (5-27)
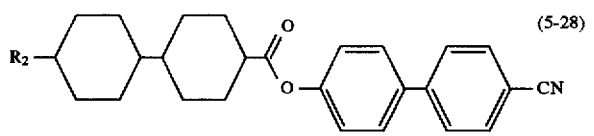 (5-28)
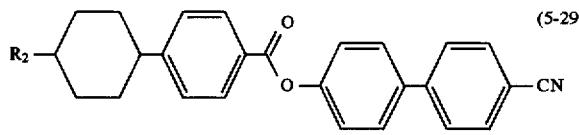 (5-29)
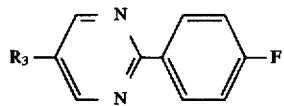 (6-1)
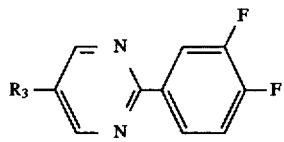 (6-2)
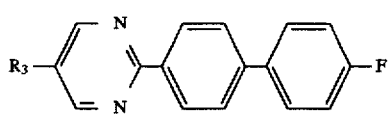 (6-3)
-continued
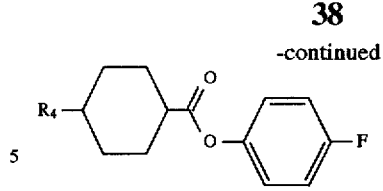 (7-1)
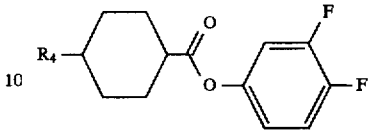 (7-2)
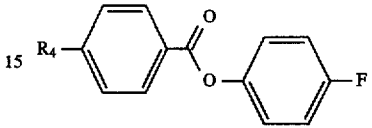 (7-3)
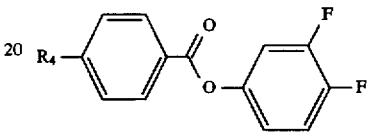 (7-4)
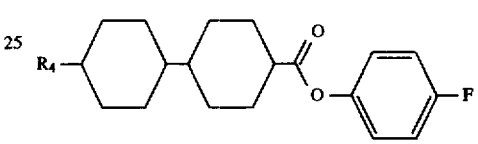 (7-5)
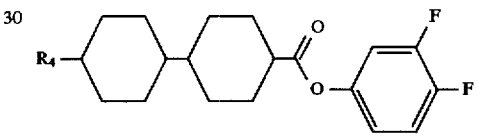 (7-6)
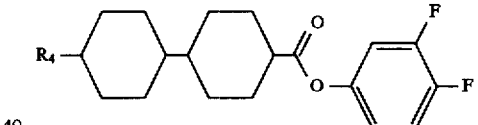 (7-7)
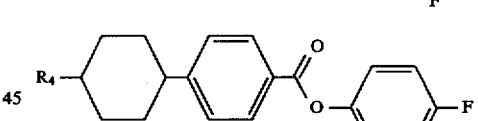 (7-8)
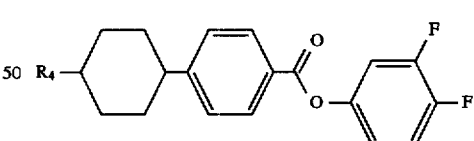 (7-9)
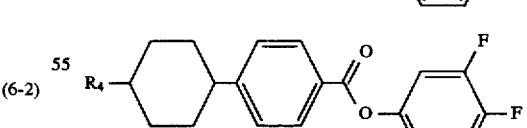 (7-10)
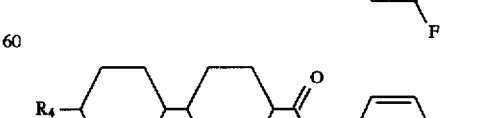 (7-11)

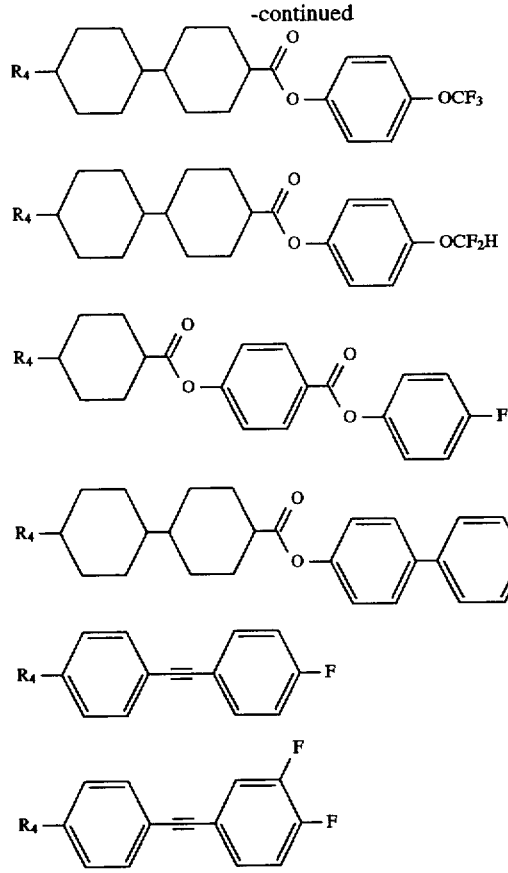

The compounds expressed by the formulas (5) to (7) exhibit a positive and large dielectric anisotropy value and are used as composition component, particularly in order to reduce the threshold voltage. Further, the compounds are used for adjusting the viscosity and the optical anisotropy value and for broadening the liquid crystal phase temperature range, and further for improving the steepness.

Further, as preferable examples of compounds included in those of the formulas (8) and (9), among those of the second B component, the following (8-1) to (8-16) and (9-1) to (9-16) can be mentioned:

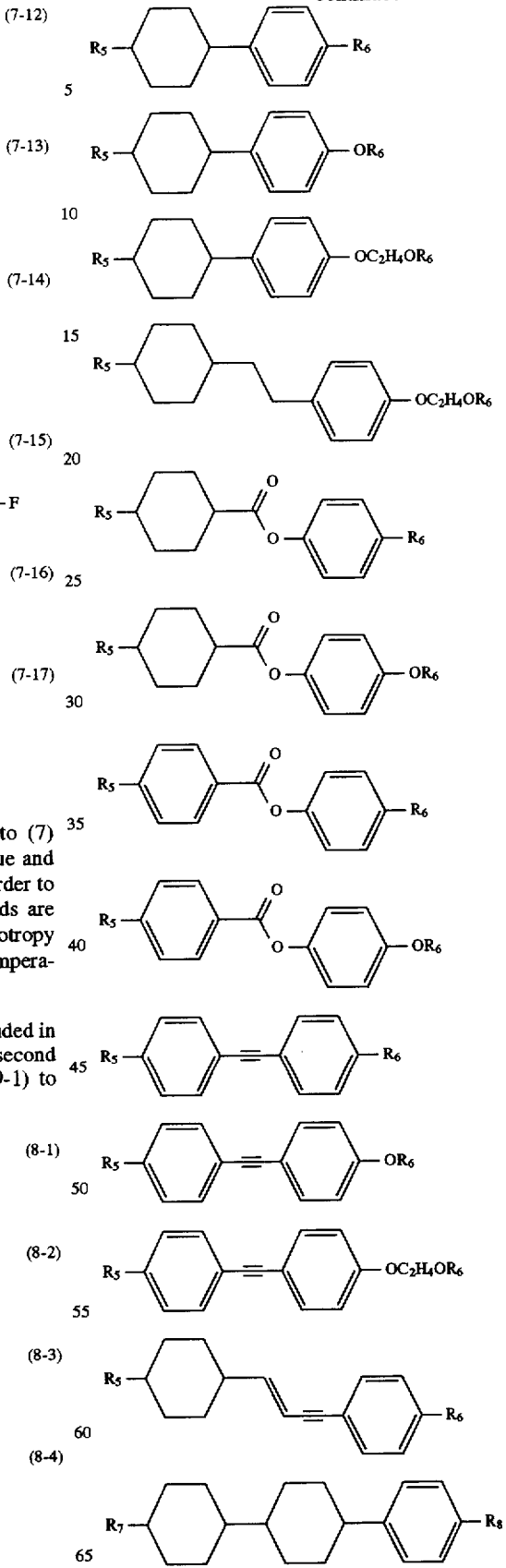

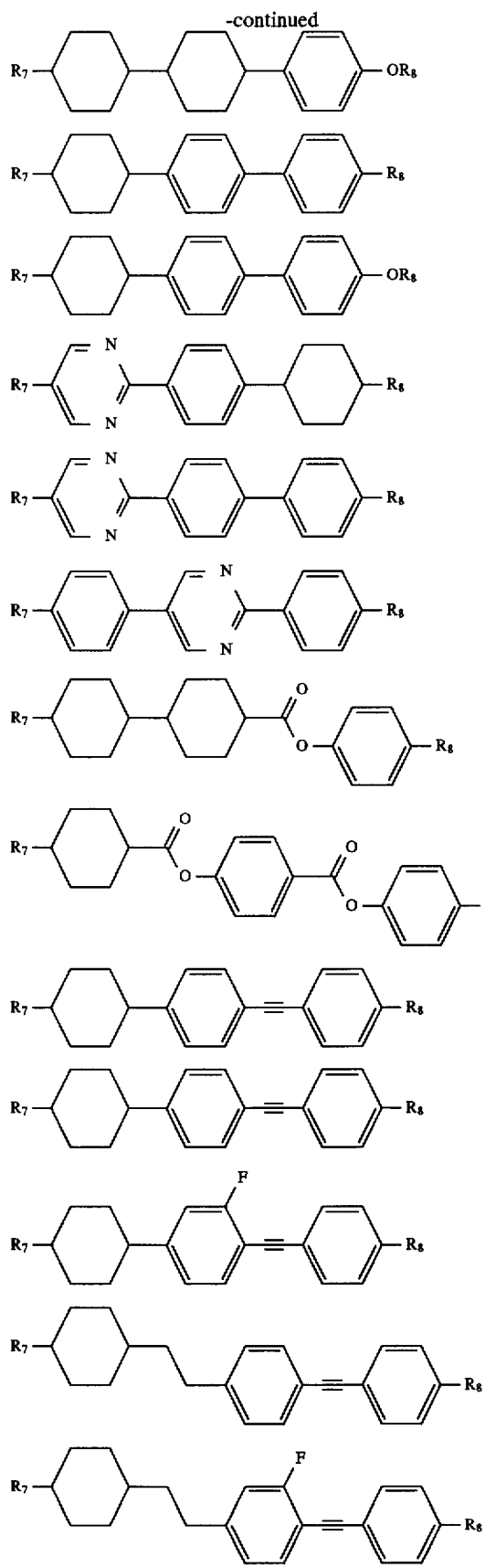

The compounds expressed by the formulas (8) and (9) exhibit a negative or weakly positive dielectric anisotropy value, and among these compounds, those expressed by the formula (8) are used as a composition component, mainly for lowering the viscosity and adjusting the optical anisotropy value, and those expressed by the formula (9) are used for broadening the liquid crystal phase temperature range and/or for adjusting the optical anisotropy value.

The compounds expressed by the formulas (5) to (9) are indispensable for preparing liquid crystal compositions, particularly for STN type display mode or usual TN type display mode. As to the quantity of these compounds used, when liquid crystal compositions for usual STN type display mode or TN type display mode are prepared, a range of 1 to 99% by weight based upon the total quantity of the liquid crystal compositions is suitable, and a range of 10 to 97% is preferred and that of 40 to 95% by weight is more preferred.

The liquid crystal composition provided by the present invention is preferred to contain at least one member of the liquid crystal compound expressed by the formula (1) in a proportion of 0.1 to 99% by weight, for exhibiting superior characteristics.

The liquid crystal composition is generally prepared according to a known process, for example according to a process wherein various components are mutually dissolved at high temperatures. Further, if necessary, by adding a suitable additive, improvement is made depending upon the aimed use applications and the composition is optimized. Such additives are well known by preson of ordinary skill in the art and described in literatures, etc. in details. Usually, a chiral dopant having an effect of inducing the helical structure to thereby adjust a necessary twist angle and prevent the reverse twist, is added.

Further, when a dichroic pigment such as those of mellocyanine group, styryl group, azo group, azomethine group, azoxy group, quinophthalone group, anthraquinone group, tetrazine group, etc. is added, the resulting composition can be also used as that of GH mode. The composition of the present invention is usable for NCAP prepared by microcapsulating nematic liquid crystals, polymer-dispersion type, liquid crystal display element prepared by forming three-dimensional, reticulated high molecules in liquid crystals (PDLCD), for example, polymer network liquid crystal display element (PNLCD) and besides, as liquid crystal compositions for birefringence control (ECB) mode or DS mode.

As liquid crystal composition examples containing the compound of the present invention, the following ones can be mentioned:

In addition, the numbers of the compounds are the same as those shown in the below-mentioned Examples.

Composition example 1

| Structure | Amount |
|---|---|
| $C_3H_7OCH_2$—〔benzene〕—COO—〔2,6-difluoro-4-CN-benzene〕 (No. 4) | 4 wt. % |
| $C_4H_9OCH_2$—〔benzene〕—COO—〔2,6-difluoro-4-CN-benzene〕 (No. 5) | 4 wt. % |
| $C_5H_{11}OCH_2$—〔benzene〕—COO—〔2,6-difluoro-4-CN-benzene〕 (No. 1) | 4 wt. % |
| $C_2H_5$—〔cyclohexyl〕—〔cyclohexyl〕—〔3,4-difluorobenzene〕 | 6 wt. % |
| $C_3H_7$—〔cyclohexyl〕—〔cyclohexyl〕—〔3,4-difluorobenzene〕 | 6 wt. % |
| $C_5H_{11}$—〔cyclohexyl〕—〔cyclohexyl〕—〔3,4-difluorobenzene〕 | 6 wt. % |
| $C_3H_7$—〔cyclohexyl〕—〔cyclohexyl〕—COO—〔4-F-benzene〕 | 5 wt. % |
| $C_5H_{11}$—〔cyclohexyl〕—〔cyclohexyl〕—COO—〔4-F-benzene〕 | 5 wt. % |
| $C_3H_7$—〔cyclohexyl〕—COO—〔4-F-benzene〕 | 4 wt. % |
| $C_3H_7$—〔cyclohexyl〕—〔cyclohexyl〕—$COOCH_3$ | 12 wt. % |
| $C_3H_7$—〔cyclohexyl〕—COO—〔benzene〕—$OC_4H_9$ | 10 wt. % |

| Structure | Amount |
|---|---|
| C₂H₅–(pyrimidine)–Ph–Cy–C₃H₇ | 6 wt. % |
| C₃H₇–(pyrimidine)–Ph–Cy–C₃H₇ | 5 wt. % |
| C₄H₉–(pyrimidine)–Ph–Cy–C₃H₇ | 5 wt. % |
| C₃H₇–Cy–Ph–OC₂H₅ | 10 wt. % |
| C₃H₇–Cy–Cy–Ph–CH₃ | 8 wt. % |

Composition example 2

| Structure | Amount |
|---|---|
| C₃H₇OCH₂–Ph–COO–Ph(3,5-F₂)(4-CF₃)  (No. 8) | 5 wt. % |
| C₄H₉OCH₂–Ph–COO–Ph(3,5-F₂)(4-CF₃)  (No. 9) | 5 wt. % |
| C₅H₁₁OCH₂–Ph–COO–Ph(3,5-F₂)(4-CF₃)  (No. 10) | 5 wt. % |
| C₂H₅–Cy–Cy–Ph(3,4-F₂) | 5 wt. % |
| C₃H₇–Cy–Cy–Ph(3,4-F₂) | 5 wt. % |
| C₅H₁₁–Cy–Cy–Ph(3,4-F₂) | 5 wt. % |

| | |
|---|---|
| 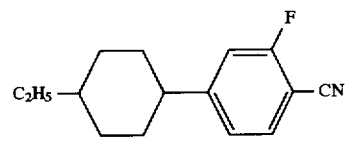 | 10 wt. % |
| 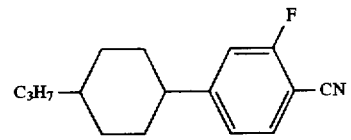 | 12 wt. % |
| 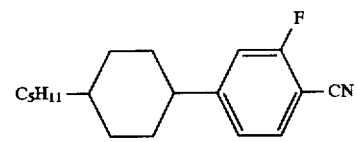 | 11 wt. % |
| 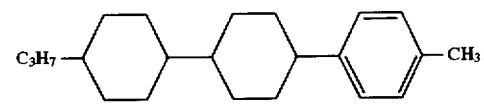 | 8 wt. % |
| 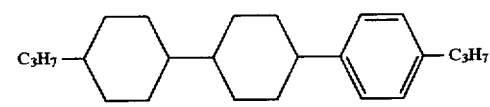 | 4 wt. % |
| 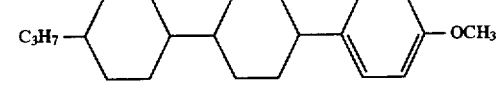 | 4 wt. % |
| 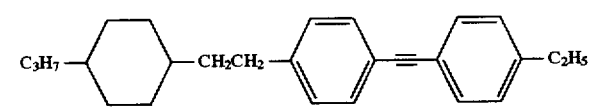 | 3 wt. % |
| 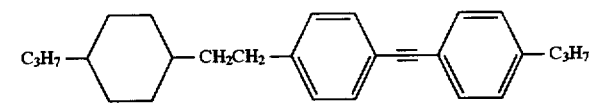 | 3 wt. % |
| 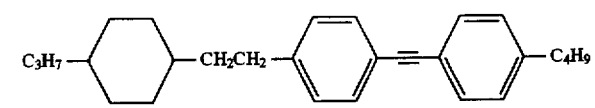 | 3 wt. % |
| 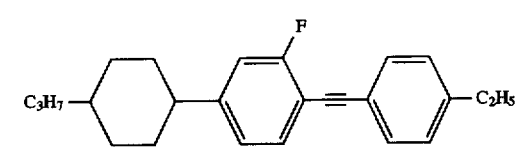 | 4 wt. % |
| 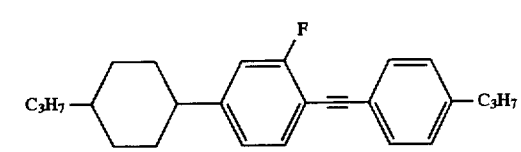 | 4 wt. % |
| 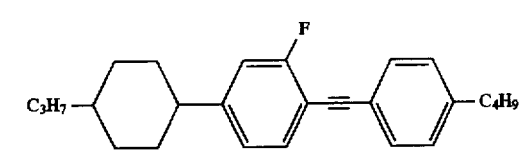 | 4 wt. % |

-continued
Composition example 3
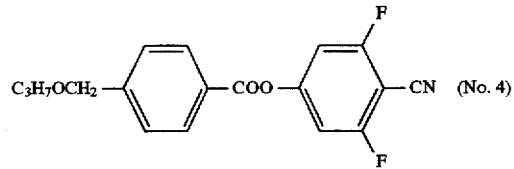 (No. 4)  10 wt. %
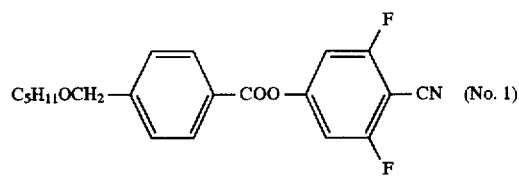 (No. 1)  5 wt. %
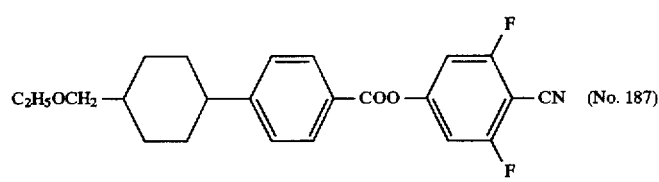 (No. 187)  8 wt. %
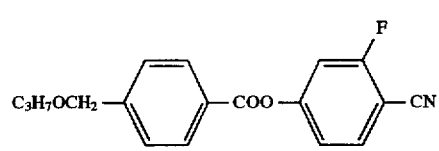  10 wt. %
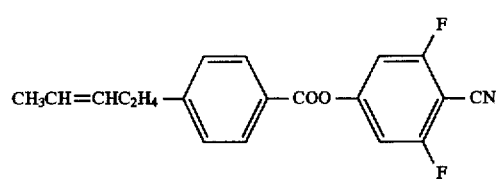  15 wt. %
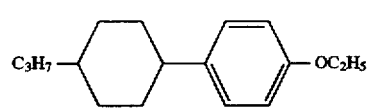  8 wt. %
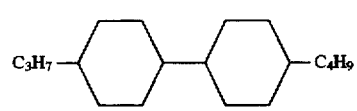  5 wt. %
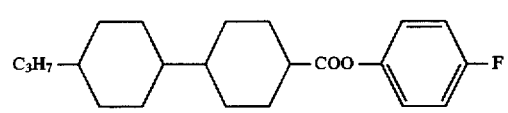  5 wt. %
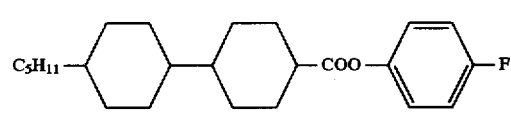  4 wt. %
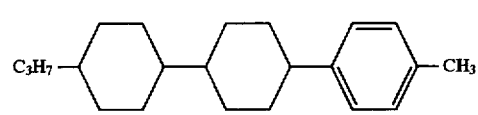  6 wt. %
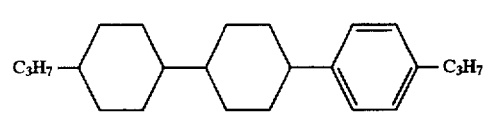  6 wt. %

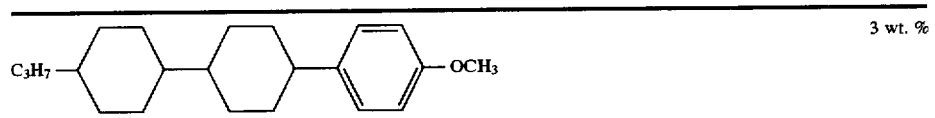 3 wt. %
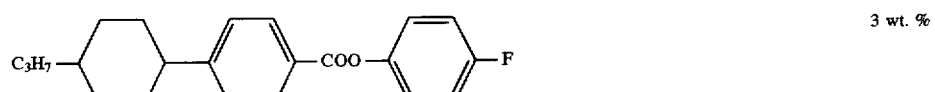 3 wt. %
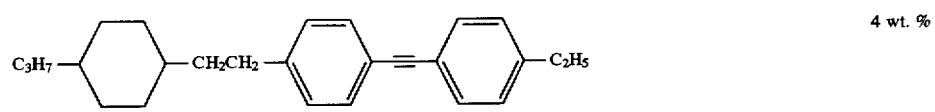 4 wt. %
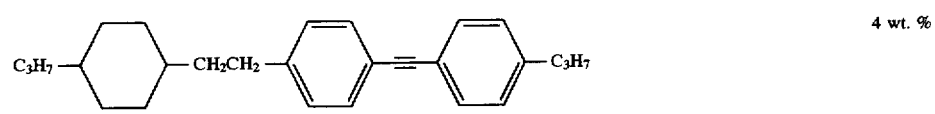 4 wt. %
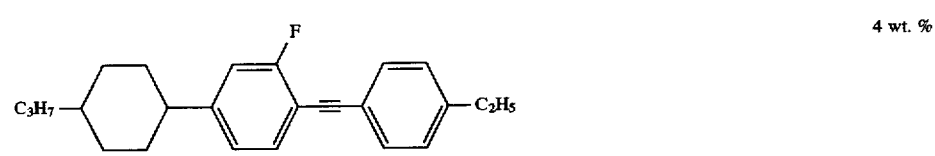 4 wt. %
Composition example 4
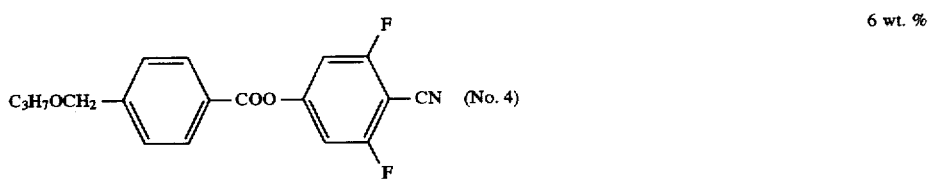 6 wt. %
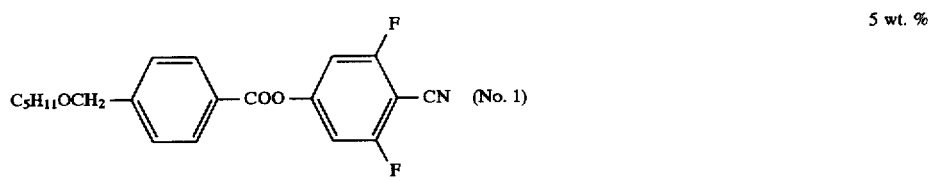 5 wt. %
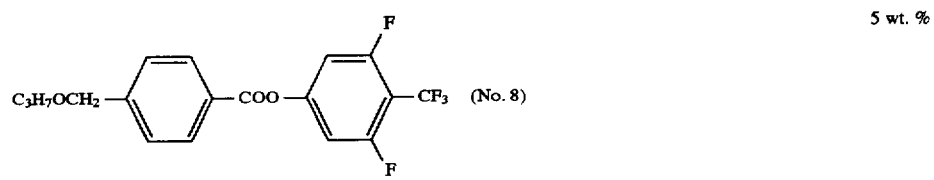 5 wt. %
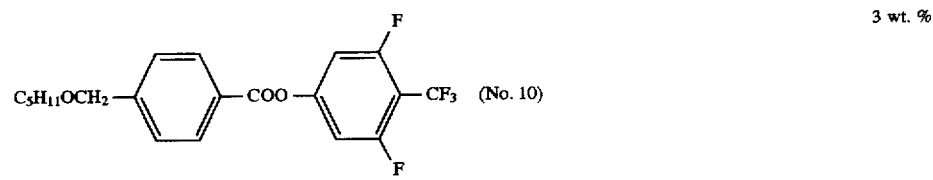 3 wt. %
 6 wt. %
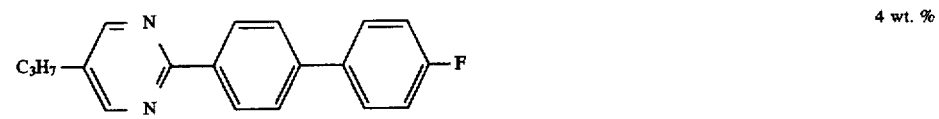 4 wt. %

| | |
|---|---|
| 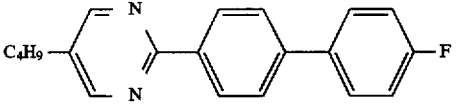 | 4 wt. % |
| 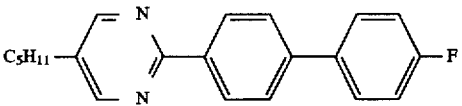 | 4 wt. % |
| 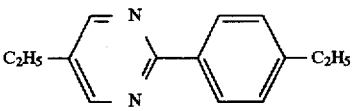 | 5 wt. % |
| 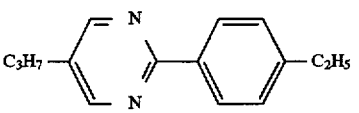 | 5 wt. % |
| 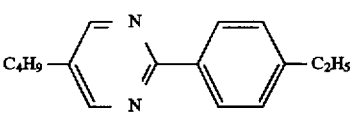 | 5 wt. % |
| 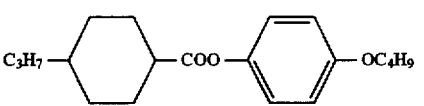 | 5 wt. % |
| 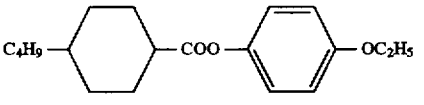 | 5 wt. % |
| 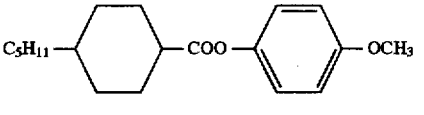 | 5 wt. % |
| 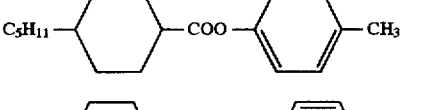 | 6 wt. % |
| 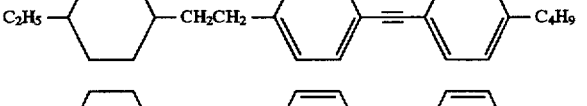 | 4 wt. % |
| 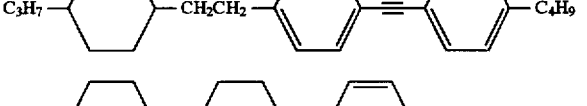 | 4 wt. % |
| 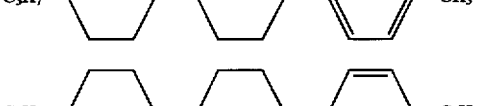 | 5 wt. % |
| 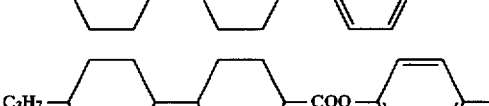 | 5 wt. % |
|  | 3 wt. % |

| Structure | Amount |
|---|---|
| C₅H₁₁–[Cy]–[Cy]–COO–[Ph]–[Ph]–CN | 3 wt. % |
| C₃H₇–[Cy]–[Ph]–COO–[Ph]–[Ph]–CN | 3 wt. % |

Composition example 5

| Structure | Amount |
|---|---|
| C₂H₅OCH₂–[Cy]–[Ph]–COO–[Ph(3,5-F₂)]–CN (No. 187) | 8 wt. % |
| C₃H₇OCH₂–[Ph]–COO–[Ph]–[Ph(3,5-F₂)]–CN (No. 108) | 5 wt. % |
| C₄H₉OCH₂–[Ph]–COO–[Ph]–[Ph(3,5-F₂)]–CN (No. 109) | 5 wt. % |
| C₅H₁₁OCH₂–[Ph]–COO–[Ph]–[Ph(3,5-F₂)]–CN (No. 110) | 5 wt. % |
| C₂H₅–[Cy]–[Ph(3-F)]–CN | 8 wt. % |
| C₃H₇–[Cy]–[Ph(3-F)]–CN | 4 wt. % |
| C₃H₇–[Pyrimidine]–[Ph(3,4-F₂)] | 10 wt. % |
| CH₃O–[Ph]–COO–[Ph]–C₂H₅ | 3 wt. % |
| C₃H₇–[Cy]–[Cy]–C₄H₉ | 4 wt. % |

| Structure | Amount |
|---|---|
| C₃H₇—[Cy]—[Ph]—OC₂H₅ | 3 wt. % |
| C₂H₅—[Cy]—[Cy]—[Ph(F)]—CN | 6 wt. % |
| C₃H₇—[Cy]—[Cy]—[Ph(F)]—CN | 6 wt. % |
| C₅H₁₁—[Cy]—[Cy]—COO—[Ph]—F | 4 wt. % |
| C₃H₇—[Cy]—[Ph(F)]—C≡C—[Ph]—C₂H₅ | 5 wt. % |
| C₃H₇—[Cy]—[Ph(F)]—C≡C—[Ph]—C₃H₇ | 5 wt. % |
| C₃H₇—[Cy]—[Ph(F)]—C≡C—[Ph]—C₄H₉ | 5 wt. % |
| C₃H₇—[Cy]—[Cy]—[Ph]—CH₃ | 6 wt. % |
| C₃H₇—[Cy]—[Cy]—[Ph]—OCH₃ | 4 wt. % |
| C₃H₇—[Cy]—[Cy]—[Ph]—C₃H₇ | 4 wt. % |

Composition example 6

| Structure | Amount |
|---|---|
| C₃H₇OCH₂—[Cy]—[Ph]—COO—[Ph(F,F)]—CF₃  (No. 193) | 6 wt. % |

-continued

| Structure | Amount |
|---|---|
| C₃H₇OCH₂—⟨C₆H₄⟩—COO—⟨C₆H₄⟩—⟨C₆H₂(F)(F)⟩—CF₃  (No. 115) | 6 wt. % |
| C₃H₇OCH₂—⟨C₆H₄⟩—COO—⟨C₆H₄⟩—⟨C₆H₄⟩—CF₃  (No. 341) | 5 wt. % |
| C₂H₅—⟨C₆H₄⟩—⟨C₆H₄⟩—CN | 8 wt. % |
| CH₃OCH₂—⟨Cy⟩—⟨C₆H₄⟩—CN | 10 wt. % |
| C₂H₅OCH₂—⟨Cy⟩—⟨C₆H₄⟩—CN | 8 wt. % |
| C₂H₅—⟨Cy⟩—COO—⟨C₆H₄⟩—CN | 3 wt. % |
| C₃H₇—⟨dioxane⟩—⟨C₆H₄⟩—CN | 3 wt. % |
| C₅H₁₁—⟨pyrimidine⟩—⟨C₆H₄⟩—F | 4 wt. % |
| C₃H₇—⟨pyrimidine⟩—⟨C₆H₄⟩—⟨C₆H₄⟩—F | 5 wt. % |
| C₃H₇—⟨pyrimidine⟩—⟨C₆H₄⟩—OCH₃ | 3 wt. % |
| C₂H₅—⟨pyrimidine⟩—⟨C₆H₄⟩—C₂H₅ | 3 wt. % |
| C₃H₇—⟨pyrimidine⟩—⟨C₆H₄⟩—C₂H₅ | 3 wt. % |
| C₄H₉—⟨pyrimidine⟩—⟨C₆H₄⟩—C₂H₅ | 3 wt. % |

-continued
 5 wt. %
 6 wt. %
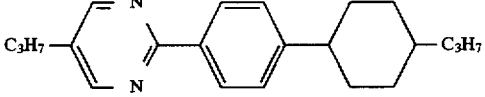 5 wt. %
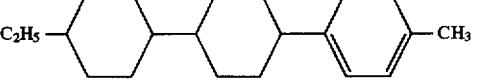 4 wt. %
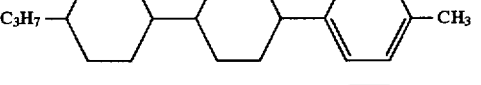 4 wt. %
 6 wt. %
Composition example 7
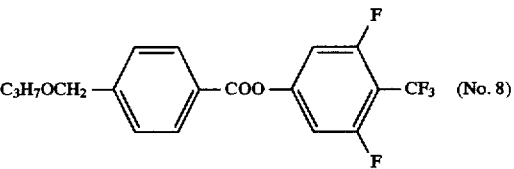 (No. 8) 6 wt. %
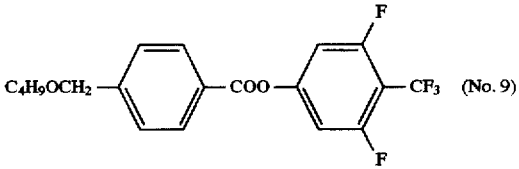 (No. 9) 6 wt. %
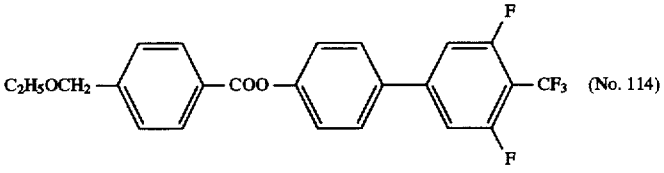 (No. 114) 4 wt. %
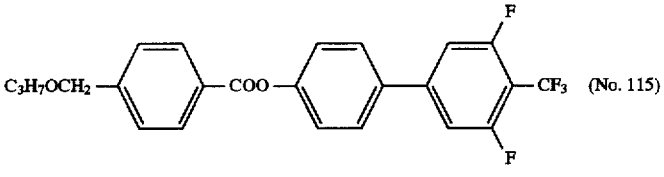 (No. 115) 4 wt. %
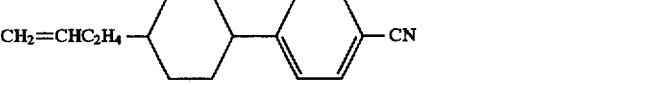 10 wt. %
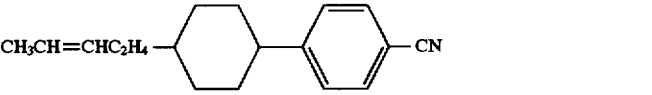 10 wt. %

| | |
|---|---|
| 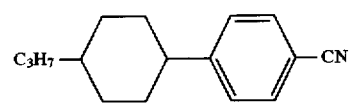 | 5 wt. % |
| 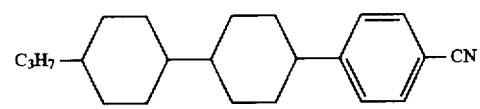 | 5 wt. % |
| 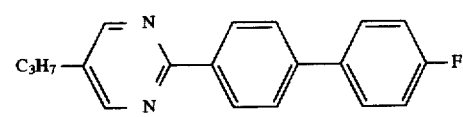 | 6 wt. % |
| 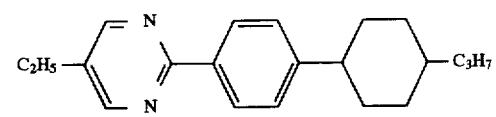 | 4 wt. % |
| 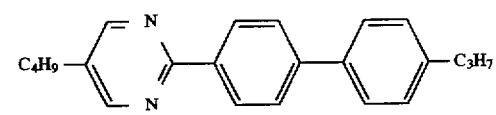 | 5 wt. % |
| 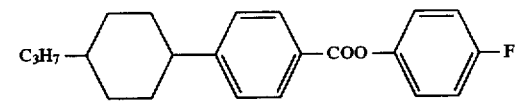 | 3 wt. % |
| 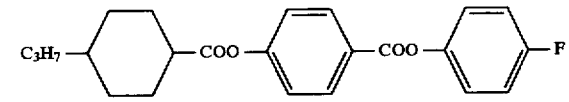 | 3 wt. % |
| 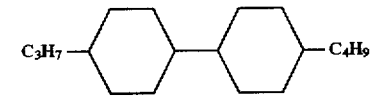 | 10 wt. % |
| 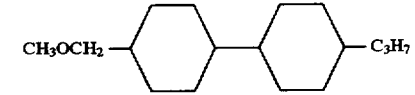 | 4 wt. % |
| 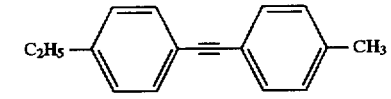 | 3 wt. % |
| 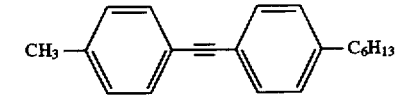 | 6 wt. % |
| 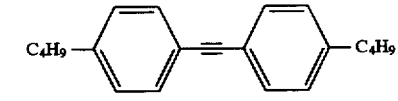 | 3 wt. % |
| 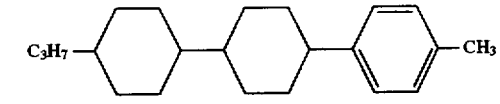 | 3 wt. % |

Composition example 8
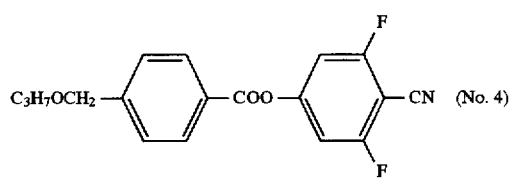 (No. 4)     10 wt. %
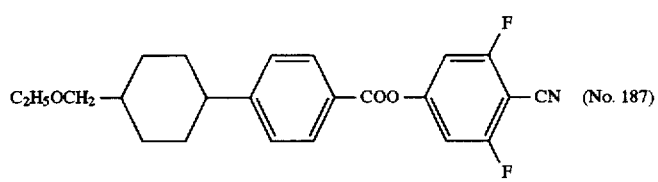 (No. 187)     9 wt. %
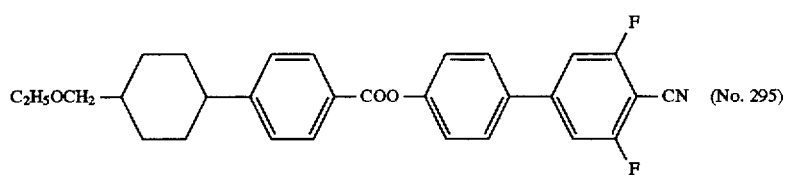 (No. 295)     5 wt. %
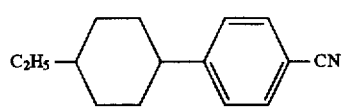     5 wt. %
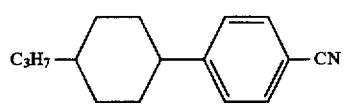     15 wt. %
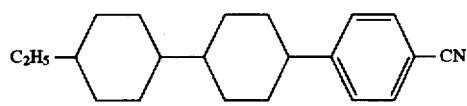     5 wt. %
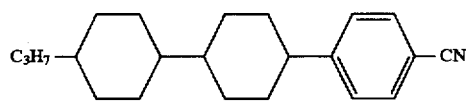     5 wt. %
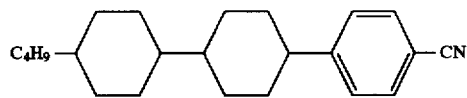     5 wt. %
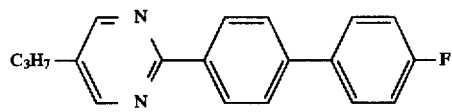     10 wt. %
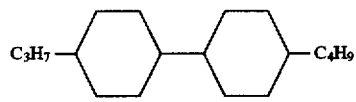     8 wt. %
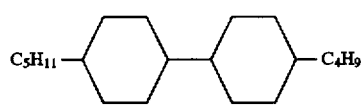     3 wt. %
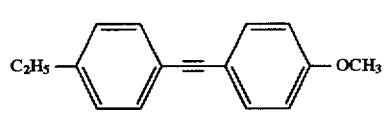     4 wt. %

-continued
  4 wt. %
  4 wt. %
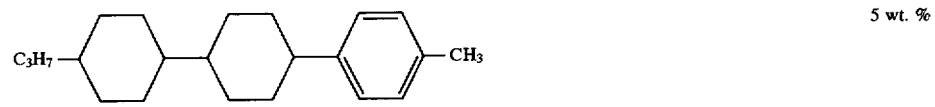  5 wt. %
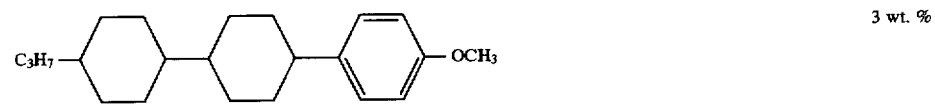  3 wt. %
Composition example 9
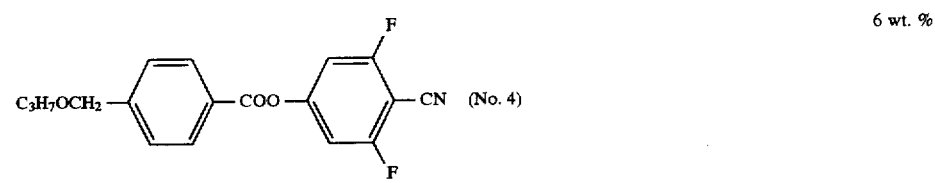  6 wt. %
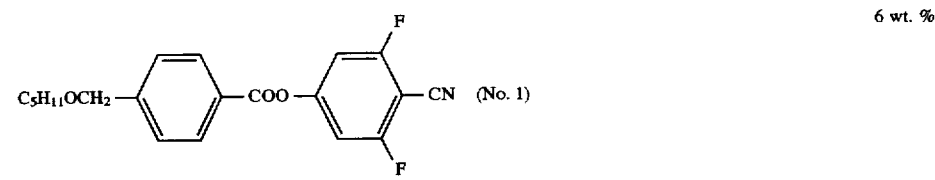  6 wt. %
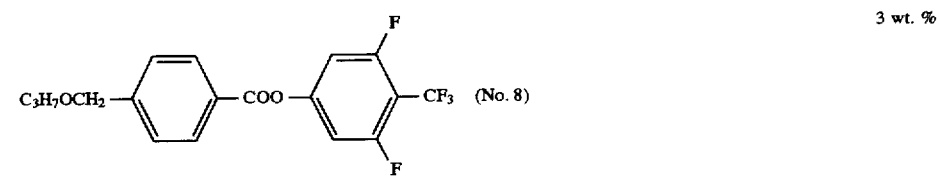  3 wt. %
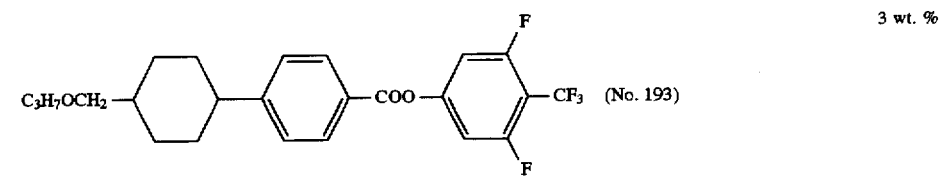  3 wt. %
  8 wt. %
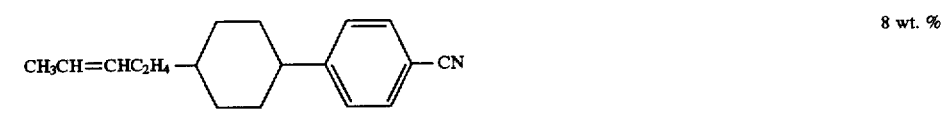  8 wt. %
  15 wt. %
  8 wt. %

-continued

| Structure | Amount |
|---|---|
| CH₃OCH₂–[Cy]–[Ph]–CN | 4 wt. % |
| C₂H₅OCH₂–[Cy]–[Ph]–CN | 4 wt. % |
| C₃H₇–[Cy]–[Cy]–[Ph]–F | 2 wt. % |
| C₃H₇–[Cy]–[Ph]–[Ph]–F | 2 wt. % |
| C₃H₇–[Cy]–[Cy]–C₄H₉ | 6 wt. % |
| C₂H₅–[Ph]–C≡C–[Ph]–OCH₃ | 6 wt. % |
| C₃H₇–[Cy]–[Cy]–[Ph]–OCH₃ | 3 wt. % |
| C₃H₇–[Cy]–[Cy]–[Ph]–CH₃ | 5 wt. % |
| C₃H₇–[Cy]–[Cy]–[Ph]–C₃H₇ | 8 wt. % |
| C₃H₇–[Cy]–[Ph(F)]–CH=CH–[Ph]–C₂H₅ | 3 wt. % |

Composition example 10

| Structure | Amount |
|---|---|
| C₃H₇OCH₂–[Ph]–COO–[Ph(F,F)]–CF₃  (No. 8) | 6 wt. % |
| C₅H₁₁OCH₂–[Ph]–COO–[Ph(F,F)]–CF₃  (No. 10) | 5 wt. % |

-continued

C₃H₇OCH₂—[cyclohexyl]—COO—[phenyl]—[phenyl(3,5-F, 4-CF₃)]  (No. 115)   6 wt. %

C₄H₉OCH₂—[cyclohexyl]—[phenyl]—COO—[phenyl]—[phenyl(3,5-F, 4-CF₃)]  (No. 301)   3 wt. %

C₇H₁₅—[cyclohexyl]—[phenyl-4-F]   3 wt. %

C₅H₁₁—[cyclohexyl]—CH₂CH₂—[phenyl-3,4-F]   4 wt. %

C₂H₅—[cyclohexyl]—[cyclohexyl]—[phenyl-3,4-F]   10 wt. %

C₃H₇—[cyclohexyl]—[cyclohexyl]—[phenyl-3,4-F]   10 wt. %

C₅H₁₁—[cyclohexyl]—[cyclohexyl]—[phenyl-3,4-F]   10 wt. %

C₂H₅—[cyclohexyl]—CH₂CH₂—[cyclohexyl]—[phenyl-3,4-F]   4 wt. %

C₃H₇—[cyclohexyl]—CH₂CH₂—[cyclohexyl]—[phenyl-3,4-F]   2 wt. %

C₅H₁₁—[cyclohexyl]—CH₂CH₂—[cyclohexyl]—[phenyl-3,4-F]   4 wt. %

C₂H₅—[cyclohexyl]—[phenyl]—[phenyl-3,4-F]   4 wt. %

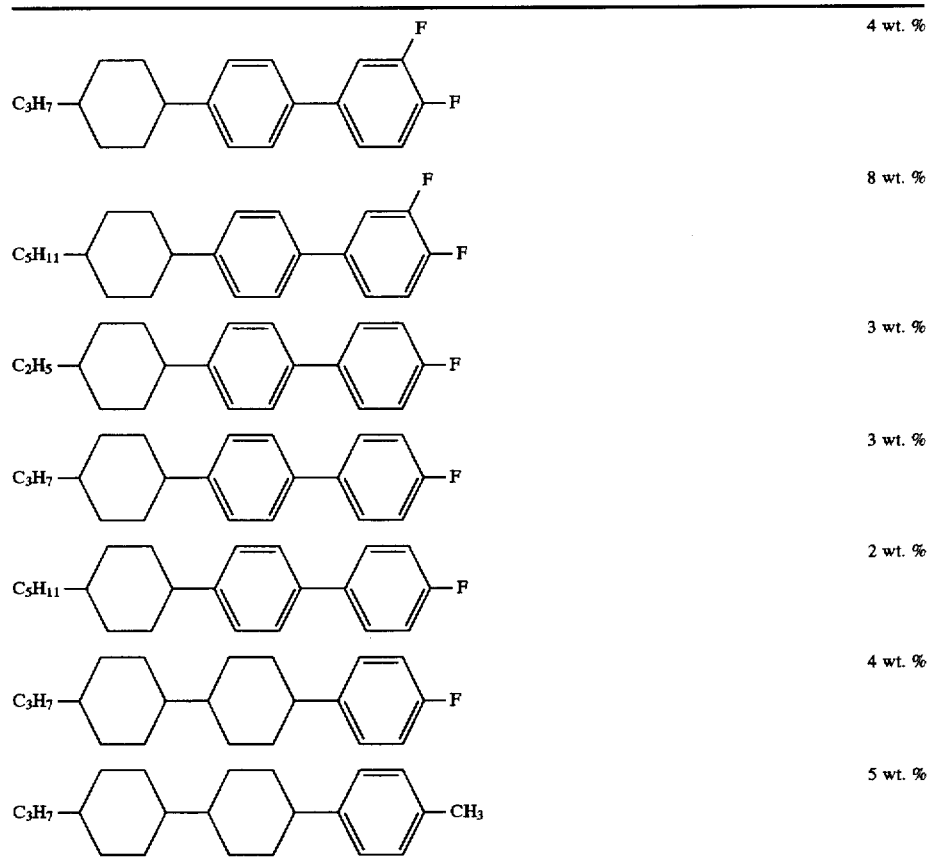
| | |
|---|---|
| | 4 wt. % |
| | 8 wt. % |
| | 3 wt. % |
| | 3 wt. % |
| | 2 wt. % |
| | 4 wt. % |
| | 5 wt. % |
Composition example 11
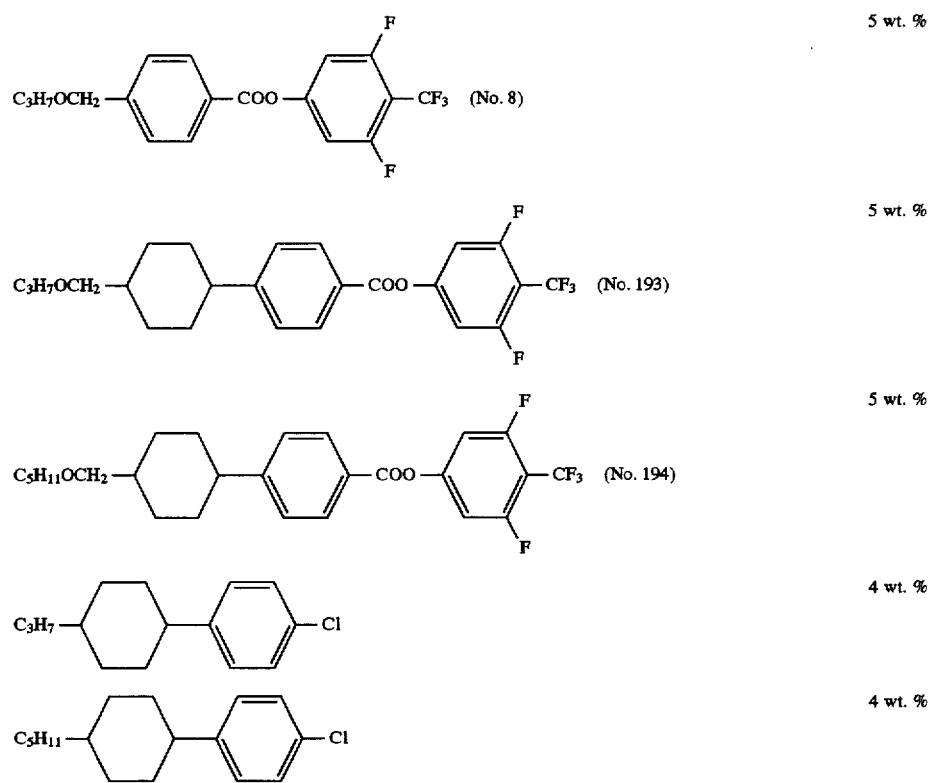
| | |
|---|---|
| (No. 8) | 5 wt. % |
| (No. 193) | 5 wt. % |
| (No. 194) | 5 wt. % |
| | 4 wt. % |
| | 4 wt. % |

-continued
 5 wt. %
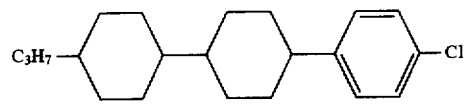 6 wt. %
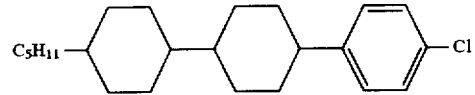 5 wt. %
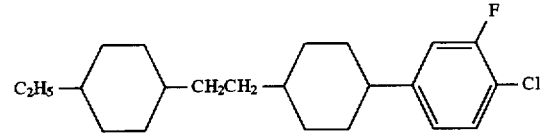 4 wt. %
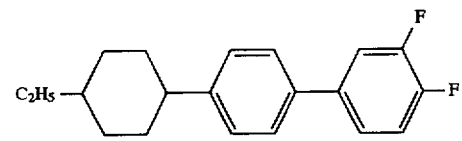 6 wt. %
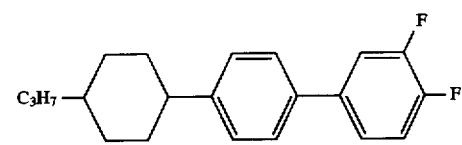 6 wt. %
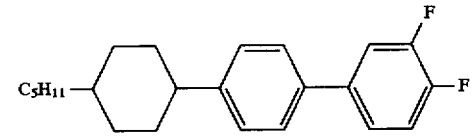 12 wt. %
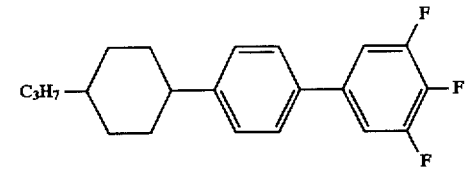 13 wt. %
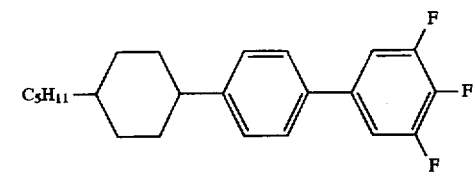 13 wt. %
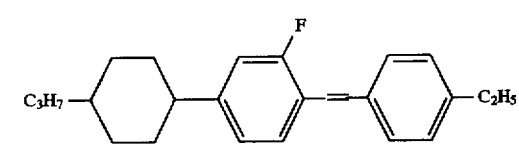 3 wt. %
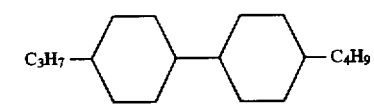 4 wt. %

Composition example 12

| Structure | Amount |
|---|---|
| C₂H₅OCH₂–[Cy]–[Ph]–COO–[Ph(3,5-F₂)]–CN (No. 187) | 8 wt. % |
| C₃H₇OCH₂–[Ph]–COO–[Ph]–[Ph(3,5-F₂)]–CN (No. 108) | 6 wt. % |
| C₅H₁₁OCH₂–[Ph]–COO–[Ph]–[Ph(3,5-F₂)]–CN (No. 110) | 6 wt. % |
| C₇H₁₅–[Cy]–[Ph(3,4-F₂)] | 7 wt. % |
| C₂H₅–[Cy]–[Cy]–[Ph(3,4-F₂)] | 8 wt. % |
| C₃H₇–[Cy]–[Cy]–[Ph(3,4-F₂)] | 8 wt. % |
| C₅H₁₁–[Cy]–[Cy]–[Ph(3,4-F₂)] | 8 wt. % |
| C₂H₅–[Cy]–CH₂CH₂–[Cy]–[Ph(3,4-F₂)] | 6 wt. % |
| C₃H₇–[Cy]–CH₂CH₂–[Cy]–[Ph(3,4-F₂)] | 3 wt. % |
| C₅H₁₁–[Cy]–CH₂CH₂–[Cy]–[Ph(3,4-F₂)] | 6 wt. % |

-continued
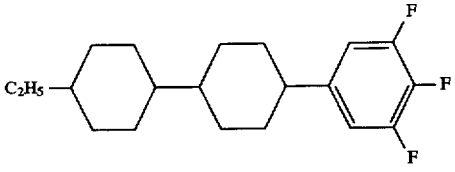 3 wt. %
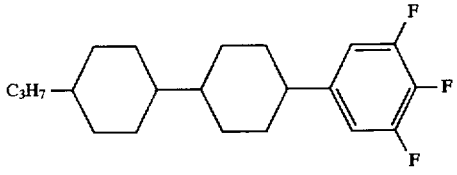 3 wt. %
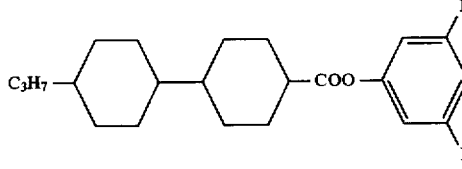 4 wt. %
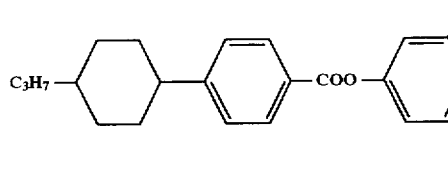 3 wt. %
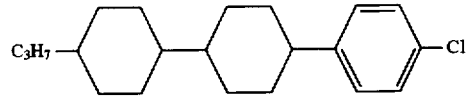 5 wt. %
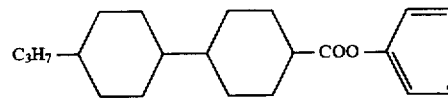 3 wt. %
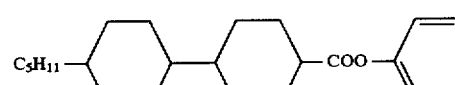 3 wt. %
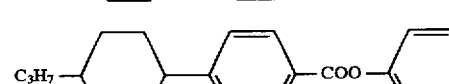 3 wt. %
 3 wt. %
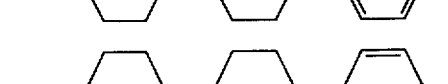 4 wt. %
Composition exmaple 13
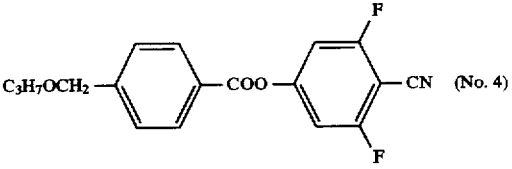 3 wt. %

-continued

| Structure | Amount |
|---|---|
| C₅H₁₁OCH₂–C₆H₄–COO–C₆H₂(F)(F)–CN (No. 1) | 3 wt. % |
| C₃H₇OCH₂–C₆H₄–COO–C₆H₂(F)(F)–CF₃ (No. 8) | 5 wt. % |
| C₅H₁₁OCH₂–C₆H₄–COO–C₆H₂(F)(F)–CF₃ (No. 10) | 4 wt. % |
| C₇H₁₅–Cy–C₆H₃(F)–F | 5 wt. % |
| C₂H₅–Cy–Cy–C₆H₃(F)–F | 11 wt. % |
| C₃H₇–Cy–Cy–C₆H₃(F)–F | 11 wt. % |
| C₅H₁₁–Cy–Cy–C₆H₃(F)–F | 11 wt. % |
| C₂H₅–Cy–C₆H₄–C₆H₃(F)–F | 5 wt. % |
| C₃H₇–Cy–C₆H₄–C₆H₃(F)–F | 5 wt. % |
| C₅H₁₁–Cy–C₆H₄–C₆H₃(F)–F | 10 wt. % |

-continued
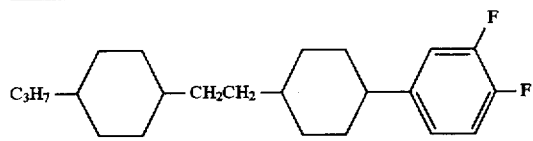 3 wt. %
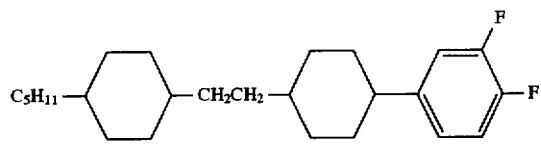 3 wt. %
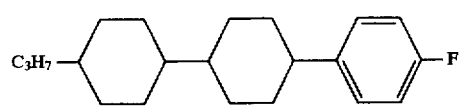 4 wt. %
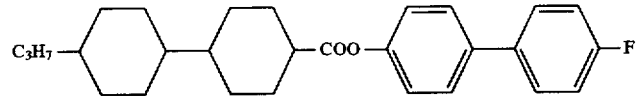 4 wt. %
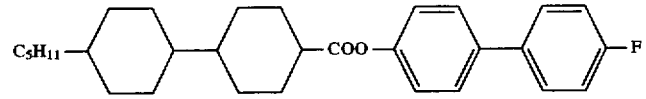 3 wt. %
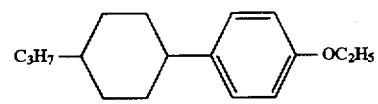 3 wt. %
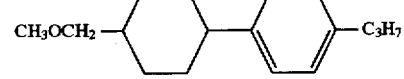 2 wt. %
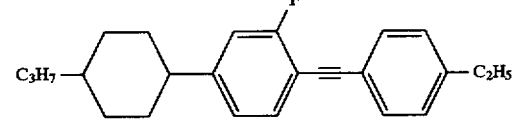 5 wt. %
Composition example 14
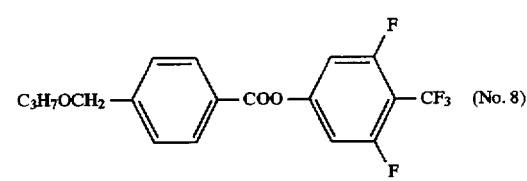 (No. 8) 5 wt. %
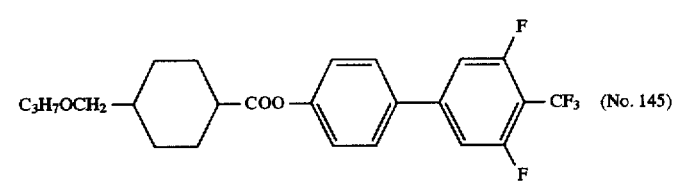 (No. 145) 4 wt. %
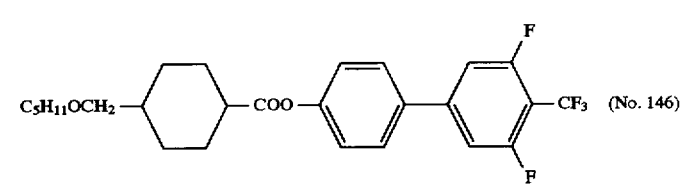 (No. 146) 4 wt. %

-continued

| Structure | Amount |
|---|---|
| C₃H₇OCH₂–⌬–COO–⌬–⌬–CF₃ (No. 341) | 4 wt. % |
| C₃H₇OCH₂–⬡–⌬–COO–⌬–⌬–CF₃ (No. 356) | 2 wt. % |
| C₇H₁₅–⬡–⌬(3,4,5-F₃) | 7 wt. % |
| C₃H₇–⬡–⬡–⌬(3,4,5-F₃) | 8 wt. % |
| C₄H₉–⬡–⬡–⌬(3,4,5-F₃) | 4 wt. % |
| C₃H₇–⬡–CH₂CH₂–⬡–⌬(3,4,5-F₃) | 10 wt. % |
| C₄H₉–⬡–CH₂CH₂–⬡–⌬(3,4,5-F₃) | 8 wt. % |
| C₅H₁₁–⬡–CH₂CH₂–⬡–⌬(3,4,5-F₃) | 8 wt. % |
| C₃H₇–⬡–⬡–CH₂CH₂–⌬(3,4,5-F₃) | 12 wt. % |
| C₅H₁₁–⬡–⬡–CH₂CH₂–⌬(3,4-F₂) | 8 wt. % |

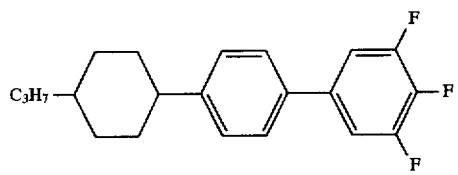 8 wt. %
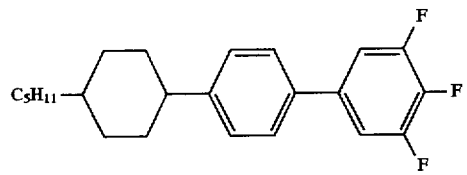 8 wt. %
Composition example 15
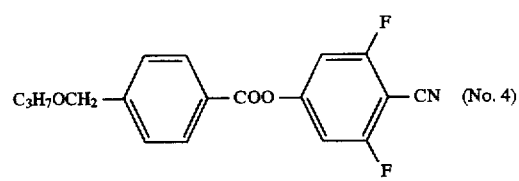 8 wt. %
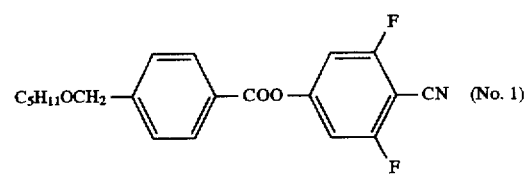 6 wt. %
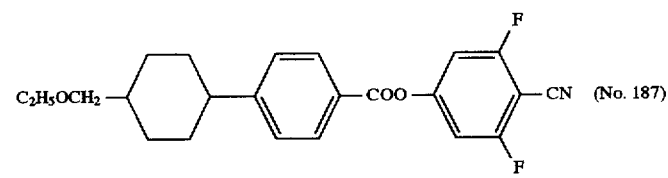 5 wt. %
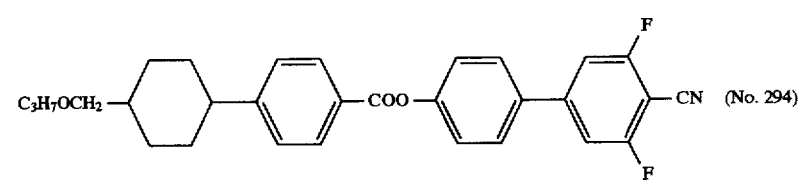 2 wt. %
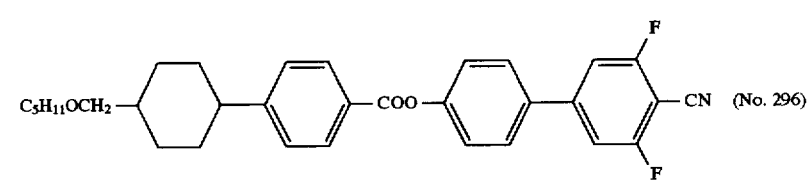 2 wt. %
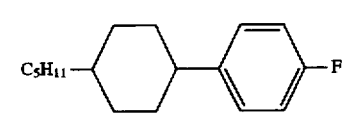 10 wt. %
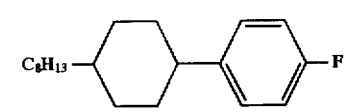 8 wt. %
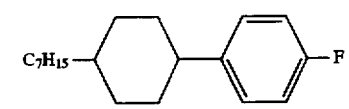 8 wt. %

-continued

| Structure | Amount |
|---|---|
| C₂H₅–[Cy]–[Cy]–[Ph]–OCF₃ | 5 wt. % |
| C₃H₇–[Cy]–[Cy]–[Ph]–OCF₃ | 5 wt. % |
| C₃H₇–[Cy]–CH₂CH₂–[Cy]–[Ph]–OCF₃ | 5 wt. % |
| C₅H₁₁–[Cy]–CH₂CH₂–[Cy]–[Ph]–OCF₃ | 5 wt. % |
| C₃H₇–[Cy]–[Cy]–CH₂CH₂–[Ph]–OCF₃ | 4 wt. % |
| C₅H₁₁–[Cy]–[Cy]–CH₂CH₂–[Ph]–OCF₃ | 4 wt. % |
| C₃H₇–[Cy]–[Ph]–[Ph(3,4-F₂)] | 10 wt. % |
| C₅H₁₁–[Cy]–[Ph]–[Ph(3,4-F₂)] | 8 wt. % |
| C₃H₇–[Cy]–[Ph(2-F)]–[Ph]–[Cy]–C₃H₇ | 3 wt. % |
| C₅H₁₁–[Cy]–[Ph(2-F)]–[Ph]–[Cy]–C₃H₇ | 2 wt. % |

Composition example 16

| Structure | Amount |
|---|---|
| C₃H₇OCH₂–[Ph]–COO–[Ph(3,5-F₂)]–OCF₃ (No. 18) | 10 wt. % |
| C₂H₅OCH₂–[Cy]–[Ph]–COO–[Ph(3,5-F₂)]–OCF₃ (No. 203) | 6 wt. % |

-continued

| Structure | Amount |
|---|---|
| C₃H₇OCH₂–(Cy)–(Ph)–COO–(Ph)–(Ph)–CF₃ (No. 356) | 5 wt. % |
| C₅H₁₁–(Cy)–(Ph)–F | 12 wt. % |
| C₇H₁₅–(Cy)–(Ph)–F | 12 wt. % |
| C₂H₅–(Cy)–(Cy)–(Ph)–OCF₃ | 5 wt. % |
| C₃H₇–(Cy)–(Cy)–(Ph)–OCF₃ | 5 wt. % |
| C₅H₁₁–(Cy)–(Cy)–(Ph)–OCF₃ | 5 wt. % |
| C₃H₇–(Cy)–(Cy)–(Ph(F,F))–OCF₂H | 12 wt. % |
| C₅H₁₁–(Cy)–(Cy)–(Ph(F,F))–OCF₂H | 10 wt. % |
| C₃H₇–(Cy)–(Ph(F,F))–(Ph(F,F))– | 5 wt. % |
| C₅H₁₁–(Cy)–(Ph(F,F))–(Ph(F,F))– | 5 wt. % |
| C₃H₇–(Cy)–(Cy)–COO–(Ph)–OCF₃ | 4 wt. % |
| C₅H₁₁–(Cy)–(Cy)–COO–(Ph)–OCF₃ | 4 wt. % |

Composition example 17

| Compound | Amount |
|---|---|
| C3H7OCH2—[C6H4]—COO—[C6H2(F)(F)]—CN (No. 4) | 5 wt. % |
| C4H9OCH2—[C6H4]—COO—[C6H2(F)(F)]—CN (No. 5) | 5 wt. % |
| C5H11OCH2—[C6H4]—COO—[C6H2(F)(F)]—CN (No. 1) | 5 wt. % |
| C2H5OCH2—[C6H10]—[C6H4]—COO—[C6H2(F)(F)]—CN (No. 187) | 5 wt. % |
| C3H7OCH2—[C6H10]—[C6H4]—COO—[C6H4]—[C6H2(F)(F)]—CN (No. 294) | 3 wt. % |
| CH2=CHC2H4—[C6H10]—[C6H4]—CN | 4 wt. % |
| C4H9—[C6H4]—[C6H4]—C2H5 | 3 wt. % |
| C3H7—[C6H4]—[C6H4]—CN | 6 wt. % |
| C5H11—[C6H4]—[C6H4]—CN | 5 wt. % |
| C2H5—[C6H10]—[C6H3(F)]—CN | 6 wt. % |
| C3H7—[C6H10]—CH2CH2—[C6H4]—OC2H5 | 4 wt. % |

| Structure | Amount |
|---|---|
| C₅H₁₁—⟨cyclohexane⟩—CH₂CH₂—⟨benzene⟩—OC₃H₇ | 6 wt. % |
| C₃H₇—⟨benzene⟩—COO—⟨benzene⟩—CN | 5 wt. % |
| C₅H₁₁—⟨cyclohexane⟩—COO—⟨benzene⟩—OCH₃ | 6 wt. % |
| C₅H₁₁—⟨cyclohexane⟩—COO—⟨benzene⟩—OC₃H₇ | 6 wt. % |
| C₅H₁₁—⟨benzene⟩—⟨benzene⟩—⟨benzene⟩—CN | 4 wt. % |
| C₄H₉—⟨benzene⟩—C(=N–N=)—⟨benzene⟩—CN (pyridazine) | 3 wt. % |
| C₄H₉—⟨benzene⟩—C(=N–N=)—⟨benzene⟩—C₅H₁₁ (pyridazine) | 3 wt. % |
| C₅H₁₁—⟨cyclohexane⟩—⟨benzene⟩—CH₂CH₂—⟨benzene⟩—C₄H₉ | 3 wt. % |
| C₅H₁₁—⟨cyclohexane⟩—⟨benzene⟩—⟨benzene⟩—CH₂CH₂—⟨benzene⟩—C₃H₇ | 3 wt. % |
| CH₃CH=CH—⟨cyclohexane⟩—⟨cyclohexane⟩—CH₂OCH₃ | 6 wt. % |
| CH₃CH=CHC₂H₄—⟨cyclohexane⟩—⟨benzene⟩—⟨benzene⟩—C₃H₇ | 4 wt. % |

Composition example 18

| Structure | Amount |
|---|---|
| C₃H₇OCH₂—⟨benzene⟩—COO—⟨benzene(3,5-diF, 4-CF₃)⟩ (No. 8) | 8 wt. % |
| C₅H₁₁OCH₂—⟨benzene⟩—COO—⟨benzene(3,5-diF, 4-CF₃)⟩ (No. 10) | 8 wt. % |

-continued
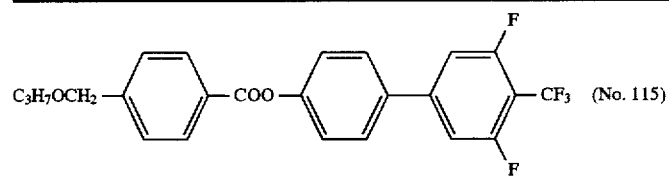 (No. 115)  5 wt. %
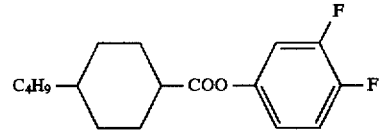  5 wt. %
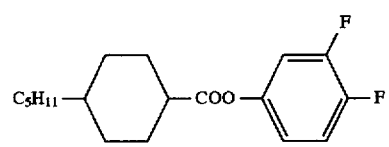  5 wt. %
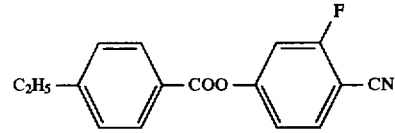  6 wt. %
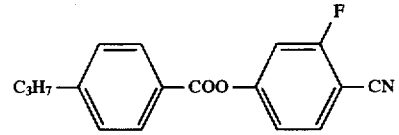  6 wt. %
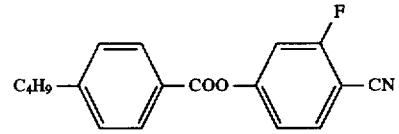  5 wt. %
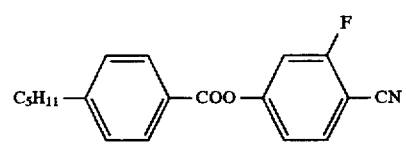  5 wt. %
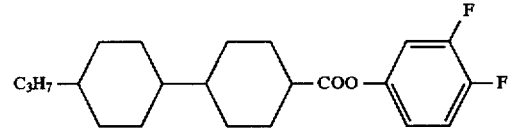  4 wt. %
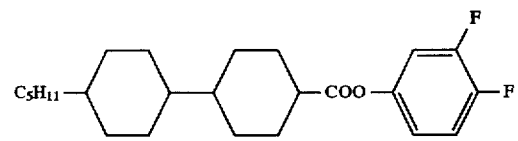  4 wt. %
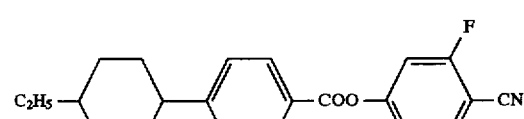  6 wt. %
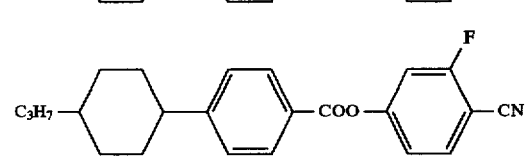  6 wt. %

-continued
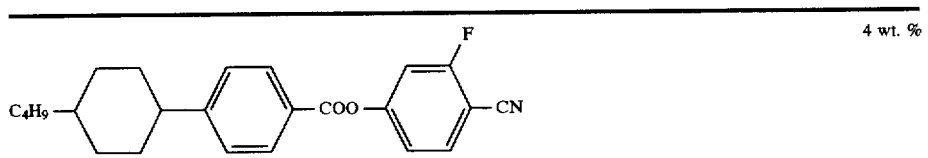 4 wt. %
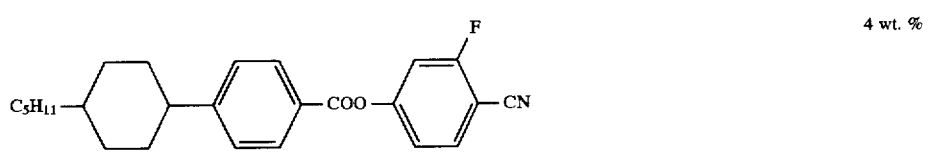 4 wt. %
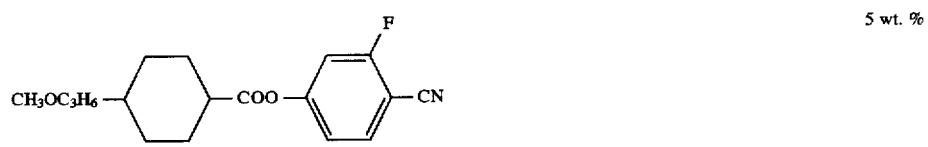 5 wt. %
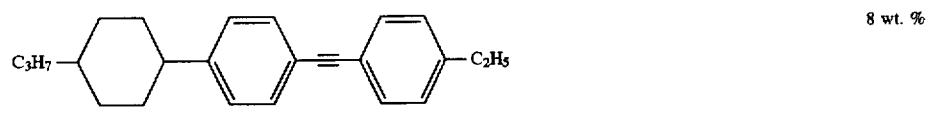 8 wt. %
 3 wt. %
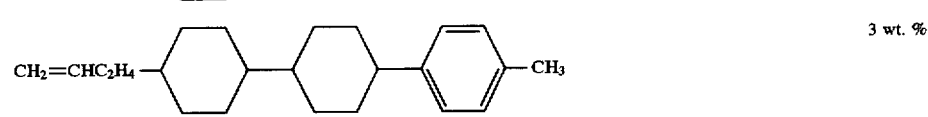 3 wt. %
Composition example 19
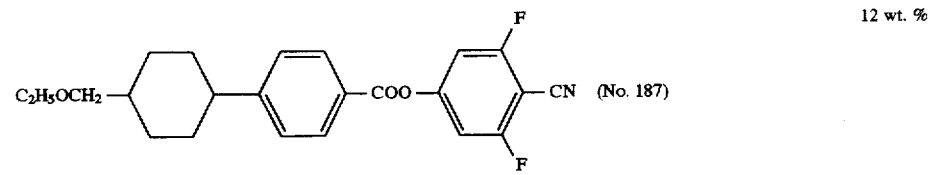 12 wt. %
 12 wt. %
 3 wt. %
 10 wt. %
 7 wt. %
 9 wt. %

| | |
|---|---|
| 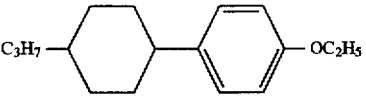 | 6 wt. % |
| 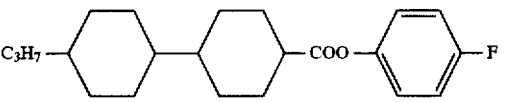 | 5 wt. % |
|  | 5 wt. % |
| 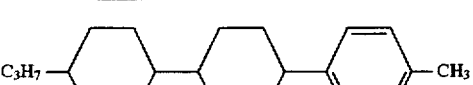 | 9 wt. % |
| 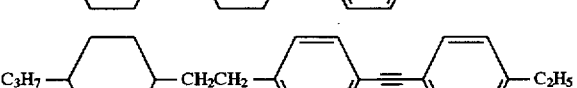 | 5 wt. % |
| 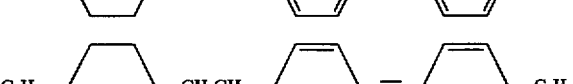 | 5 wt. % |
| 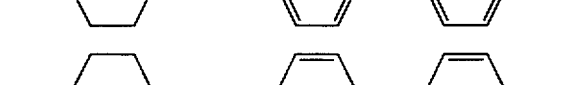 | 5 wt. % |
| 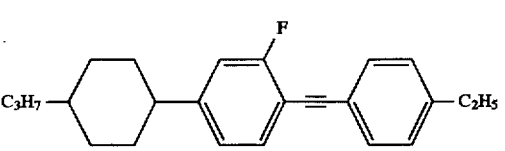 | 7 wt. % |
Composition example 20
| | |
|---|---|
| 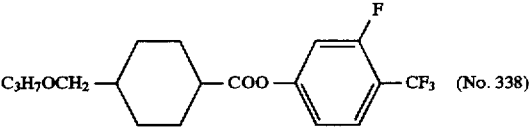 (No. 338) | 5 wt. % |
| 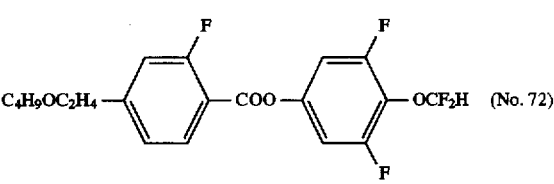 (No. 72) | 5 wt. % |
| 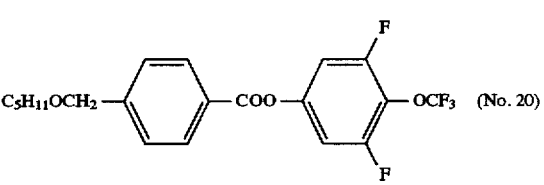 (No. 20) | 5 wt. % |
| 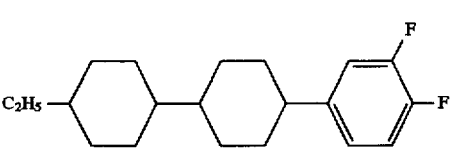 | 5 wt. % |

| Structure | Amount |
|---|---|
| C₃H₇–Cy–Cy–Ph(3-F,4-F) | 5 wt. % |
| C₅H₁₁–Cy–Cy–Ph(3-F,4-F) | 5 wt. % |
| C₂H₅–Cy–Ph(2-F,4-CN) | 10 wt. % |
| C₃H₇–Cy–Ph(2-F,4-CN) | 12 wt. % |
| C₅H₁₁–Cy–Ph(2-F,4-CN) | 11 wt. % |
| C₃H₇–Cy–Cy–Ph–CH₃ | 8 wt. % |
| C₃H₇–Cy–Cy–Ph–C₃H₇ | 4 wt. % |
| C₃H₇–Cy–Cy–Ph–OCH₃ | 4 wt. % |
| C₃H₇–Cy–CH₂CH₂–Ph–C≡C–Ph–C₂H₅ | 3 wt. % |
| C₃H₇–Cy–CH₂CH₂–Ph–C≡C–Ph–C₃H₇ | 3 wt. % |
| C₃H₇–Cy–CH₂CH₂–Ph–C≡C–Ph–C₄H₉ | 3 wt. % |
| C₃H₇–Cy–Ph(3-F)–C≡C–Ph–C₂H₅ | 4 wt. % |
| C₃H₇–Cy–Ph(3-F)–C≡C–Ph–C₃H₇ | 4 wt. % |

-continued
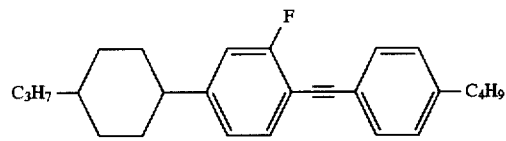 4 wt. %
Composition example 21
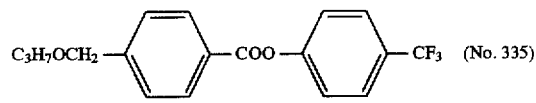 (No. 335) 6 wt. %
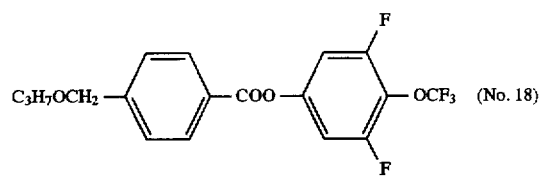 (No. 18) 5 wt. %
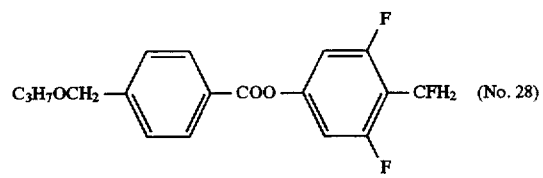 (No. 28) 5 wt. %
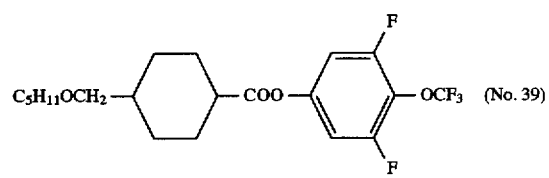 (No. 39) 3 wt. %
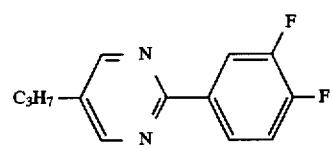 6 wt. %
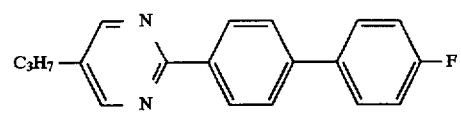 4 wt. %
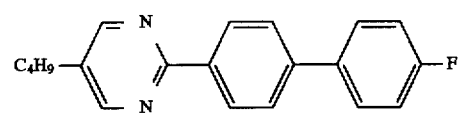 4 wt. %
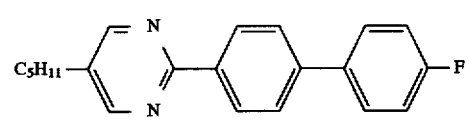 4 wt. %
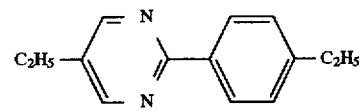 5 wt. %
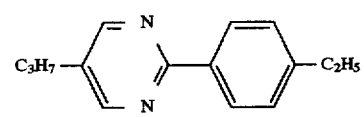 5 wt. %

| Structure | Amount |
|---|---|
| $C_4H_9$–[pyrimidine]–[phenyl]–$C_2H_5$ | 5 wt. % |
| $C_3H_7$–[Cy]–COO–[Ph]–$OC_4H_9$ | 5 wt. % |
| $C_4H_9$–[Cy]–COO–[Ph]–$OC_2H_5$ | 5 wt. % |
| $C_5H_{11}$–[Cy]–COO–[Ph]–$OCH_3$ | 5 wt. % |
| $C_5H_{11}$–[Cy]–COO–[Ph]–$CH_3$ | 6 wt. % |
| $C_2H_5$–[Cy]–$CH_2CH_2$–[Ph]–C≡C–[Ph]–$C_4H_9$ | 4 wt. % |
| $C_3H_7$–[Cy]–$CH_2CH_2$–[Ph]–C≡C–[Ph]–$C_4H_9$ | 4 wt. % |
| $C_3H_7$–[Cy]–[Cy]–[Ph]–$CH_3$ | 5 wt. % |
| $C_3H_7$–[Cy]–[Cy]–[Ph]–$C_3H_7$ | 5 wt. % |
| $C_3H_7$–[Cy]–[Cy]–COO–[Ph]–[Ph]–CN | 3 wt. % |
| $C_5H_{11}$–[Cy]–[Cy]–COO–[Ph]–[Ph]–CN | 3 wt. % |
| $C_3H_7$–[Cy]–[Ph]–COO–[Ph]–[Ph]–CN | 3 wt. % |

Composition example 22

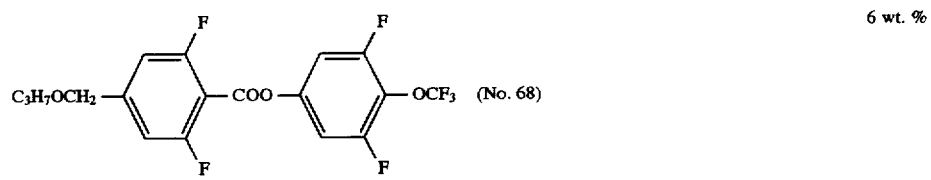

$C_3H_7OCH_2$–[2,6-F₂-Ph]–COO–[3,5-F₂-Ph]–$OCF_3$ (No. 68)    6 wt. %

-continued

| Structure | Amount |
|---|---|
| C₃H₇OCH₂–[2-F,4-]phenyl–COO–[3,5-F₂,4-OCF₂H]phenyl (No. 71) | 6 wt. % |
| C₅H₁₁OCH₂–[2,6-F₂]phenyl–COO–cyclohexyl–[3,5-F₂,4-OCF₃]phenyl (No. 163) | 4 wt. % |
| C₃H₇OCH₂–phenyl–COO–cyclohexyl–[3,5-F₂,4-OCF₂H]phenyl (No. 166) | 4 wt. % |
| CH₂=CHC₂H₄–cyclohexyl–phenyl–CN | 10 wt. % |
| CH₃CH=CHC₂H₄–cyclohexyl–phenyl–CN | 10 wt. % |
| C₃H₇–cyclohexyl–phenyl–CN | 5 wt. % |
| C₃H₇–cyclohexyl–cyclohexyl–phenyl–CN | 5 wt. % |
| C₃H₇–pyrimidine–phenyl–phenyl–F | 6 wt. % |
| C₂H₅–pyrimidine–phenyl–cyclohexyl–C₃H₇ | 4 wt. % |
| C₄H₉–pyrimidine–phenyl–phenyl–C₃H₇ | 5 wt. % |
| C₃H₇–cyclohexyl–phenyl–COO–phenyl–F | 3 wt. % |
| C₃H₇–cyclohexyl–COO–phenyl–COO–phenyl–F | 3 wt. % |
| C₃H₇–cyclohexyl–cyclohexyl–C₄H₉ | 10 wt. % |

| Structure | Amount |
|---|---|
| CH₃OCH₂–[Cy]–[Cy]–C₃H₇ | 4 wt. % |
| C₂H₅–[Ph]–C≡C–[Ph]–CH₃ | 3 wt. % |
| CH₃–[Ph]–C≡C–[Ph]–C₆H₁₃ | 6 wt. % |
| C₄H₉–[Ph]–C≡C–[Ph]–C₄H₉ | 3 wt. % |
| C₃H₇–[Cy]–[Cy]–[Ph]–CH₃ | 3 wt. % |

Composition example 23

| Structure | Amount |
|---|---|
| C₂H₅OCH₂–[Ph]–[Pyridine]–COO–[Ph(2,6-F₂)]–CN (No. 231) | 10 wt. % |
| C₃H₇OC₂H₄–[Pyrimidine]–[Ph]–COO–[Ph(2,6-F₂)]–CN (No. 232) | 9 wt. % |
| C₅H₁₁OCH₂–CH(dioxane)–[Ph]–COO–[Ph(2,6-F₂)]–OCF₃ (No. 204) | 5 wt. % |
| C₂H₅–[Cy]–[Ph]–CN | 5 wt. % |
| C₃H₇–[Cy]–[Ph]–CN | 15 wt. % |
| C₂H₅–[Cy]–[Cy]–[Ph]–CN | 5 wt. % |
| C₃H₇–[Cy]–[Cy]–[Ph]–CN | 5 wt. % |

| Structure | Amount |
|---|---|
| C₄H₉–[Cy]–[Cy]–[Ph]–CN | 5 wt. % |
| C₃H₇–[Pyrimidine]–[Ph]–[Ph]–F | 10 wt. % |
| C₃H₇–[Cy]–[Cy]–C₄H₉ | 8 wt. % |
| C₅H₁₁–[Cy]–[Cy]–C₄H₉ | 3 wt. % |
| C₂H₅–[Ph]–C≡C–[Ph]–OCH₃ | 4 wt. % |
| C₃H₇–[Ph]–C≡C–[Ph]–OCH₃ | 4 wt. % |
| C₄H₉–[Ph]–C≡C–[Ph]–OCH₃ | 4 wt. % |
| C₃H₇–[Cy]–[Cy]–[Ph]–CH₃ | 5 wt. % |
| C₃H₇–[Cy]–[Cy]–[Ph]–OCH₃ | 3 wt. % |

Composition example 24

| Structure | Amount |
|---|---|
| C₃H₇OCH₂–[Ph]–COO–[Ph(3,5-F₂)]–OCF₃ (No. 18) | 5 wt. % |
| C₃H₇OCH₂–[Cy]–[Cy]–COO–[Ph(3,5-F₂)]–CF₃ (No. 221) | 5 wt. % |
| C₅H₁₁OCH₂–[Ph]–[Ph]–COO–[Ph(3,5-F₂)]–OCF₂H (No. 251) | 5 wt. % |

-continued

| Structure | Amount |
|---|---|
| C₃H₇–[Cy]–[Ph]–Cl | 4 wt. % |
| C₅H₁₁–[Cy]–[Ph]–Cl | 4 wt. % |
| C₂H₅–[Cy]–[Cy]–[Ph]–Cl | 5 wt. % |
| C₃H₇–[Cy]–[Cy]–[Ph]–Cl | 6 wt. % |
| C₅H₁₁–[Cy]–[Cy]–[Ph]–Cl | 5 wt. % |
| C₂H₅–[Cy]–CH₂CH₂–[Cy]–[Ph](3-F)(4-Cl) | 4 wt. % |
| C₂H₅–[Cy]–[Ph]–[Ph](3,4-F₂) | 6 wt. % |
| C₃H₇–[Cy]–[Ph]–[Ph](3,4-F₂) | 6 wt. % |
| C₅H₁₁–[Cy]–[Ph]–[Ph](3,4-F₂) | 12 wt. % |
| C₃H₇–[Cy]–[Ph]–[Ph](3,4,5-F₃) | 13 wt. % |
| C₅H₁₁–[Cy]–[Ph]–[Ph](3,4,5-F₃) | 13 wt. % |
| C₃H₇–[Cy]–[Ph](2-F)–[Ph]–C₂H₅ | 3 wt. % |

-continued
 4 wt. %
Composition example 25
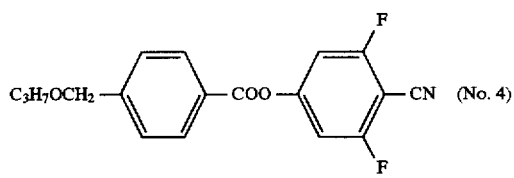 3 wt. %
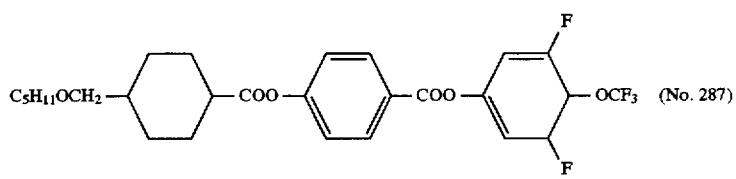 3 wt. %
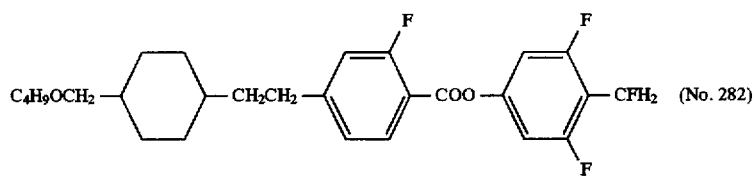 5 wt. %
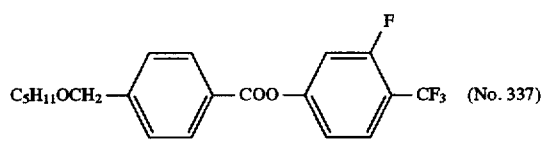 4 wt. %
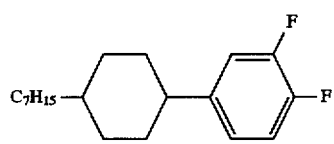 5 wt. %
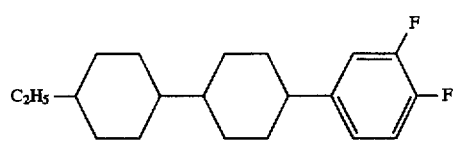 11 wt. %
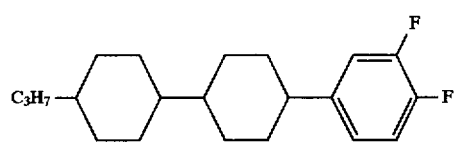 11 wt. %
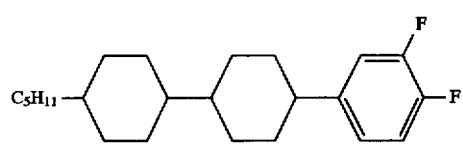 11 wt. %
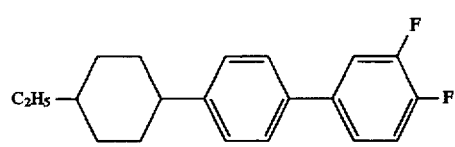 5 wt. %

-continued

| Structure | Amount |
|---|---|
| C₃H₇–(Cy)–(Ph)–(Ph)(3-F)(4-F) | 5 wt. % |
| C₅H₁₁–(Cy)–(Ph)–(Ph)(3-F)(4-F) | 10 wt. % |
| C₂H₅–(Cy)–CH₂CH₂–(Cy)–(Ph)(3-F)(4-F) | 3 wt. % |
| C₅H₁₁–(Cy)–CH₂CH₂–(Cy)–(Ph)(3-F)(4-F) | 3 wt. % |
| C₃H₇–(Cy)–(Cy)–(Ph)–F | 4 wt. % |
| C₃H₇–(Cy)–(Cy)–COO–(Ph)–(Ph)–F | 4 wt. % |
| C₅H₁₁–(Cy)–(Cy)–COO–(Ph)–(Ph)–F | 3 wt. % |
| C₃H₇–(Cy)–(Ph)–OC₂H₅ | 3 wt. % |
| CH₃OCH₂–(Cy)–(Ph)–C₃H₇ | 2 wt. % |
| C₃H₇–(Cy)–(Ph)(3-F)–C≡C–(Ph)–C₂H₅ | 5 wt. % |

Composition example 26

| Structure | Amount |
|---|---|
| C₃H₇OCH₂–(Ph)(2-F)(6-F)–COO–(Ph)(3-F)(5-F)–CFH₂ (No. 86) | 10 wt. % |

-continued

| Structure | Amount |
|---|---|
| C₃H₇OCH₂–[Cy]–[Cy]–[Ph(2-F)]–COO–[Ph(3,5-F)]–OCF₃ (No. 334) | 6 wt. % |
| CH₃OCH₂–[Cy]–[Cy]–COO–[Ph(2,6-F)]–[Ph(3,5-F)]–OCF₃ (No. 313) | 5 wt. % |
| C₅H₁₁–[Cy]–[Ph]–F | 12 wt. % |
| C₇H₁₅–[Cy]–[Ph]–F | 12 wt. % |
| C₂H₅–[Cy]–[Cy]–[Ph]–OCF₃ | 5 wt. % |
| C₃H₇–[Cy]–[Cy]–[Ph]–OCF₃ | 5 wt. % |
| C₅H₁₁–[Cy]–[Cy]–[Ph]–OCF₃ | 5 wt. % |
| C₃H₇–[Cy]–[Cy]–[Ph(3,5-F)]–OCF₂H | 12 wt. % |
| C₅H₁₁–[Cy]–[Cy]–[Ph(3,5-F)]–OCF₂H | 10 wt. % |
| C₃H₇–[Cy]–[Ph(2,6-F)]–[Ph(3,4-F)] | 5 wt. % |
| C₅H₁₁–[Cy]–[Ph(2,6-F)]–[Ph(3,4-F)] | 5 wt. % |

-continued

| Structure | Amount |
|---|---|
| C₃H₇–[Cy]–[Cy]–COO–[Ph]–OCF₃ | 4 wt. % |
| C₅H₁₁–[Cy]–[Cy]–COO–[Ph]–OCF₃ | 4 wt. % |

Composition example 27

| Structure | Amount |
|---|---|
| C₃H₇OCH₂–[Ph]–COO–[Ph]–OCFH₂ (No. 373) | 8 wt. % |
| C₅H₁₁OCH₂–[Ph]–COO–[Ph(F)]–OCF₃ (No. 374) | 6 wt. % |
| C₅H₁₁OCH₂–[Cy]–[Ph(F)]–COO–[Ph(F)]–CF₂H (No. 388) | 5 wt. % |
| C₃H₇OCH₂–[Cy]–[Ph]–COO–[Ph]–[Ph]–OCF₃ (No. 393) | 2 wt. % |
| C₅H₁₁OCH₂–[Cy]–[Cy]–[Ph(F)]–COO–[Ph(F)]–CFH₂ (No. 409) | 2 wt. % |
| C₅H₁₁–[Cy]–[Ph]–F | 10 wt. % |
| C₆H₁₃–[Cy]–[Ph]–F | 8 wt. % |
| C₇H₁₅–[Cy]–[Ph]–F | 8 wt. % |
| C₂H₅–[Cy]–[Cy]–[Ph]–OCF₃ | 5 wt. % |
| C₃H₇–[Cy]–[Cy]–[Ph]–OCF₃ | 5 wt. % |
| C₃H₇–[Cy]–CH₂CH₂–[Cy]–[Ph]–OCF₃ | 5 wt. % |
| C₅H₁₁–[Cy]–CH₂CH₂–[Cy]–[Ph]–OCF₃ | 5 wt. % |

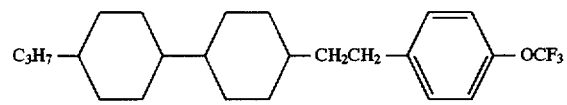 4 wt. %
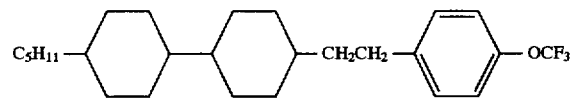 4 wt. %
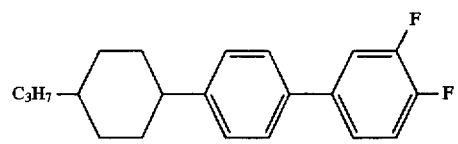 10 wt. %
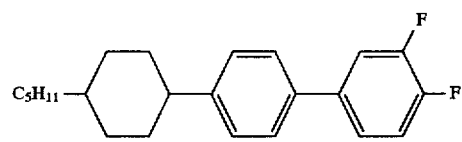 8 wt. %
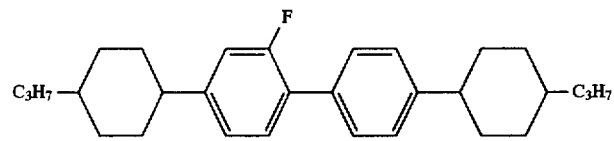 3 wt. %
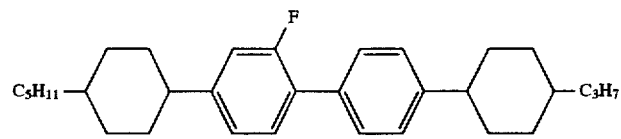 2 wt. %
Composition example 28
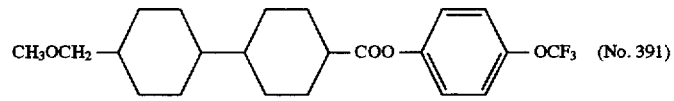 (No. 391) 8 wt. %
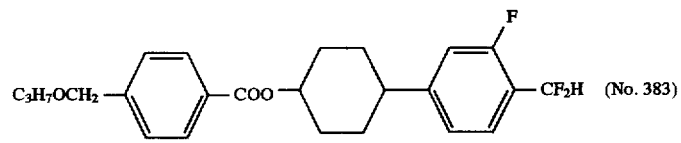 (No. 383) 6 wt. %
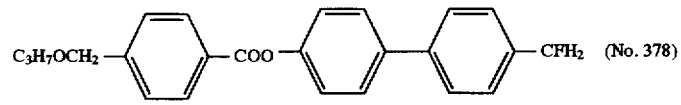 (No. 378) 6 wt. %
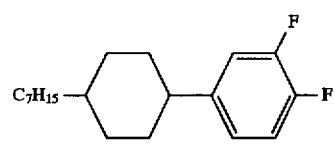 7 wt. %
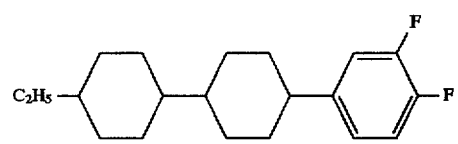 8 wt. %

-continued
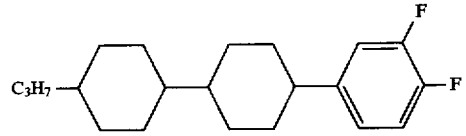  8 wt. %
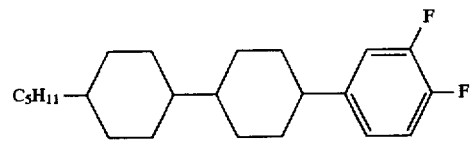  8 wt. %
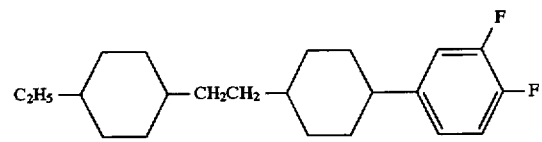  6 wt. %
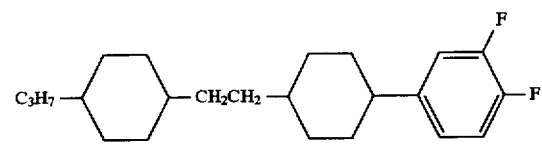  3 wt. %
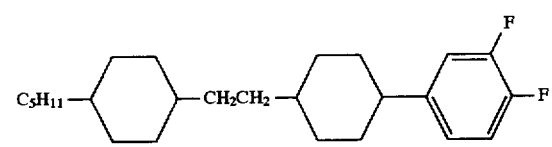  6 wt. %
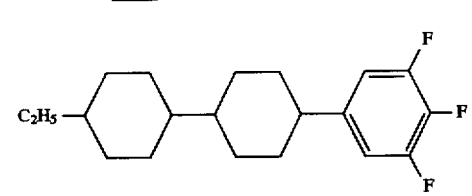  3 wt. %
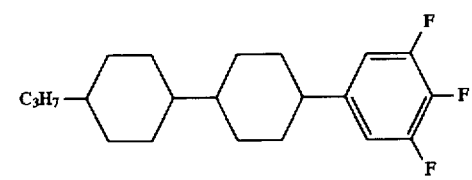  3 wt. %
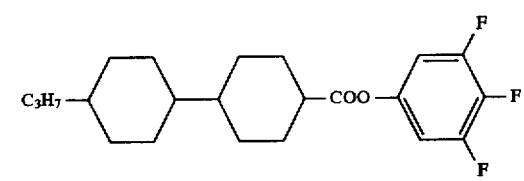  4 wt. %
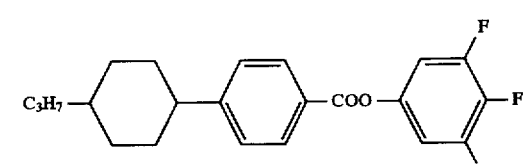  3 wt. %
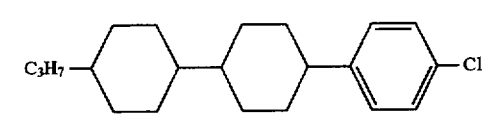  5 wt. %

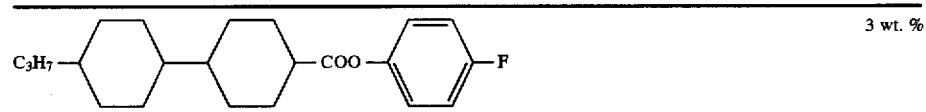
3 wt. %
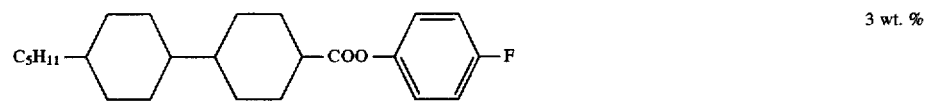
3 wt. %
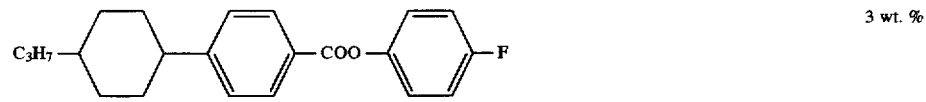
3 wt. %
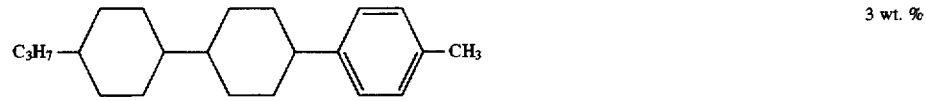
3 wt. %
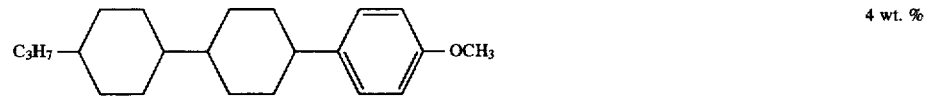
4 wt. %
Composition example 29
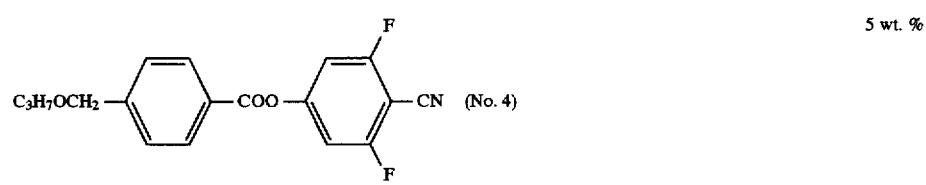 (No. 4)
5 wt. %
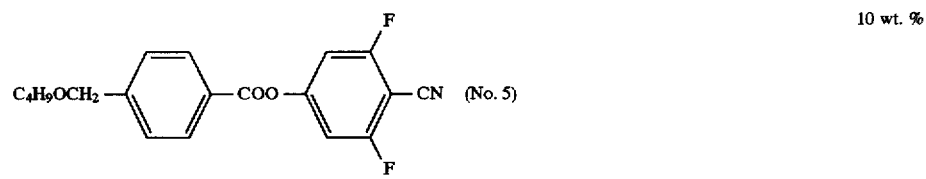 (No. 5)
10 wt. %
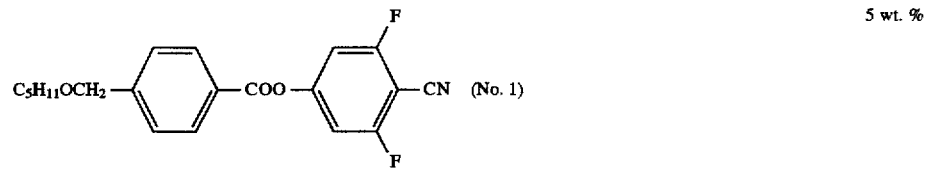 (No. 1)
5 wt. %
5 wt. %
8 wt. %
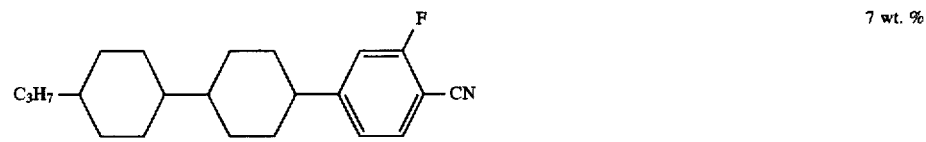
7 wt. %
10 wt. %

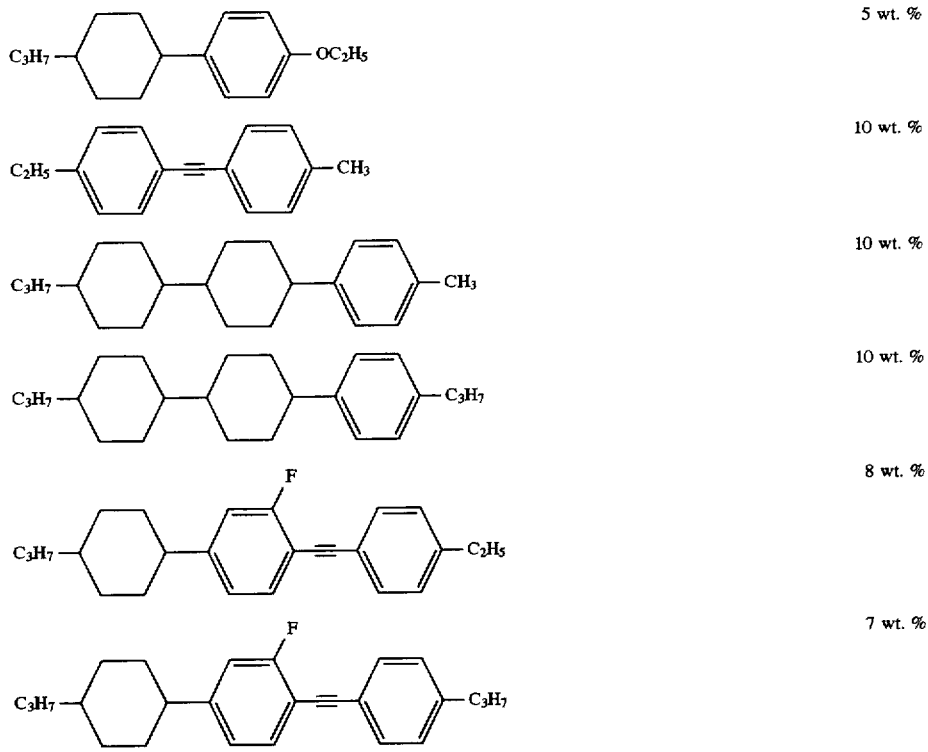

| | |
|---|---|
| C3H7-cyclohexyl-phenyl-OC2H5 | 5 wt. % |
| C2H5-phenyl-C≡C-phenyl-CH3 | 10 wt. % |
| C3H7-cyclohexyl-cyclohexyl-phenyl-CH3 | 10 wt. % |
| C3H7-cyclohexyl-cyclohexyl-phenyl-C3H7 | 10 wt. % |
| C3H7-cyclohexyl-(F)phenyl-C≡C-phenyl-C2H5 | 8 wt. % |
| C3H7-cyclohexyl-(F)phenyl-C≡C-phenyl-C3H7 | 7 wt. % |

Composition example 30

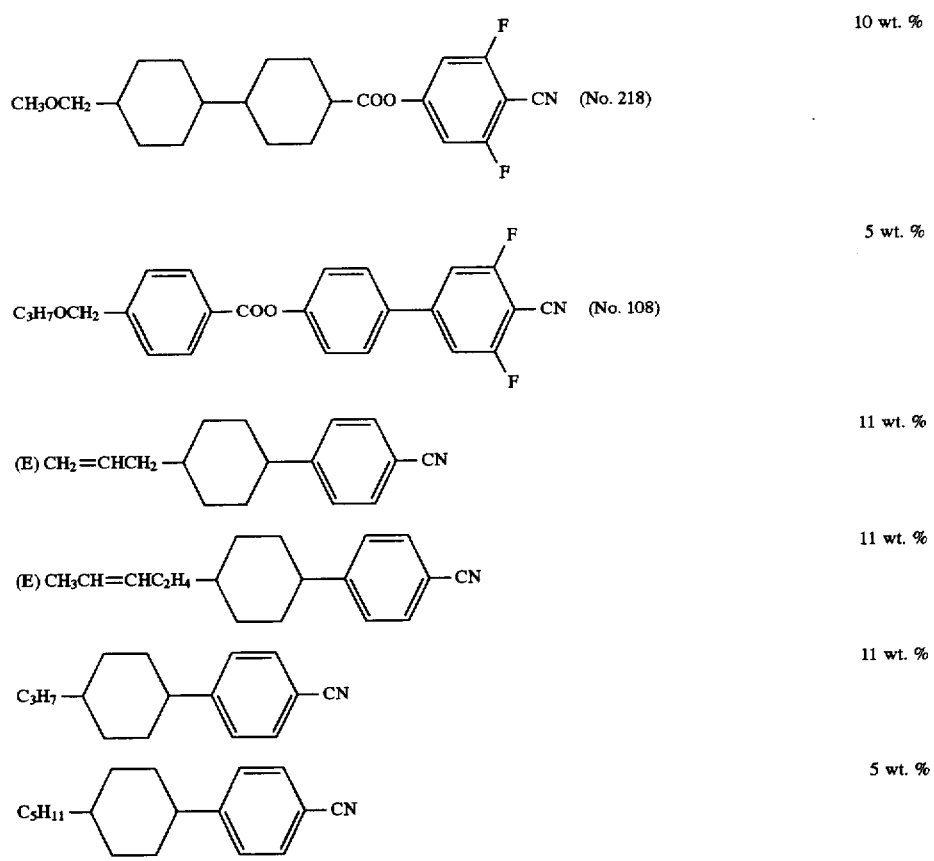

| | |
|---|---|
| CH3OCH2-cyclohexyl-cyclohexyl-COO-(F,F)phenyl-CN (No. 218) | 10 wt. % |
| C3H7OCH2-phenyl-COO-phenyl-(F,F)phenyl-CN (No. 108) | 5 wt. % |
| (E) CH2=CHCH2-cyclohexyl-phenyl-CN | 11 wt. % |
| (E) CH3CH=CHC2H4-cyclohexyl-phenyl-CN | 11 wt. % |
| C3H7-cyclohexyl-phenyl-CN | 11 wt. % |
| C5H11-cyclohexyl-phenyl-CN | 5 wt. % |

| Structure | Amount |
|---|---|
| C₃H₇—⟨Cy⟩—⟨Cy⟩—C₅H₁₁ | 7 wt. % |
| C₂H₅—⟨Ph⟩—C≡C—⟨Ph⟩—OCH₃ | 2 wt. % |
| C₃H₇—⟨Ph⟩—C≡C—⟨Ph⟩—OCH₃ | 2 wt. % |
| C₄H₉—⟨Ph⟩—C≡C—⟨Ph⟩—OCH₃ | 2 wt. % |
| C₄H₉—⟨Ph⟩—C≡C—⟨Ph⟩—OC₂H₅ | 2 wt. % |
| C₅H₁₁—⟨Ph⟩—C≡C—⟨Ph⟩—OCH₃ | 2 wt. % |
| C₃H₇—⟨Cy⟩—⟨Cy⟩—⟨Ph⟩—CH₃ | 5 wt. % |
| C₃H₇—⟨Cy⟩—⟨Cy⟩—⟨Ph⟩—C₃H₇ | 10 wt. % |
| C₃H₇—⟨Cy⟩—CH₂CH₂—⟨Ph⟩—C≡C—⟨Ph⟩—C₂H₅ | 3 wt. % |
| C₃H₇—⟨Cy⟩—CH₂CH₂—⟨Ph⟩—C≡C—⟨Ph⟩—C₃H₇ | 3 wt. % |
| C₃H₇—⟨Ph⟩—⟨Ph(F)⟩—C≡C—⟨Ph⟩—C₂H₅ | 4 wt. % |
| C₃H₇—⟨Ph⟩—⟨Ph(F)⟩—C≡C—⟨Ph⟩—C₃H₇ | 5 wt. % |

Composition example 31

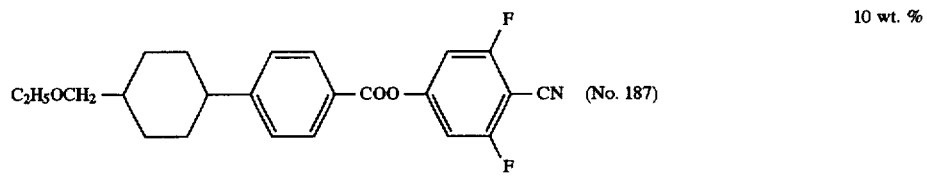

C₂H₅OCH₂—⟨Cy⟩—⟨Ph⟩—COO—⟨Ph(F,F)⟩—CN   (No. 187)   10 wt. %

-continued

C₃H₇OCH₂—⟨phenyl⟩—COO—⟨phenyl-F⟩—CN    10 wt. %

(E) CH₃CH=CHC₂H₄—⟨phenyl⟩—COO—⟨phenyl-2,6-F₂⟩—CN    4 wt. %

C₂H₅—⟨cyclohexyl⟩—⟨phenyl⟩—CN    10 wt. %

C₃H₇—⟨cyclohexyl⟩—⟨phenyl⟩—CN    15 wt. %

C₃H₇—⟨cyclohexyl⟩—⟨phenyl⟩—OC₂H₅    10 wt. %

C₃H₇—⟨cyclohexyl⟩—⟨cyclohexyl⟩—⟨phenyl⟩—CH₃    10 wt. %

C₃H₇—⟨cyclohexyl⟩—⟨cyclohexyl⟩—⟨phenyl⟩—OCH₃    4 wt. %

C₂H₅—⟨cyclohexyl⟩—CH₂CH₂—⟨phenyl⟩—C≡C—⟨phenyl⟩—C₂H₅    5 wt. %

C₃H₇—⟨cyclohexyl⟩—CH₂CH₂—⟨phenyl⟩—C≡C—⟨phenyl⟩—C₃H₇    5 wt. %

C₃H₇—⟨cyclohexyl⟩—⟨cyclohexyl⟩—⟨phenyl⟩—CN    9 wt. %

C₅H₁₁—⟨cyclohexyl⟩—⟨cyclohexyl⟩—⟨phenyl⟩—CN    8 wt. %

Composition example 32

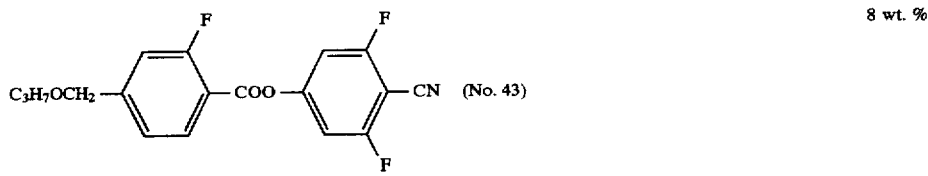

C₃H₇OCH₂—⟨phenyl-2-F⟩—COO—⟨phenyl-2,6-F₂⟩—CN  (No. 43)    8 wt. %

-continued
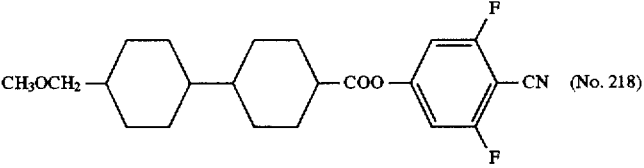 10 wt. %
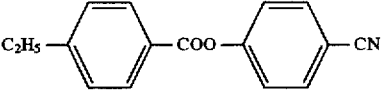 7 wt. %
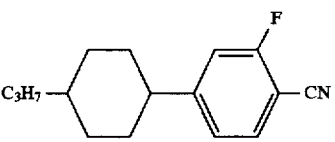 10 wt. %
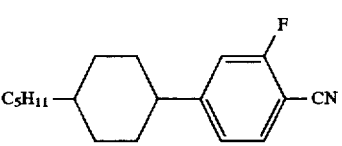 5 wt. %
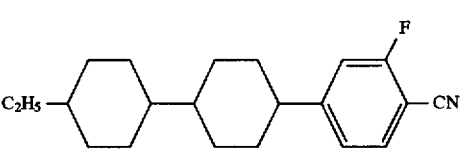 10 wt. %
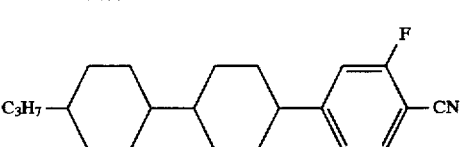 10 wt. %
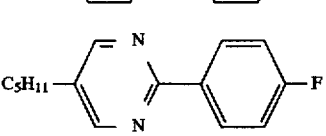 3 wt. %
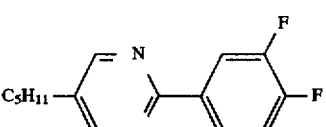 7 wt. %
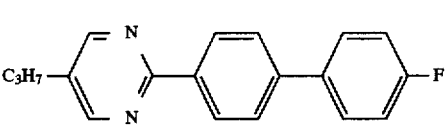 6 wt. %
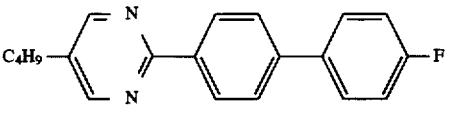 6 wt. %
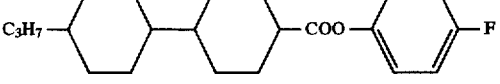 2 wt. %
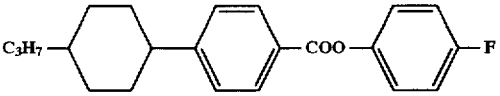 2 wt. %

-continued
 2 wt. %
 2 wt. %
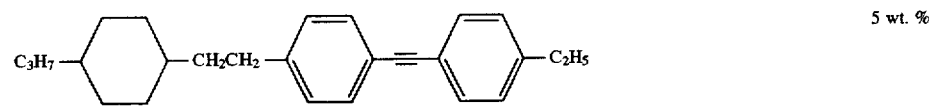 5 wt. %
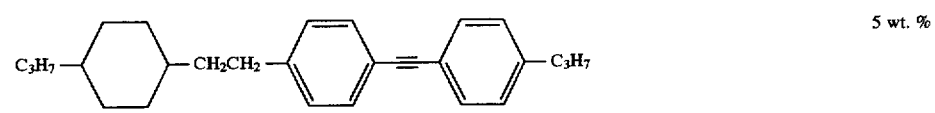 5 wt. %
Composition example 33
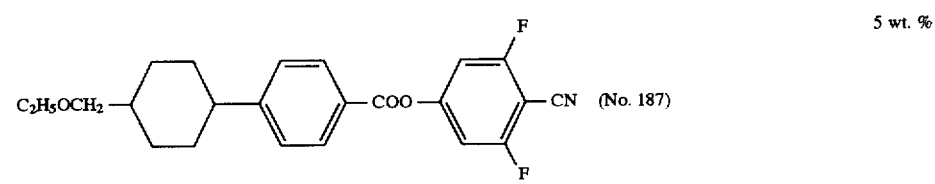 5 wt. %
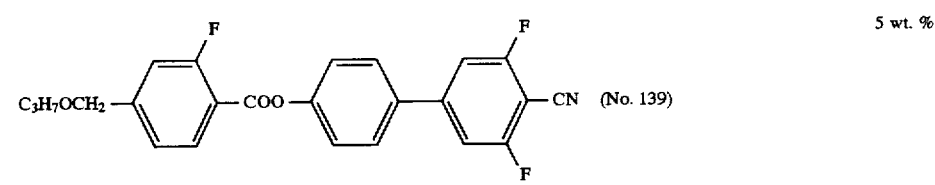 5 wt. %
 7 wt. %
 7 wt. %
 7 wt. %
 8 wt. %
 6 wt. %
 5 wt. %
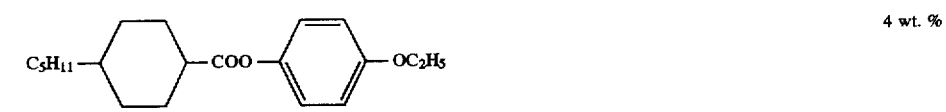 4 wt. %

| Structure | Amount |
|---|---|
| C₅H₁₁–[Cy]–COO–[Ph]–CH₃ | 7 wt. % |
| C₄H₉–[Pyrimidine]–[Ph]–OC₂H₅ | 1.1 wt. % |
| C₆H₁₃–[Pyrimidine]–[Ph]–OC₂H₅ | 2.3 wt. % |
| C₄H₉–[Pyrimidine]–[Ph]–OC₄H₉ | 2.1 wt. % |
| C₆H₁₃–[Pyrimidine]–[Ph]–OC₄H₉ | 4.5 wt. % |
| C₆H₁₃–[Pyrimidine]–[Ph]–OC₅H₁₁ | 2 wt. % |
| C₃H₇–[Cy]–[Cy]–[Ph]–CH₃ | 14 wt. % |
| C₃H₇–[Cy]–[Cy]–[Ph]–OCH₃ | 7 wt. % |
| C₃H₇–[Cy]–[Cy]–[Ph]–F | 3 wt. % |
| C₃H₇–[Cy]–[Ph]–[Ph]–F | 3 wt. % |

Composition example 34

| Structure | Amount |
|---|---|
| CH₃OCH₂–[Cy]–[Cy]–COO–[Ph(2,6-F₂)]–CN (No. 218) | 4 wt. % |
| C₃H₇OCH₂–[Ph]–COO–[Ph(2,6-F₂)]–CN (No. 4) | 5 wt. % |

-continued

| Structure | Amount |
|---|---|
| C₅H₁₁OCH₂—⟨C₆H₄⟩—COO—⟨C₆H₂F₂⟩—CN (No. 1) | 5 wt. % |
| (E) CH₂=CHC₂H₄—⟨Cy⟩—⟨C₆H₄⟩—CN | 9 wt. % |
| (E) CH₃CH=CHC₂H₄—⟨Cy⟩—⟨C₆H₄⟩—CN | 9 wt. % |
| CH₃OCH₂—⟨Cy⟩—⟨C₆H₄⟩—CN | 8 wt. % |
| C₂H₅OCH₂—⟨Cy⟩—⟨C₆H₄⟩—CN | 4 wt. % |
| C₃H₇—⟨Cy⟩—⟨Cy⟩—C₄H₉ | 5 wt. % |
| CH₃OCH₂—⟨Cy⟩—⟨Cy⟩—C₅H₁₁ | 8 wt. % |
| C₅H₁₁—⟨Cy⟩—⟨Cy⟩—COOCH₃ | 5 wt. % |
| C₂H₅—⟨C₆H₄⟩—C≡C—⟨C₆H₄⟩—OCH₃ | 11 wt. % |
| C₂H₅—⟨Cy⟩—⟨Cy⟩—⟨C₆H₄⟩—CN | 5 wt. % |
| C₃H₇—⟨Cy⟩—⟨Cy⟩—⟨C₆H₄⟩—CN | 5 wt. % |
| C₃H₇—⟨Cy⟩—⟨Cy⟩—⟨C₆H₄⟩—CH₃ | 8 wt. % |
| C₃H₇—⟨Cy⟩—⟨Cy⟩—⟨C₆H₄⟩—C₃H₇ | 7 wt. % |
| CH₃OCH₂—⟨Cy⟩—⟨C₆H₄⟩—⟨C₆H₄⟩—⟨Cy⟩—C₃H₇ | 2 wt. % |

Composition example 35
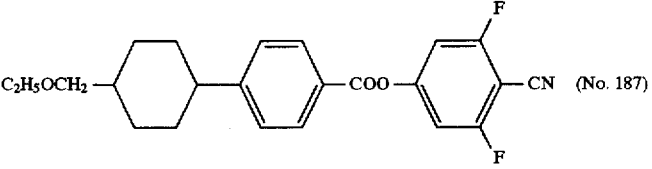 (No. 187)  5 wt. %
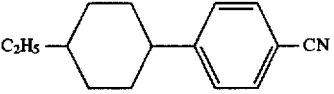  20 wt. %
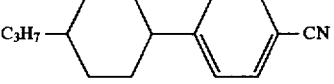  10 wt. %
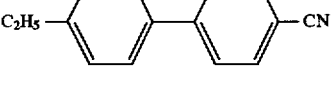  10 wt. %
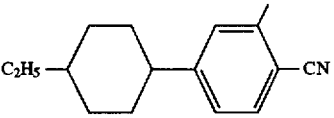  10 wt. %
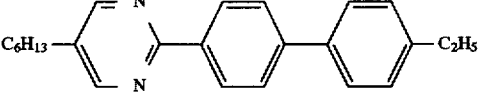  5 wt. %
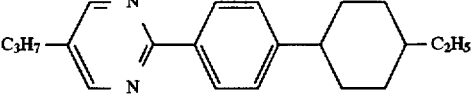  6 wt. %
  6 wt. %
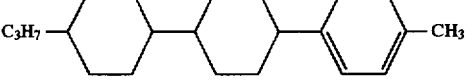  6 wt. %
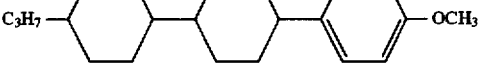  4 wt. %
  6 wt. %
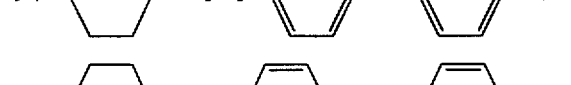  6 wt. %
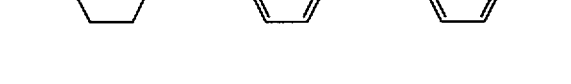  3 wt. %

-continued

| Structure | Amount |
|---|---|
| C$_3$H$_7$–⟨Cy⟩–COO–⟨Ph⟩–COO–⟨Ph⟩–F | 3 wt. % |

Composition example 36

| Structure | Amount |
|---|---|
| C$_4$H$_9$OCH$_2$–⟨Ph⟩–COO–⟨Ph(2,6-F$_2$)⟩–CN (No. 5) | 6 wt. % |
| C$_3$H$_7$–CH$_2$–CH(OO)–⟨Ph⟩–CN (dioxolane) | 10 wt. % |
| C$_4$H$_9$–CH$_2$–CH(OO)–⟨Ph⟩–CN (dioxolane) | 10 wt. % |
| C$_2$H$_5$–⟨Ph⟩–COO–⟨Ph⟩–CN | 12 wt. % |
| C$_3$H$_7$–⟨Ph⟩–COO–⟨Ph⟩–CN | 4 wt. % |
| C$_3$H$_7$–⟨Cy⟩–⟨Cy⟩–COO–⟨Ph⟩–⟨Ph⟩–CN | 3 wt. % |
| C$_3$H$_7$–⟨Cy⟩–⟨Ph⟩–COO–⟨Ph⟩–⟨Ph⟩–CN | 3 wt. % |
| C$_5$H$_{11}$–⟨Cy⟩–⟨Ph⟩–COO–⟨Ph⟩–⟨Ph⟩–CN | 3 wt. % |
| C$_3$H$_7$–⟨Cy⟩–COO–⟨Ph⟩–OC$_4$H$_9$ | 11 wt. % |
| C$_4$H$_9$–⟨Cy⟩–COO–⟨Ph⟩–OC$_2$H$_5$ | 8.3 wt. % |
| C$_5$H$_{11}$–⟨Cy⟩–COO–⟨Ph⟩–OCH$_3$ | 8.3 wt. % |
| C$_3$H$_7$–⟨Cy⟩–COO–⟨Ph⟩–OC$_2$H$_5$ | 6.9 wt. % |

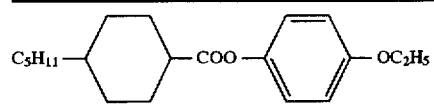 5.5 wt. %
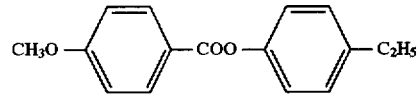 3 wt. %
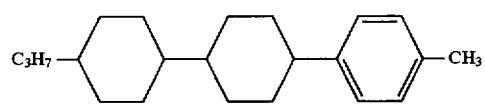 6 wt. %
Composition example 37
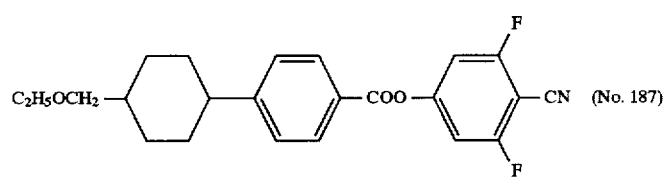 (No. 187) 10 wt. %
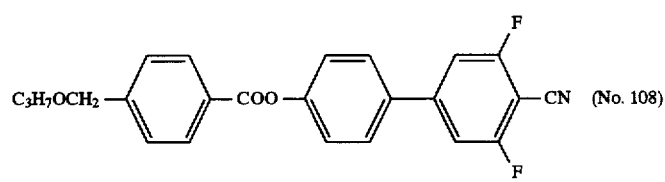 (No. 108) 5 wt. %
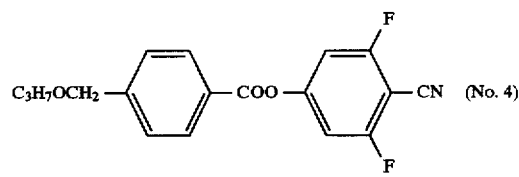 (No. 4) 5 wt. %
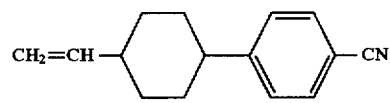 10 wt. %
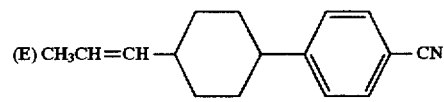 10 wt. %
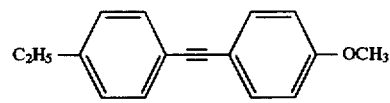 10 wt. %
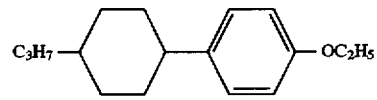 10 wt. %
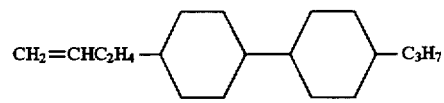 5 wt. %
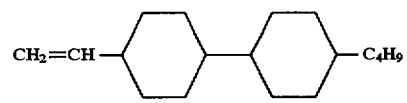 5 wt. %

-continued
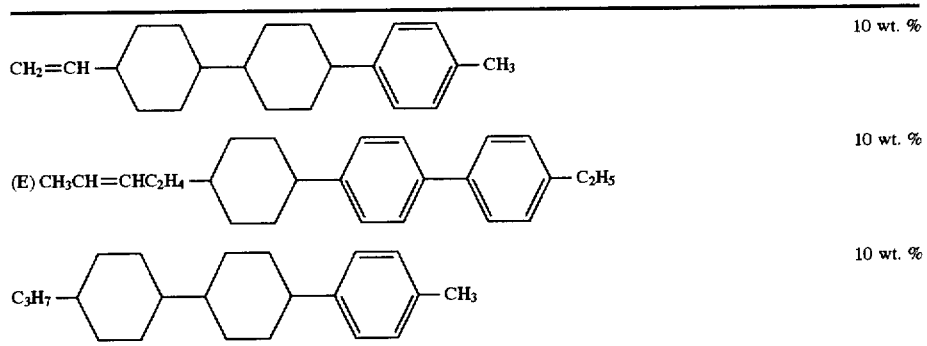
| | |
|---|---|
| CH₂=CH—[Cy]—[Cy]—[Ph]—CH₃ | 10 wt. % |
| (E) CH₃CH=CHC₂H₄—[Cy]—[Ph]—[Ph]—C₂H₅ | 10 wt. % |
| C₃H₇—[Cy]—[Cy]—[Ph]—CH₃ | 10 wt. % |
Composition example 38
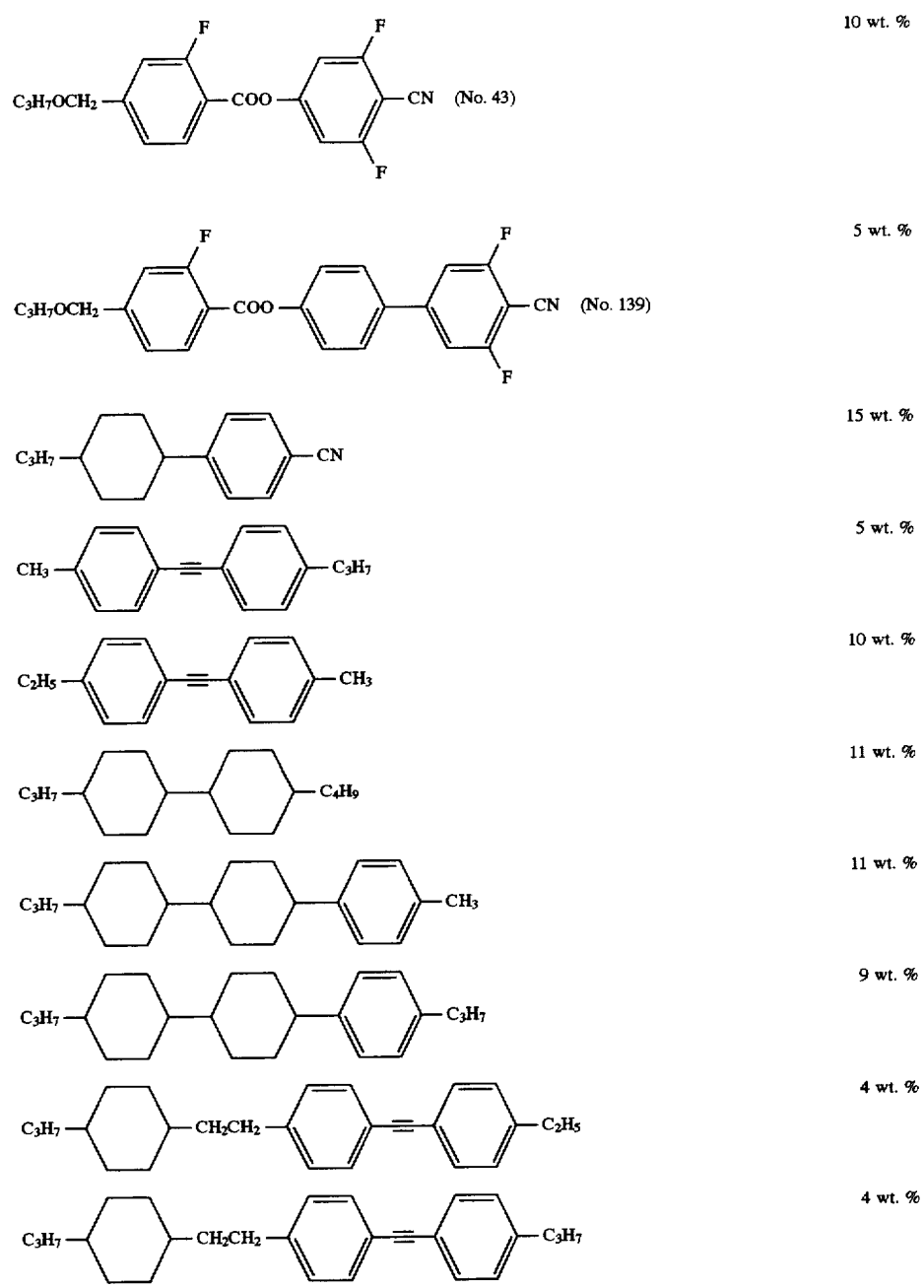
| | |
|---|---|
| C₃H₇OCH₂—[Ph(F)]—COO—[Ph(F,F)]—CN (No. 43) | 10 wt. % |
| C₃H₇OCH₂—[Ph(F)]—COO—[Ph]—[Ph(F,F)]—CN (No. 139) | 5 wt. % |
| C₃H₇—[Cy]—[Ph]—CN | 15 wt. % |
| CH₃—[Ph]—C≡C—[Ph]—C₃H₇ | 5 wt. % |
| C₂H₅—[Ph]—C≡C—[Ph]—CH₃ | 10 wt. % |
| C₃H₇—[Cy]—[Cy]—C₄H₉ | 11 wt. % |
| C₃H₇—[Cy]—[Cy]—[Ph]—CH₃ | 11 wt. % |
| C₃H₇—[Cy]—[Cy]—[Ph]—C₃H₇ | 9 wt. % |
| C₃H₇—[Cy]—CH₂CH₂—[Ph]—C≡C—[Ph]—C₂H₅ | 4 wt. % |
| C₃H₇—[Cy]—CH₂CH₂—[Ph]—C≡C—[Ph]—C₃H₇ | 4 wt. % |

-continued
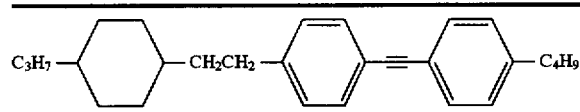 4 wt. %
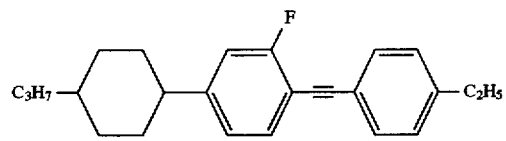 6 wt. %
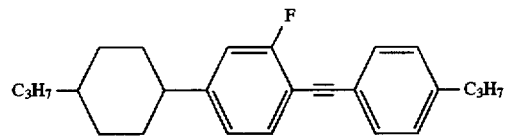 6 wt. %
Composition example 39
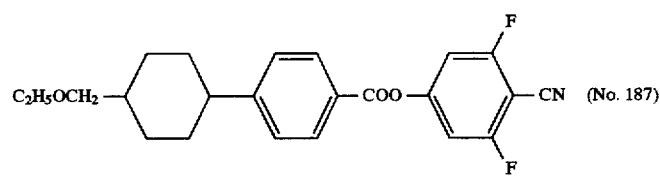 (No. 187) 10 wt. %
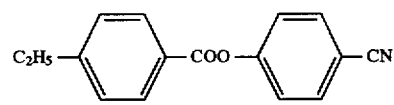 12 wt. %
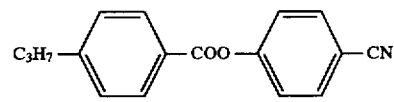 3 wt. %
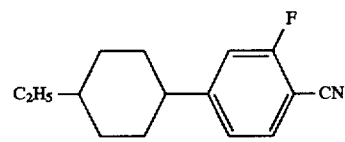 7 wt. %
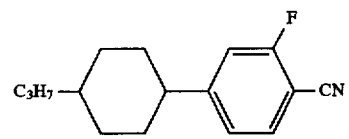 10 wt. %
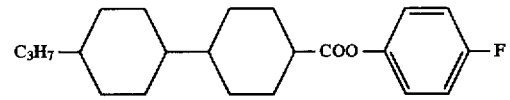 5 wt. %
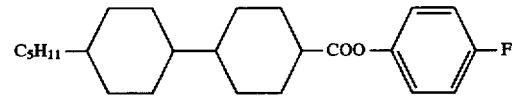 5 wt. %
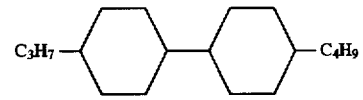 9 wt. %
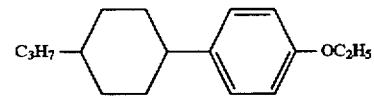 9 wt. %

-continued

| | |
|---|---|
| C₃H₇—⟨Cy⟩—⟨Cy⟩—⟨Ph⟩—CH₃ | 8 wt. % |
| C₃H₇—⟨Cy⟩—CH₂CH₂—⟨Ph⟩—C≡C—⟨Ph⟩—C₂H₅ | 5 wt. % |
| C₃H₇—⟨Cy⟩—CH₂CH₂—⟨Ph⟩—C≡C—⟨Ph⟩—C₃H₇ | 5 wt. % |
| C₃H₇—⟨Cy⟩—CH₂CH₂—⟨Ph⟩—C≡C—⟨Ph⟩—C₄H₉ | 5 wt. % |
| C₃H₇—⟨Cy⟩—⟨Ph(F)⟩—C≡C—⟨Ph⟩—C₂H₅ | 7 wt. % |

Composition example 40

| | |
|---|---|
| C₂H₅OCH₂—⟨Cy⟩—⟨Ph⟩—COO—⟨Ph(F,F)⟩—CN  (No. 187) | 12 wt. % |
| C₂H₅—⟨Ph⟩—COO—⟨Ph⟩—CN | 12 wt. % |
| C₃H₇—⟨Ph⟩—COO—⟨Ph⟩—CN | 3 wt. % |
| C₂H₅—⟨Cy⟩—⟨Ph(F)⟩—CN | 10 wt. % |
| C₃H₇—⟨Cy⟩—⟨Ph(F)⟩—CN | 7 wt. % |
| C₃H₇—⟨Cy⟩—⟨Cy⟩—COO—⟨Ph⟩—F | 5 wt. % |
| C₅H₁₁—⟨Cy⟩—⟨Cy⟩—COO—⟨Ph⟩—F | 5 wt. % |
| C₃H₇—⟨Cy⟩—⟨Cy⟩—C₄H₉ | 9 wt. % |

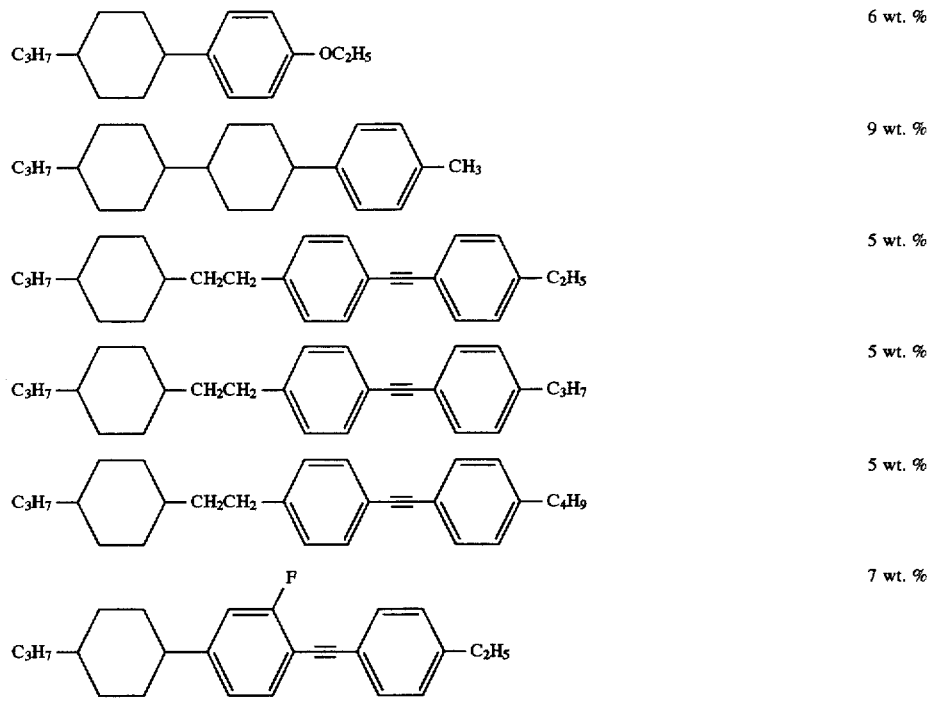

| | |
|---|---|
| | 6 wt. % |
| | 9 wt. % |
| | 5 wt. % |
| | 5 wt. % |
| | 5 wt. % |
| | 7 wt. % |

EXAMPLE

The present invention will be described in more details by way of Examples. In addition, in the respective Examples, Cr, $S_A$, $S_B$, Sc, $S_X$, N and Iso, respectively represent crystal, smectic A phase, smectic B phase, smectic C phase, smectic phase whose phase structure has not yet been analyzed, nematic phase, and isotropic liquid. The unit of the phase transition temperatures all refer to °C.

Example 1

Preparation of 3,5-difluoro-4-cyanophenyl 4-(pentyloxymethyl)benzoate (in the formula (1), R=$C_5H_{11}$, l=1, m=1, n and o=both, 0; $A_1$=1,4- phenylene group, $Z_1$=—COO—, X=CN, and $Y_1$ and $Y_2$ =both, F) (Compound No. 1)) 4-(Pentyloxymethyl)benzoic acid. (1.6 g, 7.1 mmol) was mixed with thionyl chloride (1.3 g, 10.6 mmol), pyridine (0.1 ml) and toluene (3 ml), followed by reacting them at 80° C. for 2 hours, and distilling off superfluous thionyl chloride and toluene under reduced pressure, to obtain raw 4-(pentyloxymethyl)benzoyl chloride.

Next, 2,6-difluoro-4-hydroxybenzonitrile (1.1 g, 7.1 mmol), pyridine (0.8 ml) and toluene (2 ml) were mixed. To this mixture was dropwise added a toluene 3 ml solution of the above 4-(pentyloxymethyl)benzoyl chloride, at room temperature for 10 minutes, followed by reacting them at 50° C. for 2 hours, addign water (10 ml) to the reaction product, extracting with toluene (50 ml), washing the resulting organic layer three times with 6N-HCl, three times with 2N-NaOH and three times with water, drying over anhydrous magnesium sulfate, distilling off the solvent under reduced pressure, subjecting the residue to silica gel column chromatography (eluent: toluene), to obtain raw 3,5-difluoro-4-cyanophenyl 4- (pentyloxymethyl)benzoate (2.5 g), and recrystallizing this product from heptane/ether (6/4), to obtain the captioned compound (1.8 g) (yield: 69.0%).

Cr 32.6~33.3 Iso

Further, the mass spector data well supported its structure.

Mass analysis: 360 (M+1).

According to the process of Example 1, the following compounds (No. 2 to No. 42) are prepared.

In addition, the respective compounds were represented by extracting R, 1, A=—($A_1$—$Z_1$)$_m$—($A_2$—$Z_2$)$_n$—($A_3$—$Z_3$)$_o$—, X, $Y_1$ and $Y_2$ as parameters in the compounds expressed by the formula (1).

(This applies to the succeeding Examples.)

| No. | R | 1 | A | X | $Y_1$ | $Y_2$ |
|---|---|---|---|---|---|---|
| 2 | $CH_3$ | 1 | 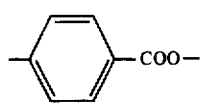 | CN | F | F |

-continued
| No. | R | l | A | X | $Y_1$ | $Y_2$ | |
|---|---|---|---|---|---|---|---|
| 3 | $C_2H_5$ | 1 | 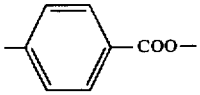 | CN | F | F | |
| 4 | $C_3H_7$ | 1 | 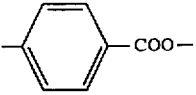 | CN | F | F | Cr room temp. or lower Iso |
| 5 | $C_4H_9$ | 1 | 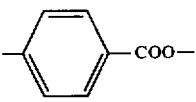 | CN | F | F | Cr room temp. or lower Iso |
| 6 | $CH_3$ | 1 | 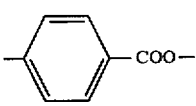 | $CF_3$ | F | F | |
| 7 | $C_2H_5$ | 1 | 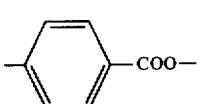 | $CF_3$ | F | F | |
| 8 | $C_3H_7$ | 1 | 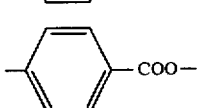 | $CF_3$ | F | F | Cr room temp. or lower Iso |
| 9 | $C_4H_9$ | 1 | 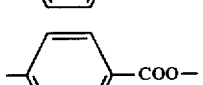 | $CF_3$ | F | F | |
| 10 | $C_5H_{11}$ | 1 | 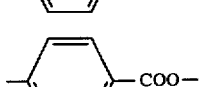 | $CF_3$ | F | F | |
| 11 | $CH_3$ | 1 | 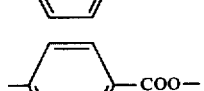 | $CF_2H$ | F | F | |
| 12 | $C_2H_5$ | 1 | 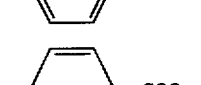 | $CF_2H$ | F | F | |
| 13 | $C_3H_7$ | 1 | 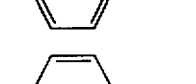 | $CF_2H$ | F | F | |
| 14 | $C_4H_9$ | 1 |  | $CF_2H$ | F | F | |
| 15 | $C_5H_{11}$ | 1 |  | $CF_2H$ | F | F | |
| 16 | $CH_3$ | 1 |  | $OCF_3$ | F | F | |
| 17 | $C_2H_5$ | 1 | 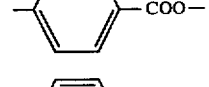 | $OCF_3$ | F | F | Cr room temp. or lower Iso |

-continued

| No. | R | l | A | X | Y₁ | Y₂ |
|---|---|---|---|---|---|---|
| 18 | $C_3H_7$ | 1 | —C₆H₄—COO— | $OCF_3$ | F | F |
| 19 | $C_4H_9$ | 1 | —C₆H₄—COO— | $OCF_3$ | F | F |
| 20 | $C_5H_{11}$ | 1 | —C₆H₄—COO— | $OCF_3$ | F | F |
| 21 | $CH_3$ | 1 | —C₆H₄—COO— | $OCF_2H$ | F | F |
| 22 | $C_2H_5$ | 1 | —C₆H₄—COO— | $OCF_2H$ | F | F |
| 23 | $C_3H_7$ | 1 | —C₆H₄—COO— | $OCF_2H$ | F | F |
| 24 | $C_4H_9$ | 1 | —C₆H₄—COO— | $OCF_2H$ | F | F |
| 25 | $C_5H_{11}$ | 1 | —C₆H₄—COO— | $OCF_2H$ | F | F |
| 26 | $CH_3$ | 1 | —C₆H₄—COO— | $CFH_2$ | F | F |
| 27 | $C_2H_5$ | 1 | —C₆H₄—COO— | $CFH_2$ | F | F |
| 28 | $C_3H_7$ | 1 | —C₆H₄—COO— | $CFH_2$ | F | F |
| 29 | $C_4H_9$ | 1 | —C₆H₄—COO— | $CFH_2$ | F | F |
| 30 | $C_5H_{11}$ | 1 | —C₆H₄—COO— | $CFH_2$ | F | F |
| 31 | $C_3H_7$ | 1 | pyridine-COO— | CN | F | F |

-continued

| No. | R | l | A | X | Y₁ | Y₂ |
|---|---|---|---|---|---|---|
| 32 | $C_4H_9$ | 1 | 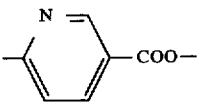 | $CF_3$ | F | F |
| 33 | $C_5H_{11}$ | 1 | 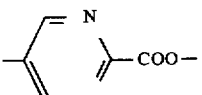 | $OCF_3$ | F | F |
| 34 | $C_{10}H_{21}$ | 1 | 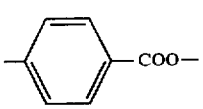 | CN | F | F |
| 35 | $C_7H_{15}$ | 1 | 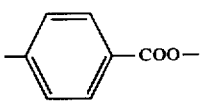 | $CF_3$ | F | F |
| 36 | $C_6H_{13}$ | 1 | 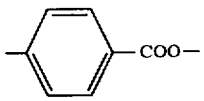 | $OCF_3$ | F | F |
| 37 | $C_3H_7$ | 1 | 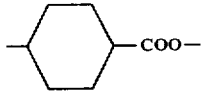 | CN | F | F |
| 38 | $C_4H_9$ | 1 | 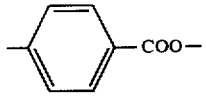 | $CF_3$ | F | F |
| 39 | $C_5H_{11}$ | 1 | 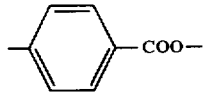 | $OCF_3$ | F | F |
| 40 | $C_2H_5$ | 1 | 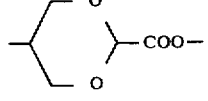 | CN | F | F |
| 41 | $C_7H_{15}$ | 1 | 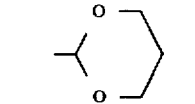 | $CF_2H$ | F | F |
| 42 | $C_8H_{17}$ | 1 | 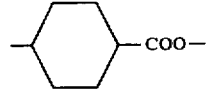 | $OCF_2H$ | F | F |

Example 2

Preparation of 3,5-difluoro-4-cyanophenyl 2-fluoro-4-(propoxymethyl)benzoate (in the formula (1), R=$C_3H_7$, l=1, m=1, n and o=both, 0, $A_1$=2-fluoro-1,4-phenylene group, $Z_1$=—COO—, X=CN and $Y_1$ and $Y_2$ =both, F) (Compound No. 43)

2-Fluoro-4-(propoxymethyl)benzoic acid (1.5 g, 7.1 mmol) was mixed with thionyl chloride (1.3 g, 10.6 mmol), pyridine (0.1 ml) and toluene (3 ml), followed by reacting them at 80° C. for 2 hours, and distilling off superfluous thionyl chloride and toluene under reduced pressure, to obtain raw 2-fluoro-4-(propoxymethyl)benzoyl chloride.

Next, 2,6-difluoro-4-hydroxybenzonitrile (1.1 g, 7.1 mmol), pyridine (0.8 ml) and toluene (2 ml) were mixed. To this mixture was dropwise added a toluene 3 ml solution of the above 2-fluoro-4-(propoxymethyl)benzoyl chloride at room temperature for 10 minutes, followed by reacting them at 50° C. for 2 hours, adding water (10 ml) to the reaction product, extracting with toluene (50 ml), washing the resulting organic layer three times with 6N-HCl, three times with 2N-NaOH and three times with water, drying over anhydrous magnesium sulfate, distilling off the solvent under reduced pressure, subjecting the residue to silica gel column chromatography (eluent: toluene), to obtain raw 3,5-difluoro-4-cyanophenyl 2-fluoro-4-(propoxymethyl)benzoate (2.4 g) and recrystallizing this product from heptane/ether (8/2), to obtain the captioned compound (1.6 g, yield: 64.8%). Cr 23.5–24.3 Iso Further, the mass Spector data well supported its structure.

Mass analysis: 350 (M+1)

According to the process of Example 2, the following compounds (No. 44 to No. 88) are prepared.

| No. | R | l | A | X | $Y_1$ | $Y_2$ |
|---|---|---|---|---|---|---|
| 44 | $C_2H_5$ | 1 | 2-F-phenyl-COO— | CN | F | F |
| 45 | $C_4H_9$ | 1 | 2-F-phenyl-COO— | CN | F | F |
| 46 | $C_5H_{11}$ | 1 | 2-F-phenyl-COO— | CN | F | F |
| 47 | $CH_3$ | 5 | 2-F-phenyl-COO— | CN | F | F |
| 48 | $C_4H_9$ | 2 | 2-F-phenyl-COO— | CN | F | F |
| 49 | $C_3H_7$ | 1 | 2,6-diF-phenyl-COO— | CN | F | F |
| 50 | $C_4H_9$ | 1 | 2,6-diF-phenyl-COO— | CN | F | F |
| 51 | $CH_3$ | 4 | 2,6-diF-phenyl-COO— | CN | F | F |
| 52 | $C_5H_{11}$ | 5 | 2,6-diF-phenyl-COO— | CN | F | F |
| 53 | $CH_3$ | 1 | 2-F-phenyl-COO— | $CF_3$ | F | F |
| 54 | $C_3H_7$ | 1 | 2-F-phenyl-COO— | $CF_3$ | F | F |
| 55 | $C_4H_9$ | 1 | 2-F-phenyl-COO— | $CF_3$ | F | F |
| 66 | $C_3H_7$ | 3 | 2-F-phenyl-COO— | $OCF_3$ | F | F |
| 67 | $C_2H_5$ | 1 | 2,6-diF-phenyl-COO— | $OCF_3$ | F | F |
| 68 | $C_3H_7$ | 1 | 2,6-diF-phenyl-COO— | $OCF_3$ | F | F |
| 69 | $CH_3$ | 2 | 2,6-diF-phenyl-COO— | $OCF_3$ | F | F |
| 70 | $C_4H_9$ | 4 | 2,6-diF-phenyl-COO— | $OCF_3$ | F | F |
| 71 | $C_3H_7$ | 1 | 2-F-phenyl-COO— | $OCF_2H$ | F | F |
| 72 | $C_4H_9$ | 2 | 2-F-phenyl-COO— | $OCF_2H$ | F | F |

| No. R | 1 | A | X | Y₁ | Y₂ |
|---|---|---|---|---|---|
| 73 C₃H₇ | 1 | 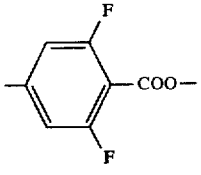 | OCF₂H | F | F |
| 74 C₅H₁₁ | 5 | 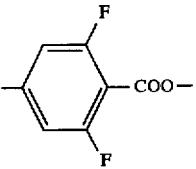 | OCF₂H | F | F |
| 75 C₃H₇ | 1 | 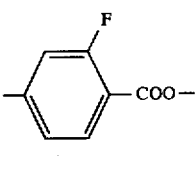 | CF₂H | F | F |
| 76 C₅H₁₁ | 1 | 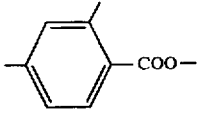 | CF₂H | F | F |
| 77 C₉H₁₉ | 1 | 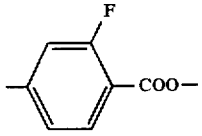 | CF₂H | F | F |
| 78 C₅H₁₁ | 2 | 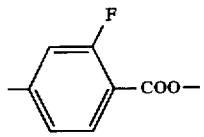 | CF₂H | F | F |
| 79 C₂H₅ | 1 | 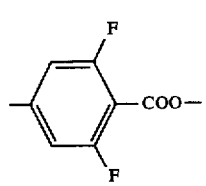 | CF₂H | F | F |
| 80 C₃H₇ | 1 | 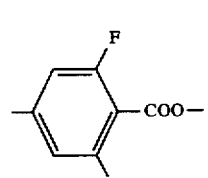 | CF₂H | F | F |
| 81 CH₃ | 2 | 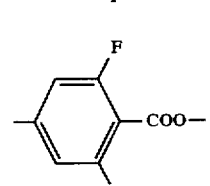 | CF₂H | F | F |
| 82 C₃H₇ | 3 | 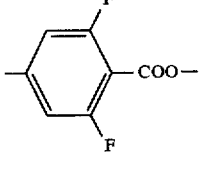 | CF₂H | F | F |
| 83 C₃H₇ | 1 | 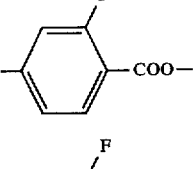 | CFH₂ | F | F |
| 84 C₅H₁₁ | 1 | 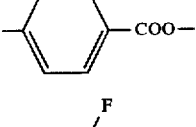 | CFH₂ | F | F |
| 85 C₂H₅ | 9 | 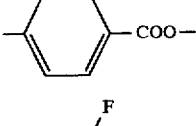 | CFH₂ | F | F |
| 86 C₃H₇ | 1 | 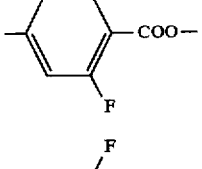 | CFH₂ | F | F |
| 87 CH₃ | 2 | 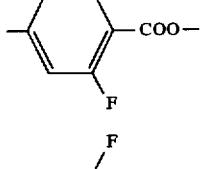 | CFH₂ | F | F |
| 88 C₃H₇ | 3 | 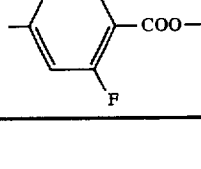 | CFH₂ | F | F |

Example 3

Preparation of 3,5-difluoro-4-cyanophenyl 4-(ethoxyethyl)benzoate (in the formula (1), R=C₂H₅, l=2, m=1, n and o=both, 0, A₁=1,4-phenylene group, Z₁=—COO—, X=CN, and Y₁ and Y₂ =both, F) (Compound No. 89)

4-(Ethoxyethyl)benzoic acid (1.4 g, 7.2 mmol) was mixed with thionyl chloride (1.3 g, 10.8 mmol), pyridine (0.1 ml) and toluene (4 ml), followed by reacting them at 80° C. for 2 hours, distilling superfluous thionyl chloride and toluene under reduced pressure, to obtain raw 4-(ethoxy-ethyl) benzoyl chloride.

Next, 2,6-difluoro-4-hydroxybenzonitrile (1.1 g, 7.2 mmol), pyridine (0.8 ml) and toluene (2 ml) were mixed. To this mixture was dropwise added a toluene 3 ml solution of the above 4-(ethoxyethyl)benzoyl chloride, at room temperature for 5 minutes, followed by reacting them at 50° C. for 3 hours, adding water (15 ml) to the reaction product, extracting with toluene (50 ml), washing the resulting organic layer three times with 6N-HCl, three times with 2N-NaOH and three times with water, drying over anhydrous magnesium sulfate, distilling off the solvent under reduced pressure, subjecting the resulting residue to silica gel column chromatography (eluent: toluene), to obtain raw 3,5-difluoro-4-cyanophenyl 4-(ethoxyethyl)benzoate (2.2 g), and recrystallizing this product from heptane/ether (8/2), to obtain the captioned compound (1.5 g, yield: 62.8%).

Further, the mass Spector data well supported its structure.

Mass analysis: 332 (M+1)

According to the process of Example 3, the following compounds (No. 90 to No. 107) are prepared.

| No. | R | 1 | A | X | $Y_1$ | $Y_2$ |
|---|---|---|---|---|---|---|
| 90 | $CH_3$ | 5 | phenyl-COO- | CN | F | F |
| 91 | $C_2H_5$ | 3 | cyclohexyl-COO- | CN | F | F |
| 92 | $C_4H_9$ | 3 | cyclohexyl-COO- | CN | F | F |
| 93 | $CH_3$ | 9 | phenyl-COO- | $CF_3$ | F | F |
| 94 | $C_3H_7$ | 2 | phenyl-COO- | $CF_3$ | F | F |
| 95 | $C_5H_{11}$ | 5 | cyclohexyl-COO- | $CF_3$ | F | F |
| 96 | $C_2H_5$ | 2 | cyclohexyl-COO- | $CF_2H$ | F | F |
| 97 | $C_3H_7$ | 3 | phenyl-COO- | $CF_2H$ | F | F |
| 98 | $C_4H_9$ | 5 | phenyl-COO- | $CF_2H$ | F | F |
| 99 | $CH_3$ | 2 | cyclohexyl-COO- | $CFH_2$ | F | F |
| 100 | $CH_3$ | 3 | phenyl-COO- | $CFH_2$ | F | F |
| 101 | $C_{10}H_{21}$ | 9 | phenyl-COO- | $CFH_2$ | F | F |
| 102 | $CH_3$ | 4 | phenyl-COO- | $OCF_3$ | F | F |
| 103 | $C_3H_7$ | 2 | cyclohexyl-COO- | $OCF_3$ | F | F |
| 104 | $C_5H_{11}$ | 2 | phenyl-COO- | $OCF_3$ | F | F |
| 105 | $C_2H_5$ | 5 | phenyl-COO- | $OCF_2H$ | F | F |
| 106 | $C_4H_9$ | 4 | phenyl-COO- | $OCF_2H$ | F | F |
| 107 | $C_5H_{11}$ | 2 | cyclohexyl-COO- | $OCF_2H$ | F | F |

Example 4

Preparation of 3', 5'-difluoro-4'-cyanobiphenyl-4-yl 4-(propoxymethyl)benzoate (in the formula (1), R=$C_3H_7$, l=1, m and n=both, 1, o=0, $A_1$ and $A_2$=both, 1,4-phenylene group, $Z_1$=—COO—, $Z_2$=covalent bond, X=CN, and $Y_1$ and $Y_2$=both, F) (Compound No. 108) 4-(Propoxymethyl) benzoic acid (1.0 g, 5.2 mmol), 3', 5'-difluoro-4'-cyano-4-hydroxybiphenyl (1.2 g, 5.2 mmol), DAMP (0.2 g, 1.6 mmol) and dichloromethane (20 ml) were mixed, followed by dropwise adding to the mixture, a dichloromethane 6 ml solution of DCC (1.3 g, 6.2 mmol), at room temperature for 5 minutes, stirring them as it was, for 12 hours, filtering off deposited crystals, adding toluene (50 ml) to the filtrate, washing the resulting organic layer three times with 6N-HCl, three times with 2N-NaOH and three times with water, drying over anhydrous magnesium sulfate, distilling off the solvent under reduced pressure, subjecting the residue to silica gel column chromatography (eluent: toluene), to obtain raw 3',5'-difluoro-4'-cyanobiphenyl-4-yl 4-(propoxymethyl)-benzoate (2.7 g), and recrystallizing this product from heptane/ethyl acetate (7/3), to obtain the captioned compound (1.2 g, yield: 48.3%).

Cr 91.9 to 92.8 N 121.2 Iso

Further, the mass spector data well supported its structure.

Mass analysis: 408 (M+1)

According to the process of Example 4, the following pounds (No. 109 to No. 147) are prepared.

| No. | R | l | A | X | Y₁ | Y₂ | |
|---|---|---|---|---|---|---|---|
| 109 | $C_4H_9$ | 1 | 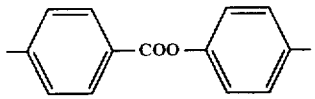 | CN | F | F | |
| 110 | $C_5H_{11}$ | 1 | 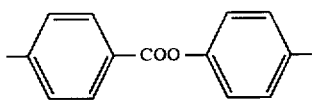 | CN | F | F | |
| 111 | $CH_3$ | 2 | 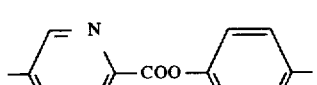 | CN | F | F | |
| 112 | $C_3H_7$ | 1 | 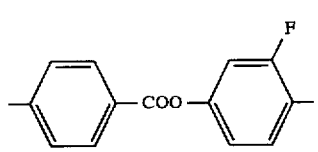 | CN | F | F | |
| 113 | $C_5H_{11}$ | 1 | 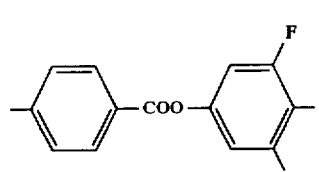 | CN | F | F | |
| 114 | $C_2H_5$ | 1 | 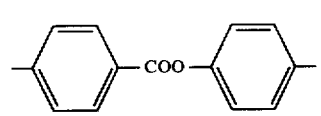 | $CF_3$ | F | F | |
| 115 | $C_3H_7$ | 1 | 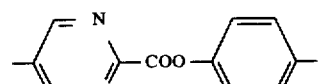 | $CF_3$ | F | F | Cr 91.4–92.2 SA 102.3– 103.7 Iso |
| 116 | $C_3H_7$ | 3 | 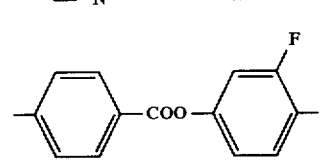 | $CF_3$ | F | F | |
| 117 | $C_2H_5$ | 1 | 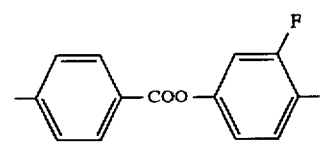 | $CF_3$ | F | F | |
| 118 | $C_4H_9$ | 1 | 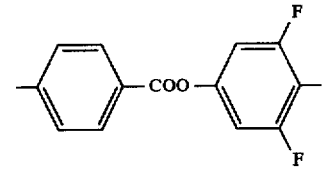 | $CF_3$ | F | F | |
| 119 | $C_2H_5$ | 1 | 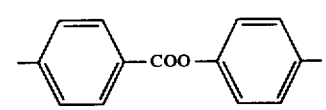 | $CF_2H$ | F | F | |
| 120 | $C_3H_7$ | 1 | 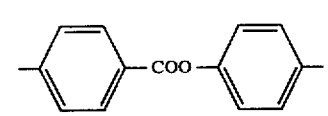 | $CF_2H$ | F | F | |

-continued

| No. | R | l | A | X | Y₁ | Y₂ |
|---|---|---|---|---|---|---|
| 121 | $C_5H_{11}$ | 4 | —⟨phenyl⟩—COO—⟨phenyl⟩— | $CF_2H$ | F | F |
| 122 | $C_3H_7$ | 1 | —⟨pyridyl⟩—COO—⟨phenyl-F⟩— | $CF_2H$ | F | F |
| 123 | $CH_3$ | 1 | —⟨phenyl⟩—COO—⟨phenyl-F,F⟩— | $CF_2H$ | F | F |
| 124 | $C_4H_9$ | 1 | —⟨phenyl⟩—COO—⟨phenyl⟩— | $OCF_3$ | F | F |
| 125 | $C_5H_{11}$ | 1 | —⟨phenyl⟩—COO—⟨phenyl⟩— | $OCF_3$ | F | F |
| 126 | $C_2H_5$ | 4 | —⟨phenyl⟩—COO—⟨phenyl-F⟩— | $OCF_3$ | F | F |
| 127 | $CH_3$ | 1 | —⟨pyrimidyl⟩—COO—⟨phenyl⟩— | $OCF_3$ | F | F |
| 128 | $C_4H_9$ | 5 | —⟨phenyl⟩—COO—⟨phenyl-F,F⟩— | $OCF_3$ | F | F |
| 129 | $C_3H_7$ | 1 | —⟨phenyl⟩—COO—⟨phenyl⟩— | $OCF_2H$ | F | F |
| 130 | $C_4H_9$ | 1 | —⟨phenyl⟩—COO—⟨phenyl⟩— | $OCF_2H$ | F | F |
| 131 | $CH_3$ | 3 | —⟨pyridyl⟩—COO—⟨phenyl-F⟩— | $OCF_2H$ | F | F |
| 132 | $C_2H_5$ | 1 | —⟨phenyl⟩—COO—⟨phenyl-F⟩— | $OCF_2H$ | F | F |

| No. | R | l | A | X | $Y_1$ | $Y_2$ | |
|---|---|---|---|---|---|---|---|
| 133 | $CH_3$ | 1 | 2,6-F phenyl-COO-phenyl | $OCF_2H$ | F | F | |
| 134 | $C_3H_7$ | 1 | phenyl-COO-phenyl | $CFH_2$ | F | F | |
| 135 | $C_4H_9$ | 1 | phenyl-COO-phenyl | $CFH_2$ | F | F | |
| 136 | $C_8H_{17}$ | 5 | phenyl-COO-(3-F)phenyl | $CFH_2$ | F | F | |
| 137 | $C_2H_5$ | 1 | phenyl-COO-(3-F)phenyl | $CFH_2$ | F | F | |
| 138 | $C_5H_{11}$ | 1 | 2,6-F phenyl-COO-(3-F)phenyl | $CFH_2$ | F | F | |
| 139 | $C_3H_7$ | 1 | 2-F phenyl-COO-phenyl | CN | F | F | Cr 85.3–85.9 N 112.6 Iso |
| 140 | $C_4H_9$ | 1 | 2,6-F phenyl-COO-(3-F)phenyl | $CF_3$ | F | F | |
| 141 | $CH_3$ | 1 | 2,6-F phenyl-COO-(3-F)phenyl | $CF_2H$ | F | F | |
| 142 | $C_2H_5$ | 1 | 2,6-F phenyl-COO-phenyl | $OCF_3$ | F | F | |

-continued

| No. | R | 1 | A | X | $Y_1$ | $Y_2$ |
|---|---|---|---|---|---|---|
| 143 | $C_5H_{11}$ | 1 | —[2-F-phenyl]—COO—[2,6-F₂-phenyl]— | $OCF_2H$ | F | F |
| 144 | $C_3H_7$ | 1 | —[cyclohexyl]—COO—[phenyl]— | CN | F | F |
| 145 | $C_3H_7$ | 1 | —[cyclohexyl]—COO—[phenyl]— | $CF_3$ | F | F |
| 146 | $C_5H_{11}$ | 1 | —[cyclohexyl]—COO—[phenyl]— | $CF_3$ | F | F |
| 147 | $C_4H_9$ | 1 | —[cyclohexyl]—COO—[phenyl]— | $OCF_3$ | F | F |

Example 5

Preparation of trans-4-(3,5-difluoro-4-cyanophenyl)-cyclohexyl 4-(butoxymethyl)benzoate (in the formula (1), R=$C_4H_9$, l=1, m and n=both, 1, o=0, $A_1$=1,4-phenylene group, $A_2$=trans-1,4-cyclohexylene group, $Z_1$=—COO—, $Z_2$=covalent bond, X=CN, and $Y_1$ and $Y_2$=both, F) (Compound No. 148) 4-(butoxymethyl)benzoic acid (1.5 g, 7.2 mmol) was mixed with thionyl chloride (1.3 g, 10.8 mmol) pyridine (0.1 ml) and toluene (3 ml), followed by reacting them at 80° C., for 2 hours, and distilling off superfluous thionyl chloride and toluene under reduced pressure, to obtain raw 4-(butoxymethyl)benzoyl chloride.

Next, 4-(trans-4-hydroxycyclohexyl)-2,6-difluoro-benzonitrile (1.7 g, 7.2 mmol), pyridine (0.8 ml) and toluene (2 ml) were mixed, followed by dropwise adding to the mixture, a toluene 3 ml solution of the above 4-(butoxymethyl)benzoyl chloride, at room temperature for 10 minutes, reacting them at 50° C. for 2 hours, adding water (10 ml) to the reaction product, extracting with toluene (50 ml), washing the resulting organic layer three times with 6N-HCl, three times with 2N-NaOH and three times with water, drying over anhydrous magnesium sulfate, distilling off the solvent under reduced pressure, subjecting the residue to silica gel column chromatography (eluent: toluene), to obtain raw trans-4'-(3,5-difluoro-4-cyanophenyl) cyclohexyl 4-(butoxymethyl)benzoate (2.9 g), and recrystallizing this product from heptane/ether (6/4), to obtain the captioned compound (2.3 g, yield: 74.7%).

Further, the mass spector data well supported its structure.

Mass analysis: 428 (M+1)

According to the process of Example 5, the following compounds (No. 149 to No. 186) are prepared:

| No. | R | 1 | A | X | $Y_1$ | $Y_2$ |
|---|---|---|---|---|---|---|
| 149 | $C_2H_5$ | 1 | —[phenyl]—COO—[cyclohexyl]— | CN | F | F |
| 150 | $C_3H_7$ | 1 | —[phenyl]—COO—[cyclohexyl]— | CN | F | F |
| 151 | $C_5H_{11}$ | 1 | —[pyrimidine]—COO—[cyclohexyl]— | CN | F | F |

-continued
| No. | R | l | A | X | Y₁ | Y₂ |
|---|---|---|---|---|---|---|
| 152 | $C_2H_5$ | 2 | 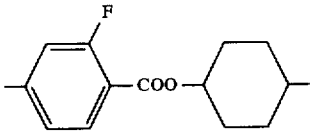 | CN | F | F |
| 153 | $CH_3$ | 1 | 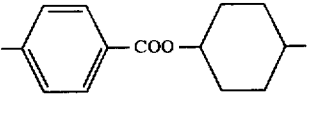 | $CF_3$ | F | F |
| 154 | $C_3H_7$ | 1 | 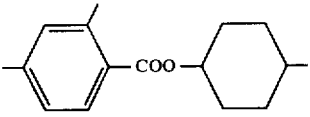 | $CF_3$ | F | F |
| 155 | $C_4H_9$ | 1 | 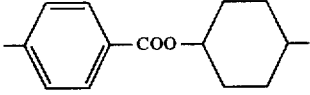 | $CF_3$ | F | F |
| 156 | $C_5H_{11}$ | 9 | 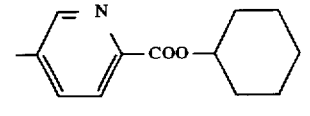 | $CF_3$ | F | F |
| 157 | $C_2H_5$ | 1 | 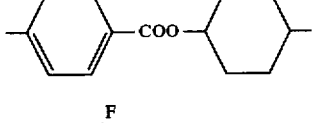 | $CF_2H$ | F | F |
| 158 | $C_3H_7$ | 1 | 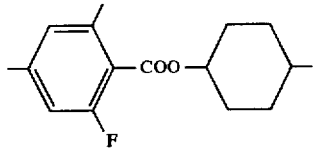 | $CF_2H$ | F | F |
| 159 | $C_4H_9$ | 1 | 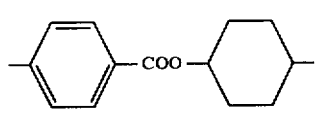 | $CF_2H$ | F | F |
| 160 | $C_2H_5$ | 3 | 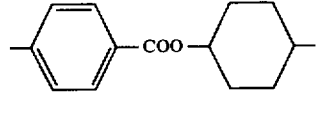 | $CF_2H$ | F | F |
| 161 | $CH_3$ | 1 | 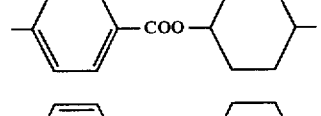 | $OCF_3$ | F | F |
| 162 | $C_2H_5$ | 1 | 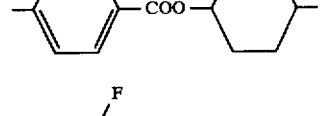 | $OCF_3$ | F | F |
| 163 | $C_5H_{11}$ | 1 | 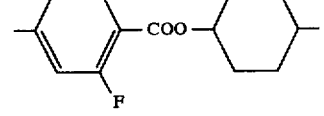 | $OCF_3$ | F | F |

-continued

| No. | R | l | A | X | $Y_1$ | $Y_2$ |
|---|---|---|---|---|---|---|
| 164 | $C_4H_9$ | 2 | pyridazine-COO-cyclohexyl | $OCF_3$ | F | F |
| 165 | $CH_3$ | 1 | phenyl-COO-cyclohexyl | $OCF_2H$ | F | F |
| 166 | $C_3H_7$ | 1 | phenyl-COO-cyclohexyl | $OCF_2H$ | F | F |
| 167 | $C_5H_{11}$ | 1 | phenyl-COO-cyclohexyl | $OCF_2H$ | F | F |
| 168 | $C_{10}H_{21}$ | 4 | (2-F)phenyl-COO-cyclohexyl | $OCF_2H$ | F | F |
| 169 | $C_3H_7$ | 1 | phenyl-COO-cyclohexyl | $CFH_2$ | F | F |
| 170 | $C_4H_9$ | 1 | phenyl-COO-cyclohexyl | $CFH_2$ | F | F |
| 171 | $C_5H_{11}$ | 1 | phenyl-COO-cyclohexyl | $CFH_2$ | F | F |
| 172 | $C_6H_{13}$ | 2 | (2-F)phenyl-COO-cyclohexyl | $CFH_2$ | F | F |
| 173 | $C_2H_5$ | 1 | (2-F)phenyl-COO-cyclohexyl | $CFH_2$ | F | F |
| 174 | $C_3H_7$ | 1 | cyclohexyl-COO-cyclohexyl | CN | F | F |
| 175 | $C_5H_{11}$ | 1 | cyclohexyl-COO-cyclohexyl | CN | F | F |
| 176 | $C_2H_5$ | 1 | cyclohexyl-COO-cyclohexyl | $CF_3$ | F | F |

-continued

| No. | R | l | A | X | $Y_1$ | $Y_2$ |
|---|---|---|---|---|---|---|
| 177 | $C_3H_7$ | 1 | cyclohexyl-COO-phenyl | $CF_3$ | F | F |
| 178 | $C_3H_7$ | 1 | dioxanyl-COO-phenyl | $CF_3$ | F | F |
| 179 | $C_4H_9$ | 1 | cyclohexyl-COO-phenyl | $CF_2H$ | F | F |
| 180 | $C_3H_7$ | 3 | cyclohexyl-COO-phenyl | $CF_2H$ | F | F |
| 181 | $CH_3$ | 1 | cyclohexyl-COO-phenyl | $OCF_3$ | F | F |
| 182 | $C_4H_9$ | 1 | cyclohexyl-COO-phenyl | $OCF_3$ | F | F |
| 183 | $C_5H_{11}$ | 1 | cyclohexyl-COO-phenyl | $OCF_2H$ | F | F |
| 184 | $C_8H_{17}$ | 2 | cyclohexyl-COO-phenyl | $OCF_2H$ | F | F |
| 185 | $C_3H_7$ | 1 | cyclohexyl-COO-phenyl | $CFH_2$ | F | F |
| 186 | $CH_3$ | 7 | cyclohexyl-COO-phenyl | $CFH_2$ | F | F |

Example 6

Preparation of 3,5-difluoro-4-cyanophenyl 4-(trans-4-(ethoxymethyl)cyclohexyl)benzoate (in the formula (1), $R=C_2H_5$, l=1, m and n=both, 1, o=0, $A_1$=trans-1,4-cyclohexylene group, $A_2$=1,4-phenylene group, $Z_1$=covalent bond, $Z_2$=—COO—, X=CN, and $Y_1$ and $Y_2$=both, F) (Compound No. 187) 4-(Trans-4-(ethoxymethyl)cyclohexyl)benzoic acid (1.9 g, 7.1 mmol) was mixed with thionyl chloride (1.3 g, 10.6 mmol), pyridine (0.1 ml) and toluene (4 ml), followed by reacting them at 80° C. for 2 hours, and distilling off superfluous thionyl chloride and toluene under reduced pressure, to obtain raw 4-(trans-4-(ethoxymethyl)cyclohexyl)benzoyl chloride.

Next, 2,6-difluoro-4-hydroxybenzonitrile (1.1 g, 7.1 mmol) was mixed with pyridine (0.8 ml) and toluene (2 me), followed by dropwise adding to the mixture, a toluene 3 ml solution of the above 4-(trans-4-(ethoxy-methyl)cyclohexyl) benzoyl chloride, at room temperature for 5 minutes, reacting them at 50° C., for 3 hours, adding water (15 ml) to the reaction product, extracting with toluene (50 ml), washing the resulting organic layer three times with 6N-HCl, three times with 2N-NaOH and three times with water, drying over magnesium sulfate, distilling off the solvent under reduced pressure, subjecting the residue to silica gel column chromatography (eluent: toluene), to obtain raw 3,5-difluoro-4-cyanophenyl 4-(trans-4-(ethoxymethyl) cyclohexyl)benzoate (2.7 g), and recrystallizing the product from heptane/ether (7/3), to obtain the captioned compound (2.2 g, yield: 77.7%).

Cr 75.1–75.8N 125.3 Iso

Further, the mass spector data well supported its structure.

Mass analysis: 400 (M+1)

According to the process of Example 6, the following compounds (No. 188 to No. 228) are prepared:

| No. | R | l | A | X | Y₁ | Y₂ |
|---|---|---|---|---|---|---|
| 188 | C₃H₇ | 1 | 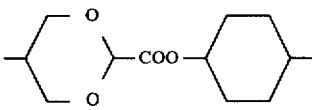 | CN | F | F |
| 189 | C₄H₉ | 1 | 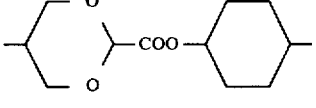 | CN | F | F |
| 190 | CH₃ | 9 | 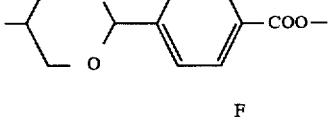 | CN | F | F |
| 191 | C₃H₇ | 1 | 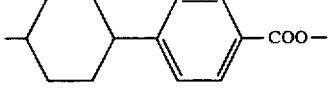 | CN | F | F |
| 192 | C₅H₁₁ | 1 | 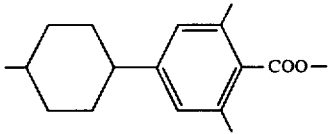 | CN | F | F |
| 193 | C₃H₇ | 1 | 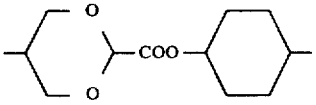 | CF₃ | F | F |
| 194 | C₅H₁₁ | 1 | 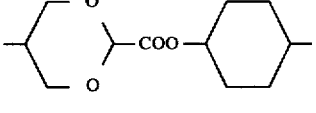 | CF₃ | F | F |
| 195 | C₃H₇ | 3 | 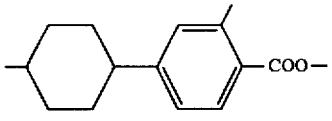 | CF₃ | F | F |
| 196 | C₂H₅ | 1 | 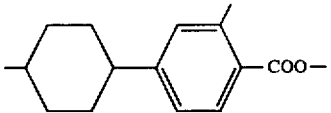 | CF₃ | F | F |
| 197 | C₄H₉ | 1 | 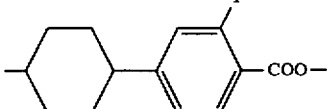 | CF₃ | F | F |
| 198 | C₂H₅ | 1 | 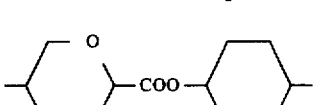 | CF₂H | F | F |

-continued

| No. | R | l | A | X | Y₁ | Y₂ |
|---|---|---|---|---|---|---|
| 199 | C₃H₇ | 1 | [tetrahydropyran-COO-cyclohexane] | CF₂H | F | F |
| 200 | C₅H₁₁ | 4 | [tetrahydropyran-(2-F-phenyl)-COO-] | CF₂H | F | F |
| 201 | C₃H₇ | 1 | [cyclohexane-(2-F-phenyl)-COO-] | CF₂H | F | F |
| 202 | CH₃ | 1 | [cyclohexane-(2,6-diF-phenyl)-COO-] | CF₂H | F | F |
| 203 | C₂H₅ | 1 | [tetrahydropyran-COO-cyclohexane] | OCF₃ | F | F |
| 204 | C₅H₁₁ | 1 | [tetrahydropyran-phenyl-COO-] | OCF₃ | F | F |
| 205 | C₆H₁₃ | 4 | [tetrahydropyran-COO-cyclohexane] | OCF₃ | F | F |
| 206 | C₂H₅ | 1 | [cyclohexane-(2-F-phenyl)-COO-] | OCF₃ | F | F |
| 207 | C₄H₉ | 5 | [cyclohexane-(2,6-diF-phenyl)-COO-] | OCF₃ | F | F |
| 208 | C₃H₇ | 1 | [tetrahydropyran-COO-cyclohexane] | OCF₂H | F | F |
| 209 | C₄H₉ | 1 | [tetrahydropyran-COO-cyclohexane] | OCF₂H | F | F |

-continued

| No. | R | l | A | X | $Y_1$ | $Y_2$ | |
|---|---|---|---|---|---|---|---|
| 210 | $CH_3$ | 3 | cyclohexyl-(2-F-phenyl)-COO- | $OCF_2H$ | F | F | |
| 211 | $C_2H_5$ | 1 | cyclohexyl-(2-F-phenyl)-COO- | $OCF_2H$ | F | F | |
| 212 | $CH_3$ | 1 | cyclohexyl-(2,6-diF-phenyl)-COO- | $OCF_2H$ | F | F | |
| 213 | $C_2H_5$ | 1 | dioxanyl-COO-cyclohexyl- | $CFH_2$ | F | F | |
| 214 | $C_5H_{11}$ | 1 | dioxanyl-COO-cyclohexyl- | $CFH_2$ | F | F | |
| 215 | $CH_3$ | 6 | dioxanyl-(2-F-phenyl)-COO- | $CFH_2$ | F | F | |
| 216 | $C_3H_7$ | 1 | cyclohexyl-(2-F-phenyl)-COO- | $CFH_2$ | F | F | |
| 217 | $C_4H_9$ | 1 | cyclohexyl-(2,6-diF-phenyl)-COO- | $CFH_2$ | F | F | |
| 218 | $CH_3$ | 1 | cyclohexyl-COO-cyclohexyl- | CN | F | F | Cr 76.8–78.2 N 158.9 Iso |
| 219 | $C_5H_{11}$ | 1 | cyclohexyl-COO-cyclohexyl- | CN | F | F | |
| 220 | $CH_3$ | 1 | cyclohexyl-COO-cyclohexyl- | $CF_3$ | F | F | |
| 221 | $C_3H_7$ | 1 | cyclohexyl-COO-cyclohexyl- | $CF_3$ | F | F | |

-continued

| No. | R | l | A | X | $Y_1$ | $Y_2$ |
|---|---|---|---|---|---|---|
| 222 | $C_2H_5$ | 1 | -Cy-COO-Cy- | $CF_2H$ | F | F |
| 223 | $C_5H_{11}$ | 5 | -(dioxane)-COO-Cy- | $CF_2H$ | F | F |
| 224 | $C_4H_9$ | 1 | -Cy-COO-Cy- | $OCF_3$ | F | F |
| 225 | $C_5H_{11}$ | 1 | -Cy-COO-Cy- | $OCF_3$ | F | F |
| 226 | $C_4H_9$ | 1 | -Cy-COO-Cy- | $OCF_2H$ | F | F |
| 227 | $C_8H_{17}$ | 1 | -Cy-COO-Cy- | $OCF_2H$ | F | F |
| 228 | $C_3H_7$ | 1 | -Cy-COO-Cy- | $CFH_2$ | F | F |

Example 7

Preparation of 3,5-difluoro-4-cyanophenyl 4'-(pentyloxymethyl)biphenyl-4-carboxylate (in the formula (1), R=$C_5H_{11}$, l=1, m and n=both, 1, o=0, $A_1$ and $A_2$=both, 1,4-phenylene group, $Z_1$=covalent bond, $Z_2$=—COO—, X=CN, and $Y_1$ and $Y_2$=both, F) (Compound No. 229) 4'-(Pentyloxymethyl)biphenyl-4-carboxyic acid (2.1 g, 7.0 mmol) was mixed with thionyl chloride (1.3 g, 10.6 mmol), pyridine (0.1 ml) and toluene (4 ml), followed by reacting them at 80° C. for 2 hours, and distilling off superfluous thionyl chloride and toluene under reduced pressure, to obtain raw 4'-(pentyloxymethyl)biphenyl-4-carbonyl chloride.

Next, 2,6-difluoro-4-hydroxybenzonitrile (1.1 g, 7.1 mmol) was mixed with pyridine (0.8 ml) and toluene (2 ml), followed by dropwise adding to the mixture, a toluene 3 ml solution of the above 4'-(pentyloxymethyl)-biphenyl-4-carbonyl chloride, at room temperature for 5 minutes, reacting them at 50° C. for 3 hours, adding water (15 ml) to the reaction product, extracting with toluene (50 ml), washing the resulting organic layer, three times with 6N-HCl, three times with 2N-NaOH and three times with water, drying over anhydrous magnesium sulfate, distilling off the solvent under reduced pressure, subjecting the residue to silica gel column chromatography (eluent: toluene), to obtain raw 3,5-difluoro-4-cyano-phenyl 4'-(pentyloxymethyl)biphenyl-4-carboxylate (2.9 g), and recrystallizing this product from heptane/ether (1/1), to obtain the captioned compound (2.0 g, yield: 65.3%).

Further, the mass spector data well supported its structure.
Mass analysis: 436 (M+1)

According to the process of Example 7, the following compounds (No. 230 to No. 270) are prepared:

| No. | R | l | A | X | $Y_1$ | $Y_2$ |
|---|---|---|---|---|---|---|
| 230 | $C_3H_7$ | 1 | -Ph-Ph-COO- | CN | F | F |
| 231 | $C_2H_5$ | 1 | -Ph-Pyr-COO- | CN | F | F |

-continued
| No. | R | l | A | X | $Y_1$ | $Y_2$ |
|---|---|---|---|---|---|---|
| 232 | $C_3H_7$ | 2 | 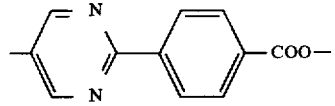 | CN | F | F |
| 233 | $C_3H_7$ | 1 | 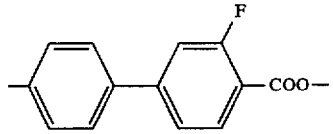 | CN | F | F |
| 234 | $C_5H_{11}$ | 1 | 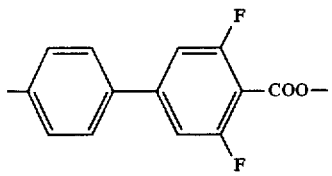 | CN | F | F |
| 235 | $CH_3$ | 1 | 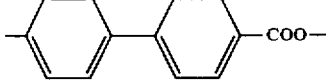 | $CF_3$ | F | F |
| 236 | $C_3H_7$ | 1 | 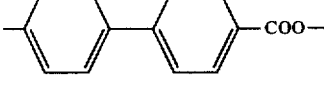 | $CF_3$ | F | F |
| 237 | $CH_3$ | 3 | 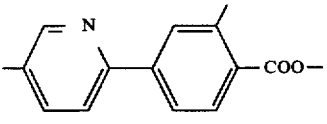 | $CF_3$ | F | F |
| 238 | $C_2H_5$ | 1 | 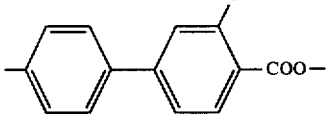 | $CF_3$ | F | F |
| 239 | $C_4H_9$ | 1 | 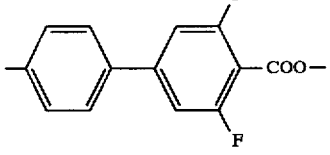 | $CF_3$ | F | F |
| 240 | $C_2H_5$ | 1 | 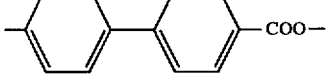 | $CF_2H$ | F | F |
| 241 | $C_3H_7$ | 1 | 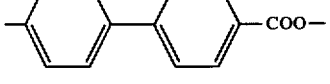 | $CF_2H$ | F | F |
| 242 | $C_5H_{11}$ | 4 | 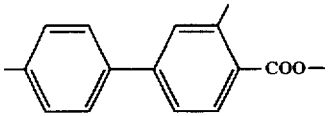 | $CF_2H$ | F | F |

-continued

| No. | R | l | A | X | Y₁ | Y₂ |
|---|---|---|---|---|---|---|
| 243 | C₃H₇ | 1 | biphenyl with F at 3-position, -COO- | CF₂H | F | F |
| 244 | CH₃ | 1 | biphenyl with F at 3,5-positions, -COO- | CF₂H | F | F |
| 245 | C₄H₉ | 1 | phenyl-pyridazine-COO- | OCF₃ | F | F |
| 246 | C₅H₁₁ | 1 | biphenyl-COO- | OCF₃ | F | F |
| 247 | C₂H₅ | 6 | biphenyl-COO- | OCF₃ | F | F |
| 248 | CH₃ | 1 | biphenyl with F, -COO- | OCF₃ | F | F |
| 249 | C₄H₉ | 5 | biphenyl with 2F, -COO- | OCF₃ | F | F |
| 250 | C₃H₇ | 1 | biphenyl-COO- | OCF₂H | F | F |
| 251 | C₅H₁₁ | 1 | biphenyl-COO- | OCF₂H | F | F |
| 252 | CH₃ | 8 | biphenyl with 2F, -COO- | OCF₂H | F | F |
| 253 | C₂H₅ | 1 | biphenyl with F, -COO- | OCF₂H | F | F |

-continued

| No. | R | l | A | X | Y₁ | Y₂ |
|---|---|---|---|---|---|---|
| 254 | $CH_3$ | 1 | 2,6-difluorophenyl-3,5-difluoro-4-(COO—)phenyl | $OCF_2H$ | F | F |
| 255 | $CH_3$ | 1 | biphenyl-COO— | $CFH_2$ | F | F |
| 256 | $C_4H_9$ | 1 | biphenyl-COO— | $CFH_2$ | F | F |
| 257 | $C_7H_{15}$ | 1 | phenyl-pyrimidinyl-COO— | $CFH_2$ | F | F |
| 258 | $C_2H_5$ | 1 | phenyl-3-fluoro-4-(COO—)phenyl | $CFH_2$ | F | F |
| 259 | $C_3H_7$ | 1 | 2-fluorophenyl-3,5-difluoro-4-(COO—)phenyl | $CFH_2$ | F | F |
| 260 | $C_2H_5$ | 1 | phenyl-cyclohexyl-COO— | CN | F | F |
| 261 | $C_4H_9$ | 1 | pyrimidinyl-cyclohexyl-COO— | CN | F | F |
| 262 | $CH_3$ | 4 | phenyl-cyclohexyl-COO— | $CF_3$ | F | F |
| 263 | $C_3H_7$ | 1 | phenyl-cyclohexyl-COO— | $CF_3$ | F | F |
| 264 | $C_5H_{11}$ | 1 | phenyl-cyclohexyl-COO— | $CF_2H$ | F | F |
| 265 | $C_3H_7$ | 1 | phenyl-dioxanyl-COO— | $CF_2H$ | F | F |
| 266 | $C_4H_9$ | 1 | phenyl-cyclohexyl-COO— | $OCF_3$ | F | F |

-continued

| No. | R | l | A | X | Y₁ | Y₂ |
|---|---|---|---|---|---|---|
| 267 | $C_9H_{19}$ | 1 | phenyl-cyclohexyl-COO— | $OCF_3$ | F | F |
| 268 | $CH_3$ | 1 | phenyl-cyclohexyl-COO— | $OCF_2H$ | F | F |
| 269 | $C_4H_9$ | 1 | 2,6-difluorophenyl-cyclohexyl-COO— | $OCF_2H$ | F | F |
| 270 | $CH_3$ | 1 | 2-fluorophenyl-cyclohexyl-COO— | $CFH_2$ | F | F |

Example 8

Preparation of 3,5-difluoro-4-cyanophenyl 4-(2-(trans-4-butoxymethyl)cyclohexyl)ethyl benzoate (in the formula (1), R=C₄H₉, l=1, m and n=both, 1, A₁=trans-1,4-cyclohexylene group, A₂=1,4-phenylene group, Z₁=—(CH₂)₂—, Z₂=—COO—, X=CN, and Y₁ and Y₂=both, F) (Compound No. 271)

4-(2-Trans-4-(butoxymethyl)cyclohexyl)ethyl)benzoic acid (2.1 g, 7.3 mmol) was mixed with thionyl chloride (1.3 g, 10.9 mmol), pyridine (0.1 ml) and toluene (3 ml), followed by reacting them at 80° C., for 3 hours, and distilling off superfluous thionyl chloride and toluene under reduced pressure, to obtain raw 4-(2-(trans-4-(butoxymethyl) cyclohexyl)ethyl)benzoyl chloride.

Next, 2,6-difluoro-4-hydroxybenzonitrile (1.2 g, 7.4 mmol) was mixed with pyridine (0.8 ml) and toluene (2 ml), followed by dropwise adding to the mixture, a toluene 3 ml solution of the above 4-(2-(trans-4-(butoxymethyl) cyclohexyl)ethyl)benzoyl chloride at room temperature for 5 minutes, reacting them at 50° C. for 2 hours, adding water (15 ml) to the reaction product, extracting with toluene (50 ml), washing the resulting organic layer three times with 6N-HCl, three times with 2N-NaOH and three times with water, drying over anhydrous magnesium sulfate, distilling off the solvent under reduced pressure, subjecting the residue to silica gel column chromatography (eluent: toluene), to obtain raw 3,5-difluoro-4-cyanophenyl 4-(2-(trans-4-(butoxymethyl)-cyclohexyl) ethyl)benzoate (2.8 g), and recrystallizing the product from heptane/ether (7/3), to obtain the captioned compound (2.5 g, yield: 80.6%).

Further, the mass spector data well supported its structure.

Mass analysis: 456 (M+1)

According to the process of Example 8, the following compounds (No. 272 to No. 293) are prepared:

| No. | R | l | A | X | Y₁ | Y₂ |
|---|---|---|---|---|---|---|
| 272 | $C_5H_{11}$ | 1 | phenyl-CH₂CH₂-phenyl-COO— | CN | F | F |
| 273 | $C_3H_7$ | 1 | cyclohexyl-CH₂CH₂-(2-fluoro)phenyl-COO— | CN | F | F |
| 274 | $CH_3$ | 2 | dioxolane-CH₂CH₂-phenyl-COO— | $CF_3$ | H | F |

-continued
| No. | R | l | A | X | $Y_1$ | $Y_2$ |
|---|---|---|---|---|---|---|
| 275 | $C_3H_7$ | 1 | 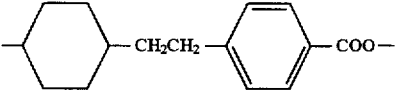 | $CF_3$ | F | F |
| 276 | $C_2H_5$ | 1 | 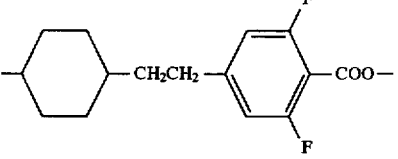 | $CF_3$ | H | H |
| 277 | $C_3H_7$ | 1 | 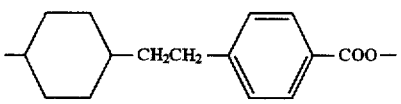 | $CF_2H$ | F | F |
| 278 | $C_4H_9$ | 1 | 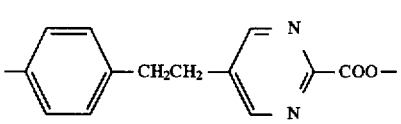 | $CF_2H$ | F | F |
| 279 | $CH_3$ | 1 | 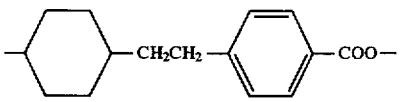 | $OCF_3$ | F | F |
| 280 | $C_5H_{11}$ | 1 | 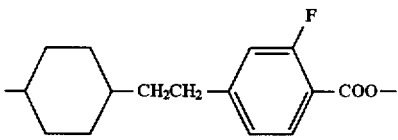 | $OCF_3$ | F | F |
| 281 | $C_3H_7$ | 1 | 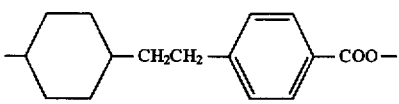 | $OCF_2H$ | F | F |
| 282 | $C_4H_9$ | 1 | 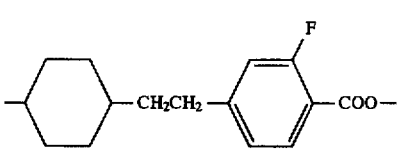 | $CFH_2$ | F | F |
| 283 | $C_2H_5$ | 1 | 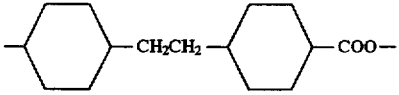 | CN | F | F |
| 284 | $CH_3$ | 1 | 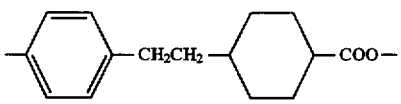 | $CF_3$ | F | F |
| 285 | $C_3H_9$ | 1 | 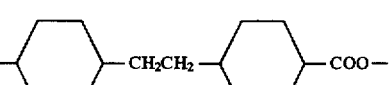 | $CF_3$ | H | F |
| 286 | $C_7H_{15}$ | 1 | 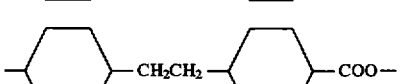 | $CF_2H$ | F | F |
| 287 | $C_5H_{11}$ | 1 | 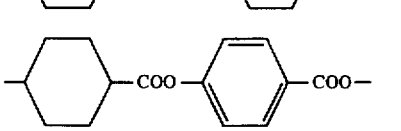 | $OCF_3$ | F | F |

-continued

| No. | R | l | A | X | $Y_1$ | $Y_2$ |
|---|---|---|---|---|---|---|
| 288 | $C_4H_9$ | 1 | [cyclohexyl-COO-cyclohexyl-COO-] | $OCF_2H$ | F | F |
| 289 | $CH_3$ | 1 | [cyclohexyl-COO-phenyl-COO-phenyl-] | CN | F | F |
| 290 | $C_3H_7$ | 1 | [cyclohexyl-$CH_2CH_2$-phenyl-COO-(F)phenyl-] | $CF_3$ | F | F |
| 291 | $C_5H_{11}$ | ? | [cyclohexyl-$CH_2CH_2$-phenyl-COO-cyclohexyl-] | $CFH_2$ | F | F |
| 292 | $C_3H_7$ | 1 | [cyclohexyl-$CH_2CH_2$-(F)phenyl-COO-cyclohexyl-] | $OCF_3$ | F | F |
| 293 | $C_2H_5$ | 1 | [cyclohexyl-$CH_2CH_2$-phenyl-COO-cyclohexyl-] | $OCF_2H$ | F | F |

Example 9

Preparation of 3', 5'-difluoro-4'-cyanobiphenyl-4-yl 4-(trans-4-(propoxymethyl)cyclohexyl)benzoate (in the formula (1), $R=C_3H_7$, l=1, m, n and o=either, 1, $A_1$=trans-1,4-cyclohexylene group, $A_2$ and $A_3$=both, 1,4-phenylene group, $Z_1$ and $Z_3$=both covalent bond, $Z_2$=—COO—, X=CN, and $Y_1$ and $Y_2$=both, F) (Compound No. 294)

4-(Trans-4-(propoxymethyl)cyclohexyl)benzoic acid (2.0 g, 7.2 mmol) was mixed with thionyl chloride (1.3 g, 10.9 mmol), pyridine (0.1 ml) and toluene (4 ml), followed by reacting them at 80° C. for 2 hours, and distilling off superfluous thionyl chloride and toluene under reduced pressure, to obtain raw 4-(trans-4-(propoxymethyl)cyclohexyl) benzoyl chloride.

Next, 3',5'-difluoro-4'-cyano-4-hydroxybiphenyl (1.7 g, 7.2 mmol) was mixed with pyridine (0.8 ml) and toluene (3 ml), followed by dropwise adding to the mixture, a toluene 3 ml solution of the above 4-(trans-4-(propoxymethyl) cyclohexyl)benzoyl chloride, at room temperature for 5 minutes, reacting the mixture at 50° C. for 3 hours, adding water (15 ml) to the reaction product, extracting with toluene (50 ml), washing the resulting organic layer, three times with 6N-HCl, three times with 2N-NaOH and three times with water, drying over anhydrous magnesium sulfate, distilling off the solvent under reduced pressure, subjecting the residue to silica gel column chromatography (eluent: toluene), to obtain raw 3',5'-difluoro-4'-cyanobiphenyl-4-yl 4-(trans-4-(propoxymethyl)cyclohexyl)-benzoate (3.4 g), and recrystallizing this product from heptane/ether (1/1), to obtain the captioned compound (2.8 g, yield: 79.0%).

Further, the mass spector data well supported its structure.

Mass analysis: 490 (M+1)

According to the process of Example 9, the following compounds (No. 295 to No. 334) are prepared:

| No. | R | l | A | X | $Y_1$ | $Y_2$ |
|---|---|---|---|---|---|---|
| 295 | $C_2H_5$ | 1 | [cyclohexyl-phenyl-COO-phenyl-] | CN | F | F |
| 296 | $C_5H_{11}$ | 1 | [cyclohexyl-phenyl-COO-phenyl-] | CN | F | F |

| No. | R | l | A | X | Y₁ | Y₂ | |
|---|---|---|---|---|---|---|---|
| 297 | $CH_3$ | 2 | [cyclohexyl-(2-F-phenyl)-COO-phenyl-] | CN | F | F | |
| 298 | $C_3H_7$ | 1 | [cyclohexyl-cyclohexyl-COO-(2-F-phenyl)-] | CN | F | F | |
| 299 | $C_5H_{11}$ | 1 | [cyclohexyl-phenyl-COO-(2,6-diF-phenyl)-] | CN | F | F | |
| 300 | $CH_3$ | 1 | [cyclohexyl-cyclohexyl-COO-phenyl-] | $CF_3$ | F | F | Cr 185.3–189.3 N 224.5 Iso |
| 301 | $C_4H_9$ | 1 | [cyclohexyl-phenyl-COO-phenyl-] | $CF_3$ | F | F | Cr 84.1–84.9 N 191.0 Iso |
| 302 | $C_3H_7$ | 3 | [cyclohexyl-phenyl-COO-(2-F-phenyl)-] | $CF_3$ | F | F | |
| 303 | $C_2H_5$ | 1 | [cyclohexyl-(2,6-diF-phenyl)-COO-(2-F-phenyl)-] | $CF_3$ | F | F | |
| 304 | $C_4H_9$ | 1 | [cyclohexyl-phenyl-COO-(2,6-diF-phenyl)-] | $CF_3$ | F | F | |
| 305 | $C_2H_5$ | 1 | [cyclohexyl-phenyl-COO-phenyl-] | $CF_2H$ | F | F | |
| 306 | $C_3H_7$ | 1 | [cyclohexyl-phenyl-COO-phenyl-] | $CF_2H$ | F | F | |
| 307 | $C_8H_{17}$ | 8 | [cyclohexyl-pyrimidinyl-COO-phenyl-] | $CF_2H$ | F | F | |

-continued

| No. | R | l | A | X | Y₁ | Y₂ |
|-----|---|---|---|---|----|----|
| 308 | C₃H₇ | 1 | cyclohexyl–phenyl–COO–(3-F)phenyl | CF₂H | F | F |
| 309 | C₂H₅ | 1 | cyclohexyl–(2,6-F₂)phenyl–COO–(3,5-F₂)phenyl | CF₂H | F | F |
| 310 | C₄H₉ | 1 | cyclohexyl–phenyl–COO–phenyl | OCF₃ | F | F |
| 311 | C₅H₁₁ | 1 | cyclohexyl–phenyl–COO–phenyl | OCF₃ | F | F |
| 312 | C₂H₅ | 4 | dioxanyl–phenyl–COO–(3-F)phenyl | OCF₃ | F | F |
| 313 | CH₃ | 1 | cyclohexyl–cyclohexyl–COO–(3,5-F₂)phenyl | OCF₃ | F | F |
| 314 | C₄H₉ | 5 | cyclohexyl–(2-F)phenyl–COO–(3,5-F₂)phenyl | OCF₃ | F | F |
| 315 | C₃H₇ | 1 | cyclohexyl–phenyl–COO–phenyl | OCF₂H | F | F |
| 316 | C₄H₉ | 1 | cyclohexyl–phenyl–COO–phenyl | OCF₂H | F | F |
| 317 | CH₃ | 6 | cyclohexyl–phenyl–COO–(3-F)phenyl | OCF₂H | F | F |
| 318 | C₂H₅ | 1 | cyclohexyl–(2,6-F₂)phenyl–COO–(3-F)phenyl | OCF₂H | F | F |

-continued
| No. | R | l | A | X | Y₁ | Y₂ |
|---|---|---|---|---|---|---|
| 319 | CH₃ | 1 | 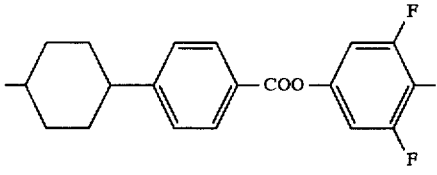 | OCF₂H | F | F |
| 320 | C₂H₅ | 1 | 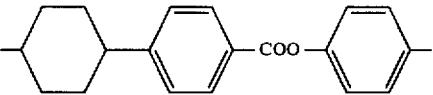 | CFH₂ | F | F |
| 321 | C₅H₁₁ | 1 | 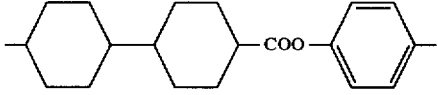 | CFH₂ | F | F |
| 322 | C₁₀H₂₁ | 1 | 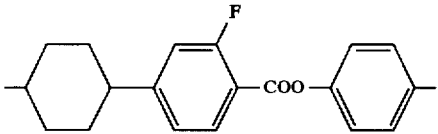 | CFH₂ | F | F |
| 323 | C₃H₇ | 1 | 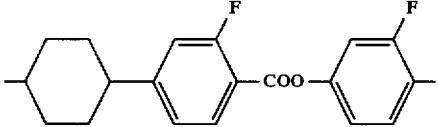 | CFH₂ | F | F |
| 324 | C₂H₅ | 1 | 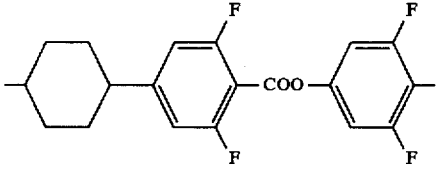 | CFH₂ | F | F |
| 325 | C₃H₇ | 1 | 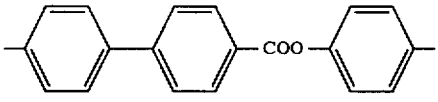 | OCF₃ | F | F |
| 326 | C₄H₉ | 1 | 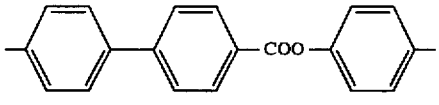 | OCF₂H | F | F |
| 327 | C₂H₅ | 1 | 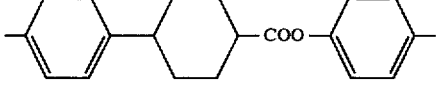 | CN | F | F |
| 328 | C₅H₁₁ | 1 | 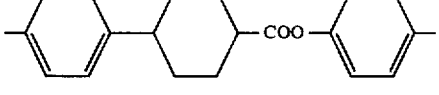 | CFH₂ | F | F |
| 329 | C₇H₁₅ | 1 | 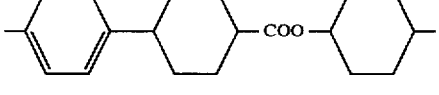 | CF₂H | F | F |
| 330 | C₃H₇ | 1 | 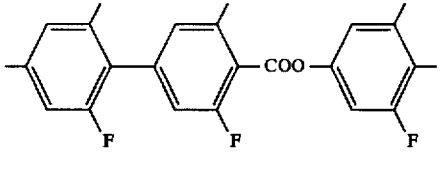 | OCF₃ | F | F |

-continued

| No. | R | l | A | X | $Y_1$ | $Y_2$ |
|---|---|---|---|---|---|---|
| 331 | $CH_3$ | 4 | [2,6-difluorophenyl-cyclohexyl-COO-cyclohexyl] | $OCF_2H$ | F | F |
| 332 | $C_3H_7$ | 1 | [cyclohexyl-cyclohexyl-phenyl-COO-] | CN | F | F |
| 333 | $C_4H_9$ | 1 | [cyclohexyl-cyclohexyl-phenyl-COO-] | $CF_3$ | F | F |
| 334 | $C_3H_7$ | 1 | [cyclohexyl-cyclohexyl-(3-fluoro)phenyl-COO-] | $OCF_3$ | F | F |

Example 10

Preparation of 4-(trifluoromethyl)phenyl 4-(propoxymethyl) benzoate (in the formula (1), $R=C_3H_7$, l=1, m=1, n and o=both, 0, $A_1$=1,4-phenylene group, $Z_1$=—COO—, $X=CF_3$, and $Y_1$ and $Y_2$=both, H) (Compound No. 335)

4-(Propoxymethyl)benzoic acid (1.4 g, 7.2 mmol) was mixed with thionyl chloride (1.3 g, 10.9 mmol), pyridine (0.1 ml) and toluene (3 ml), followed by reacting them at 80° C. for 2 hours, and distilling off superfluous thionyl chloride and toluene under reduced pressure, to obtain raw 4-(propoxymethyl) benzoyl chloride.

Next, 4-(trifluoromethyl)phenol (1.2 g, 7.4 mmol) was mixed with pyridine (0.8 ml) and toluene (2 ml), followed by dropwise adding to the mixture, a toluene 3 ml solution of the above 4-(propoxymethyl)benzoyl chloride at room temperature for 5 minutes, reacting them at 50° C. for 2 hours, adding water (15 ml), extracting with toluene (30 ml), washing the resulting organic layer three times with 6N-HCl, three times with 2N-NaOH and three times with water, drying over anhydrous magnesium sulfate, distilling off the solvent under reduced pressure, subjecting the residue to silica gel column chromatography (eluent: toluene), to obtain raw 4-(trifluoromethyl)phenyl 4-propoxymethyl) benzoate (2.1 g), and recrystallizing this product from heptane/ether (8/2), to obtain the captioned compound (1.7 g, yield: 70.8%).

Further, the mass Spector data well supported its structure.

Mass analysis: 339 (M+1)

According to the process of Example 10, the following compounds (No. 336 to No. 409) are prepared:

| No. | R | l | A | X | $Y_1$ | $Y_2$ |
|---|---|---|---|---|---|---|
| 336 | $C_2H_5$ | 1 | [phenyl-COO-] | $CF_3$ | H | H |
| 337 | $C_5H_{11}$ | 1 | [phenyl-COO-] | $CF_3$ | H | F |
| 338 | $C_3H_7$ | 1 | [cyclohexyl-COO-] | $CF_3$ | H | F |
| 339 | $CH_3$ | 5 | [(3-fluoro)phenyl-COO-] | $CF_3$ | H | F |

-continued

| No. | R | l | A | X | Y₁ | Y₂ | |
|-----|---|---|---|---|----|----|---|
| 340 | $C_4H_9$ | 1 | 2,6-difluorophenyl-COO- | $CF_3$ | H | H | |
| 341 | $C_3H_7$ | 1 | phenyl-COO-phenyl- | $CF_3$ | H | H | |
| 342 | $C_4H_9$ | 1 | 2-fluorophenyl-COO-phenyl- | $CF_3$ | H | F | |
| 343 | $C_9H_{19}$ | 1 | cyclohexyl-COO-3-fluorophenyl- | $CF_3$ | H | F | |
| 344 | $C_5H_{11}$ | 1 | 2,6-difluorophenyl-COO-3,5-difluorophenyl- | $CF_3$ | H | F | |
| 345 | $CH_3$ | 1 | cyclohexyl-COO-cyclohexyl- | $CF_3$ | H | H | |
| 346 | $C_3H_7$ | 1 | phenyl-COO-cyclohexyl- | $CF_3$ | H | F | |
| 347 | $C_4H_9$ | 1 | 2-fluorophenyl-COO-cyclohexyl- | $CF_3$ | H | H | |
| 348 | $C_2H_5$ | 1 | 2,6-difluorophenyl-COO-cyclohexyl- | $CF_3$ | H | F | |
| 349 | $C_4H_9$ | 1 | biphenyl-COO- | $CF_3$ | H | H | |
| 350 | $C_5H_{11}$ | 1 | cyclohexyl-phenyl-COO- | $CF_3$ | H | H | Cr 69.6–70.2 $S_A$72.9–73.1 N 75.6 Iso |

-continued

| No. | R | l | A | X | Y₁ | Y₂ |
|-----|---|---|---|---|----|----|
| 351 | $C_5H_{11}$ | 1 | cyclohexyl-(2-F-phenyl)-COO- | $CF_3$ | H | F |
| 352 | $CH_3$ | 1 | cyclohexyl-(2,6-diF-phenyl)-COO- | $CF_3$ | H | H |
| 353 | $C_2H_5$ | 1 | (2-F-phenyl)-cyclohexyl-COO- | $CF_3$ | H | H |
| 354 | $C_3H_7$ | 1 | cyclohexyl-cyclohexyl-COO- | $CF_3$ | H | H |
| 355 | $C_5H_{11}$ | 1 | cyclohexyl-cyclohexyl-COO- | $CF_3$ | H | F |
| 356 | $C_3H_7$ | 1 | cyclohexyl-phenyl-COO-phenyl- | $CF_3$ | H | H |
| 357 | $C_2H_5$ | 1 | cyclohexyl-phenyl-COO-phenyl- | $CF_3$ | H | F |
| 358 | $CH_3$ | 1 | cyclohexyl-cyclohexyl-COO-phenyl- | $CF_3$ | H | F |
| 359 | $C_4H_9$ | 1 | cyclohexyl-cyclohexyl-COO-phenyl- | $CF_3$ | H | H |
| 360 | $C_6H_{13}$ | 1 | cyclohexyl-phenyl-COO-(3-F-phenyl)- | $CF_3$ | H | F |
| 361 | $C_5H_{11}$ | 1 | cyclohexyl-(2-F-phenyl)-COO-(3-F-phenyl)- | $CF_3$ | H | H |
| 362 | $C_3H_7$ | 1 | cyclohexyl-cyclohexyl-COO-(3-F-phenyl)- | $CF_3$ | H | F |

-continued

| No. | R | l | A | X | Y₁ | Y₂ |
|---|---|---|---|---|---|---|
| 363 | C₄H₉ | 1 | [cyclohexyl-cyclohexyl-COO-phenyl(3-F)] | CF₃ | H | H |
| 364 | C₂H₅ | 1 | [cyclohexyl-phenyl-COO-phenyl(3,5-F)] | CF₃ | H | F |
| 365 | CH₃ | 1 | [cyclohexyl-phenyl-COO-phenyl(3,5-F)] | CF₃ | H | H |
| 366 | C₂H₅ | 1 | [cyclohexyl-phenyl(3-F)-COO-phenyl(3,5-F)] | CF₃ | H | H |
| 367 | C₃H₇ | 7 | [cyclohexyl-phenyl(3,5-F)-COO-phenyl(3,5-F)] | CF₃ | H | F |
| 368 | C₂H₅ | 1 | [cyclohexyl-cyclohexyl-COO-phenyl(3,5-F)] | CF₃ | H | H |
| 369 | C₄H₉ | 1 | [cyclohexyl-cyclohexyl-COO-phenyl(3,5-F)] | CF₃ | H | H |
| 370 | C₃H₇ | 1 | [cyclohexyl-cyclohexyl-phenyl-COO−] | CF₃ | H | H |
| 371 | C₄H₉ | 1 | [cyclohexyl-cyclohexyl-phenyl-COO−] | CF₃ | H | F |

-continued

| No. | R | l | A | X | Y₁ | Y₂ | |
|---|---|---|---|---|---|---|---|
| 372 | $C_5H_{11}$ | 1 | cyclohexyl-cyclohexyl-(2,6-difluorophenyl)-COO– | $CF_3$ | H | F | |
| 373 | $C_3H_7$ | 1 | phenyl-COO– | $OCF_2H$ | H | H | |
| 374 | $C_5H_{11}$ | 1 | phenyl-COO– | $OCF_3$ | H | H | Cr 68.2–68.5 Iso |
| 375 | $C_2H_5$ | 7 | cyclohexyl-COO– | $CFH_2$ | H | F | |
| 376 | $C_3H_7$ | 1 | phenyl-COO– | $OCF_3$ | H | F | Cr 30.5–31.8 Iso |
| 377 | $C_4H_9$ | 1 | (2,6-difluorophenyl)-COO– | $OCF_2H$ | H | H | |
| 378 | $C_3H_7$ | 1 | phenyl-COO-phenyl | $CFH_2$ | H | H | |
| 379 | $C_4H_9$ | 1 | (2-fluorophenyl)-COO-phenyl | $CF_2H$ | H | F | |
| 380 | $C_9H_{19}$ | 1 | cyclohexyl-COO-(3-fluorophenyl) | $OCF_2H$ | H | F | |
| 381 | $C_5H_{11}$ | 1 | phenyl-COO-(3,5-difluorophenyl) | $OCF_3$ | H | F | |
| 382 | $CH_3$ | 1 | cyclohexyl-COO-cyclohexyl | $CFH_2$ | H | H | |
| 383 | $C_3H_7$ | 1 | phenyl-COO-cyclohexyl | $CF_2H$ | H | F | |

-continued

| No. | R | l | A | X | Y₁ | Y₂ | |
|-----|---|---|---|---|----|----|---|
| 384 | C₄H₉ | 1 | [2-F-phenyl-COO-cyclohexyl] | CFH₂ | H | H | |
| 385 | C₂H₅ | 1 | [2,6-diF-phenyl-COO-cyclohexyl] | OCF₂H | H | F | |
| 386 | C₄H₉ | 1 | [phenyl-phenyl-COO-] | CFH₂ | H | H | |
| 387 | C₃H₇ | 1 | [cyclohexyl-phenyl-COO-] | OCF₃ | H | F | Cr 75.1–76.0(SA 61.7) N 96.2 Iso |
| 388 | C₅H₁₁ | 1 | [cyclohexyl-(3-F-phenyl)-COO-] | CF₂H | H | F | |
| 389 | CH₃ | 1 | [cyclohexyl-(3,5-diF-phenyl)-COO-] | OCF₃ | H | H | |
| 390 | C₂H₅ | 1 | [(3-F-phenyl)-cyclohexyl-COO-] | CF₂H | H | H | |
| 391 | CH₃ | 1 | [cyclohexyl-cyclohexyl-COO-] | OCF₃ | H | H | |
| 392 | CH₃ | 1 | [cyclohexyl-cyclohexyl-COO-] | OCF₃ | H | F | Cr 47.7–48.9 N 146.0 Iso |
| 393 | C₃H₇ | 1 | [cyclohexyl-phenyl-COO-phenyl-] | OCF₃ | H | H | |
| 394 | C₂H₅ | 1 | [cyclohexyl-phenyl-COO-phenyl-] | CF₂H | H | F | |
| 395 | CH₃ | 1 | [cyclohexyl-cyclohexyl-COO-phenyl-] | OCF₃ | H | H | |

-continued

| No. | R | l | A | X | $Y_1$ | $Y_2$ |
|---|---|---|---|---|---|---|
| 396 | $C_4H_9$ | 1 | Cy-Cy-COO-Ph | $OCF_2H$ | H | H |
| 397 | $C_7H_{15}$ | 1 | Cy-Ph-COO-Ph(3-F) | $CFH_2$ | H | F |
| 398 | $C_5H_{11}$ | 1 | Cy-Ph(2-F)-COO-Ph(3-F) | $CF_2H$ | H | H |
| 399 | $C_3H_7$ | 1 | Cy-Cy-COO-Ph(3-F) | $OCF_3$ | H | F |
| 400 | $C_4H_9$ | 1 | Cy-Cy-COO-Ph(3-F) | $CFH_2$ | H | F |
| 401 | $C_2H_5$ | 1 | Cy-Ph-COO-Ph(3,5-F) | $OCF_3$ | H | F |
| 402 | $CH_3$ | 3 | Cy-Ph-COO-Ph(3,5-F) | $CF_2H$ | H | F |
| 403 | $C_2H_5$ | 1 | Cy-Ph(2-F)-COO-Ph(3,5-F) | $OCF_2H$ | H | H |
| 404 | $C_3H_7$ | 2 | Cy-Ph(2,6-F)-COO-Ph(3,5-F) | $OCF_3$ | H | F |
| 405 | $C_2H_5$ | 1 | Cy-Cy-COO-Ph(3,5-F) | $CFH_2$ | H | F |

-continued

| No. | R | l | A | X | Y₁ | Y₂ |
|---|---|---|---|---|---|---|
| 406 | C₄H₉ | 1 | [cyclohexyl-cyclohexyl-COO-difluorophenyl] | OCF₂H | H | H |
| 407 | C₃H₇ | 1 | [cyclohexyl-cyclohexyl-phenyl-COO-] | OCF₃ | H | H |
| 408 | C₄H₉ | 1 | [cyclohexyl-cyclohexyl-phenyl-COO-] | CF₂H | H | F |
| 409 | C₅H₁₁ | 1 | [cyclohexyl-cyclohexyl-fluorophenyl-COO-] | CFH₂ | H | f |

Hereinafter, examples using the compound of the present invention as a component of liquid crystal compositions will be described.

In the use examples, NI, Δε, Δn, η and $V_{10}$, respectively represent clearing point (°C.), dielectric anisotropy value, optical anisotropy value, viscosity at 20° C. (mPa·s) and threshold voltage (V).

Example 11 (Use Example 1)

A liquid crystal composition consisting of the following cyanophenylcyclohexane group compounds:

4-(trans-4-propylcyclohexyl)benzonitrile 24% by weight,
4-(trans-4-pentylcyclohexyl)benzonitrile 36% by weight,
4-(trans-4-heptylcyclohexyl)benzonitrile 25% by weight,
and 4-(trans-4-pentylcyclohexyl)-4'-cyanobiphenyl 15% by weight, has the following physical properties:

NI: 72.4, Δε: 11.0, Δn: 0.137, η: 27.0 and
a $V_{10}$ in a cell thickness of 9 μm: 1.78.

Compound No. 4 (15% by weight) was blended with the above composition (85% by weight), to obtain a nematic liquid crystal composition (a). The values of the physical properties of this liquid crystal composition were as follows:

NI: 54.8, Δε: 16.9, Δn: 0.130, η: 31.9 and
$V_{10}$ in a cell thickness of 8.8 μm: 1.02.

This composition was allowed to stand in a freezer at −20° C., but deposition of crystals and smectic phase were not observed even after 60 days.

Example 12 (Use Example 2)

A liquid crystal composition consisting of the following cyanophenylcyclohexane group compounds:

(4-(trans-4-propylcyclohexyl)benzonitrile 30% by weight,
4-(trans-4-pentylcyclohexyl)benzonitrile 40% by weight, and
4-(trans-4-heptylcyclohexyl)benzonitrile 30% by weight, has the following physical properties:

NI: 52.3, Δε: 10.7, Δn: 0.119, η: 21.7, and
$V_{10}$ in a cell thickness of 9 μm: 1.60.

A compound (No. 187) of Example 6 (15% by weight) was blended with the above composition (85% by weight), to prepare a nematic liquid crystal composition (b). The physical properties of this composition were as follows:

NI: 55.6, Δε: 17.5, Δn: 0.121, η: 33.1 and
$V_{10}$ in a cell thickness of 8.8 μm: 1.06.

This composition was allowed to stand in a freezer at −20° C., but deposition of crystals and smectic phase were not observed even after 60 days.

Example 13 (Use Example 3)

The physical properties of nematic liquid crystal composition of composition example 19 were as follows:

NI: 92.1, Δn: 0.143, η: 32.7, and $V_{10}$ in a cell thickness of 8.9 μm: 1.20.

This composition was allowed to stand in a freezer at −20° C., but any deposition of crystals and smectic phase were not observed even after 60 days.

Example 14 (Use Example 4)

The physical properties of nematic liquid crystal composition of composition example 29 were as follows:

NI: 79.1, Δε: 11.9, Δn: 0.139, η: 25.8, Vth: 1.32.

This composition was allowed to stand in a freezer at −20° C., but any deposition of crystals and smectic phase were not observed even after 60 days.

Example 15 (Use Example 5)

The physical properties of nematic liquid crystal composition of composition example 30 were as follows:

NI: 97.2, Δε: 21.1, Δn: 0.155, η: 25.3, Vth: 1.22.

This composition was allowed to stand in a freezer at −20° C., but any deposition of crystals and smectic phase were not observed even after 60 days.

Example 16 (Use Example 6)

The physical properties of nematic liquid crystal composition of composition example 31 were as follows:

NI: 98.5, Δε: 11.8, Δn: 0.139, η: 36.2, Vth: 1.63.

This composition was allowed to stand in a freezer at −20° C., but any deposition of crystals and smectic phase were not observed even after 60 days.

Example 17 (Use Example 7)

The physical properties of nematic liquid crystal composition of composition example 32 were as follows:

NI: 81.9, Δε: 22.6, Δn: 0.147, η: 49.3, Vth: 1.07.

This composition was allowed to stand in a freezer at −20° C., but any deposition of crystals and smectic phase were not observed even after 60 days.

Example 18 (Use Example 8)

The physical properties of nematic liquid crystal composition of composition example 33 were as follows:

NI: 81.0, Δε: 11.1, Δn: 0.126, η: 35.8, Vth: 1.53.

This composition was allowed to stand in a freezer at −20° C., but any deposition of crystals and smectic phase were not observed even after 60 days.

Example 19 (Use Example 9)

The physical properties of nematic liquid crystal composition of composition example 34 were as follows:

NI: 76.7, Δε: 12.8, Δn: 0.123, η: 28.8, Vth: 1.58.

This composition was allowed to stand In a freezer at −20° C., but any deposition of crystals and smectic phase were not observed even after 60 days.

Example 20 (Use Example 10)

The physical properties of nematic liquid crystal composition of composition example 35 were as follows:

NI: 85.0, Δε: 12.7, Δn: 0.141, η: 29.3, Vth: 1.51.

This composition was allowed to stand in a freezer at −20° C., but any deposition of crystals and smectic phase were not observed even after 60 days.

Example 21 (Use Example 11)

The physical properties of nematic liquid crystal composition of composition example 36 were as follows:

NI: 74.9, Δε: 13.6, Δn: 0.131, η: 45.3, Vth: 1.33.

This composition was allowed to stand in a freezer at −20° C., but any deposition of crystals and smectic phase were not observed even after 60 days.

Example 22 (Use Example 12)

The physical properties of nematic liquid crystal composition of composition example 37 were as follows:

NI: 76.1, Δε: 13.3, Δn: 0.135, η: 23.4, Vth: 1.24.

This composition was allowed to stand in a freezer at −20° C., but any deposition of crystals and smectic phase were not observed even after 60 days.

Example 23 (Use Example 13)

The physical properties of nematic liquid crystal composition of composition example 38 were as follows:

NI: 92.2, Δε: 10.5, Δn: 0.163, η: 18.6, Vth: 1.68.

This composition was allowed to stand in a freezer at −20° C., but any deposition of crystals and smectic phase were not observed even after 60 days.

Example 24 (Use Example 14)

The physical properties of nematic liquid crystal composition of composition example 39 were as follows:

NI: 89.3, Δε: 16.8, Δn: 0.141, η: 29.6, Vth: 1.30.

This composition was allowed to stand in a freezer at −20° C., but any deposition of crystals and smectic phase were not observed even after 60 days.

Example 25 (Use Example 15)

The physical properties of nematic liquid crystal composition of composition example 40 were as follows:

NI: 92.1, Δε: 17.1, Δn: 0.143, η: 32.7, Vth: 1.20.

This composition was allowed to stand in a freezer at −20° C., but any deposition of crystals and smectic phase were not observed even after 60 days.

Example 26

With regard to the liquid crystal composition (a) obtained in Example 11, and Comparative liquid crystal composition (c) obtained in the same manner as in Example 11 except that 3,5-difluoro-4-cyanophenyl=4-pentyl benzoate outside the range of the present invention was used in place of No. 4 compound, the respective temperature changes in the threshold voltages were measured. The results are shown in FIG. 1.

In addition, in the figure, the longitudinal axis refers to $V_{10}(V)$, and the lateral axis refers to a value (°C.) obtained by substracting the clearing point (NI) of the liquid crystal composition from the measured temperature (T).

As apparent from the figure, the change in the threshold voltage within the measured temperatures, is 6.3 mV/°C. in the case of the liquid crystal composition (a) of the present invention, whereas it is 7.3 mV/°C. in the case of the liquid crystal composition (c); thus it was found that the temperature change of the liquid crystal composition of the present invention was smaller. Accordingly, it is possible to provide a liquid crystal display element having a higher grade.

Example 27

Figure 2:
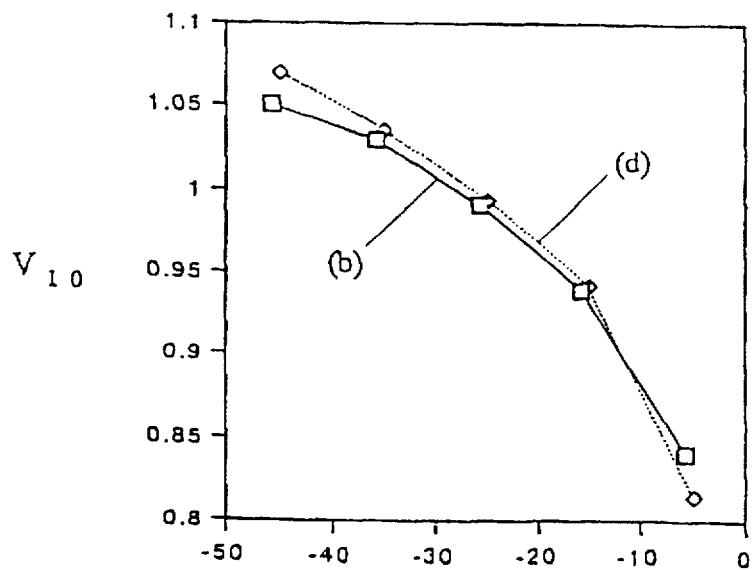
FIG. 2 is a graph explaining the effectiveness of another liquid crystal composition of the present invention.

With regard to the liquid crystal composition (b) of the present invention obtained in Example 12, and a comparative liquid crystal composition (d) obtained in the same manner as in Example 12 except that 3,5-difluoro-4-cyanophenyl 4-(trans-4-butylcyclohexyl)benzoate outside the range of the present invention was used in place of compound No. 187, the respective temperature changes in the threshold voltages were measured. The results are shown in FIG. 2.

As apparent from the figure, the change in the threshold voltage within the measured temperatures, is 5.3 mV/°C. in the case of the liquid crystal composition (b) of the present invention, whereas it is 6.3 mV/°C. in the case of the liquid crystal composition (d); thus it was found that the temperature change of the liquid crystal composition of the present invention was smaller, as in Example 26. Accordingly, it is possible to provide a liquid crystal display element having a higher grade.

Effectiveness of the Invention

As seen from the foregoing any of the compounds of the present invention have a large dielectric anisotropy value, a small change in the threshold voltage value depending upon temperatures, and an improved solubility in other liquid crystal materials at lower temperatures.

Accordingly, when the compound of the present invention is used as a component of liquid crystal compositions, it is characterized by exhibiting a superior solubility in other liquid crystal materials, and when six-membered ring, substituent and/or bonding group as molecule-constituting elements are adequately selected, it is possible to provide novel liquid crystal compositions having desired physical properties.

What we claim is:

1. A liquid crystalline compound expressed by the formula (1):

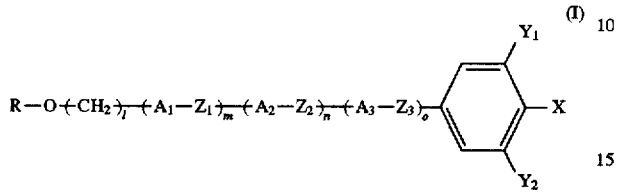

wherein R represents an alkyl group of 1 to 10 carbon atoms; l represents an integer of 1 to 9; m and n each independently represents 0 or 1; o represents 1; $A_1$, $A_2$ and $A_3$ each independently represents trans-1,4-cyclohexylene group, 1,4-phenylene group, pyrimidine-2,5-diyl group, pyridine-2,5-diyl group or 1,3-dioxane-2,5-diyl group, one or more hydrogen atoms on the rings of which groups may be replaced by F; $Z_1$, $Z_2$ and $Z_3$ each independently represent —COO—, —(CH$_2$)$_2$— or a covalent bond, at least one of which represents —COO—; X represents CN, CF$_3$, CF$_2$H, CFH$_2$, OCF$_3$ or OCF$_2$H; $Y_1$ represents H or F, but when X represents CN, $Y_1$ represents F; and $Y_2$ represents F.

2. A liquid crystalline compound according to claim 1, wherein m represents 1; n represents 0; $A_1$ represents 1,4-phenylene group, one or more hydrogen atoms on the ring of which group may be replaced by F; and $Z_1$ represents —COO—.

3. A liquid crystalline compound according to claim 1, wherein m and n each represent 1; $A_1$ and $A_2$ each represent 1,4-phenylene group, one or more hydrogen atoms on the ring of which group may be replaced by F; and $Z_1$ represents —COO—.

4. A liquid crystalline compound according to claim 1, wherein m and n each represent 1; $A_1$ represents 1,4-phenylene group, one or more hydrogen atoms on the ring of which group may be replaced by F; $A_2$ represents trans-1,4-cyclohexylene group; and $Z_1$ represents —COO—.

5. A liquid crystalline compound according to claim 1, wherein m and n each represent 1; $A_1$ represents trans-1,4-cyclohexylene group; $A_2$ represents 1,4-phenylene group, one or more hydrogen atoms on the ring of which group may be replaced by F; and $Z_2$ represents —COO—.

6. A liquid crystalline compound according to claim 1, wherein m and n each represent 1; $A_1$ and $A_2$ each represent 1,4-phenylene group, one or more hydrogen atoms on the ring of which group may be replaced by F; and $Z_2$ represents —COO—.

7. A liquid crystalline compound according to claim 1, wherein m and n each represent 1; $A_1$ represents trans-1,4-cyclohexylene; $A_2$ represents 1,4-phenylene group, one or more hydrogen atoms on the ring of which group may be replaced by F; $Z_1$ represents —(CH$_2$)—; and $Z_2$ represents —COO—.

8. A liquid crystalline compound according to claim 1, wherein m and n each represent 1; $A_1$ represents trans-1,4-cyclohexylene group; $A_2$ and $A_3$ each represent 1,4-phenylene group, one or more hydrogen atoms on the ring of which group may be replaced by F; $Z_1$ and $Z_3$ each represent a covalent bond; and $Z_2$ represents —COO—.

9. A liquid crystal composition comprising as a first component, at least one member of the liquid crystalline compounds set forth in any one of claims 2 to 8 or 1, and as a second component, at least one member selected from the group consisting of compounds expressed by the following formulas (2), (3) and (4):

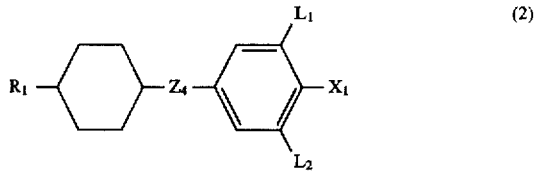

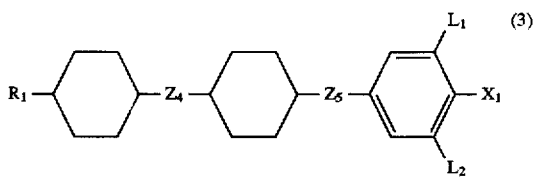

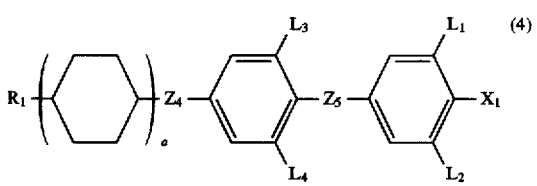

wherein $R_1$ represents an alkyl group of 1 to 10 carbon atoms; $X_1$ represents F, Cl, OCF$_3$, OCF$_2$H, CF$_3$, CF$_2$H or CFH$_2$; $L_1$, $L_2$, $L_3$ and $L_4$ each independently represent H or F; $Z_4$ and $Z_5$ each independently represent —(CH$_2$)$_2$—, —CH=CH— or a covalent bond; and a represents 1 or 2.

10. A liquid crystal composition comprising at least two compounds, at least one compound being a liquid crystalline compound set forth in any one of claims 2 to 8 or 1.

11. A liquid crystal display element comprising of a liquid crystal composition set forth in claim 10.

12. A liquid crystal composition, comprising as a first component, at least one member of the liquid crystalline compounds set forth in any one of claims 2 to 8 or 1, as a part of a second component, at least one member selected from the group consisting of the compounds expressed by the following formulas (2), (3) and (4):

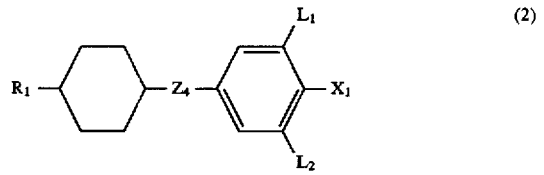

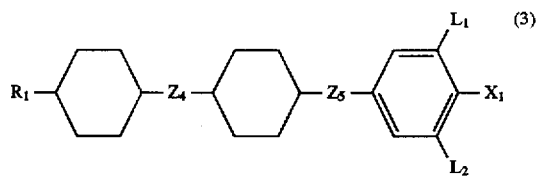

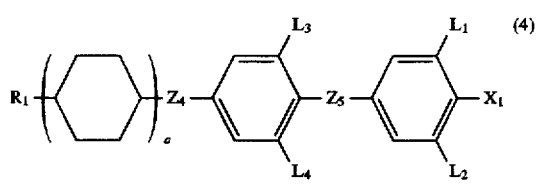

wherein $R_1$ represents an alkyl group of 1 to 10 carbon atoms; $X_1$ represents F, Cl, OCF$_3$, OCF$_2$H, CF$_3$, CF$_2$H or CFH$_2$; L$_1$, L$_2$, L$_3$ and L$_4$ each independently represent H or F; Z$_4$ and Z$_5$ each independently represent —(CH$_2$)$_2$—, —CH=CH— or a covalent bond; and a represents 1 or 2; and as another part of the second component, at least one member selected from the group consisting of the compounds expressed by the following formulas (5), (6), (7), (8) and (9):

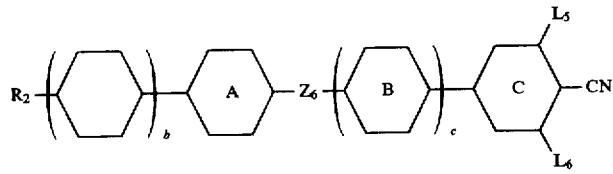

(5)

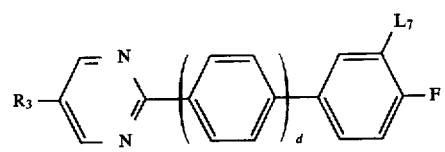

(6)

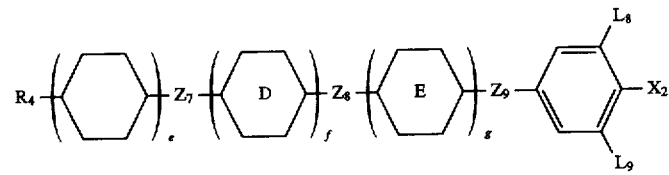

(7)

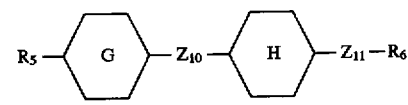

(8)

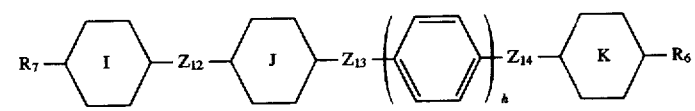

(9)

wherein, in the formula (5), R$_2$ represents F, an alkyl group of 1 to 10 carbon atoms or an alkenyl group of 2 to 10 carbon atoms, and any methylene group (—CH$_2$—) in the alkyl group or the alkenyl group may be replaced by an oxygen atom (—O—), but two or more adjacent methylene groups are not replaced by oxygen atoms; ring A represents trans-1,4-cyclohexylene group, 1,4-phenylene group, pyrimidine-2,5-diyl group or 1,3-dioxane-2,5-diyl group; ring B represents trans-1,4-cyclohexylene group, 1,4-phenylene group or pyrimidine-2,5-diyl group; ring C represents trans-1,4-cyclohexylene group or 1,4-phenylene group; Z$_6$ represents —(CH$_2$)$_2$—, —COO— or a covalent bond; L$_5$ and L$_6$ each independently represent H or F; b and c each independently represent 0 or 1, in the formula (6), R$_3$ represents an alkyl group of 1 to 10 carbon atoms; L$_7$ represents H or F; and d represents 0 or 1, in the formula (7), R$_4$ represents an alkyl group of 1 to 10 carbon atoms; rings D and E each independently represent trans-1,4-cyclohexylene group or 1,4-phenylene group; Z$_7$ and Z$_8$ each independently represent —COO— or a covalent bond; Z$_9$ represents —COO— or —C≡C—; L$_8$ and L$_9$ each independently represent H or F; X$_2$ represents F, OCF$_3$, OCF$_2$H, CF$_3$, CF$_2$H or CFH$_2$, but when X$_2$ represents OCF$_3$, OCF$_2$H$_2$, CF$_3$, CF$_2$H or CFH$_2$, L$_8$ and L$_9$ both represent H; and e, f and g each independently represent 0 or 1, in the formula (8), R$_5$ and R$_6$ each independently represent an alkyl group of 1 to 10 carbon atoms or an alkenyl group of 2 to 10 carbon atoms, and any methylene group (—CH$_2$—) in the alkyl group or the alkenyl group may be replaced by an oxygen atom (—O—), but two or more adjacent methylene groups are not replaced by oxygen atoms; ring G represents trans-1,4-cyclohexylene group, 1,4-phenylene group or pyrimidine-2,5-diyl group; ring H represents trans-1,4-cyclohexylene group or 1,4-phenylene group; Z$_{10}$ represents —C≡C—, —COO—, —(CH$_2$)$_2$—, —CH=CH—C≡C— or a covalent bond; and Z$_{11}$ represents —COO— or a covalent bond, and in the formula (9), R$_7$ and R8 each independently represent an alkyl group of 1 to 10 carbon atoms or an alkenyl group of 2 to 10 carbon atoms, and any methylene group (—CH$_2$—) in the alkyl group or the alkenyl group may be replaced by an oxygen atom (—O—), but two or more adjacent methylene groups are not replaced by oxygen atoms; ring I represents trans-1,4-cyclohexylene group, 1,4-phenylene group or pyrimidine-2,5-diyl group; ring J represents trans-1,4-cyclohexylene group, or 1,4-phenylene group, or pyrimidine-2,5-diyl group, one or more hydrogen atoms on the rings of which groups may be replaced by F, ring K represents trans-1,4-cyclohexylene group or 1,4-phenylene group; Z$_{12}$ and Z$_{14}$ each independently represent —COO—, —(CH$_2$)$_2$— or a covalent bond; Z$_{13}$ represents —CH=CH—, —C≡C—, —COO— or a covalent bond; and h represents 0 or 1.

13. A liquid crystal display element comprising a liquid crystal composition set forth in claim 9.

14. A liquid crystal composition comprising as a first component, at least one member of the liquid crystalline compounds set forth in any one of claims 2 to 8 or 1, and as a second component, at least one member selected from the group consisting of compounds expressed by the following formulas (5), (6), (7), (8) and (9):

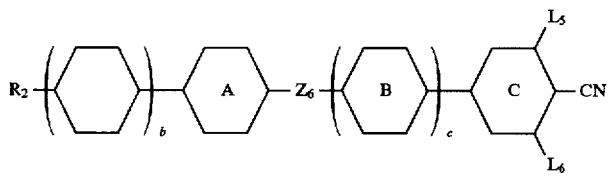
(5)

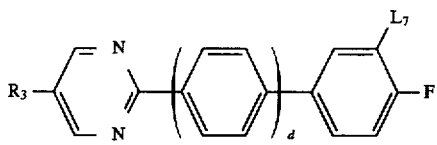
(6)

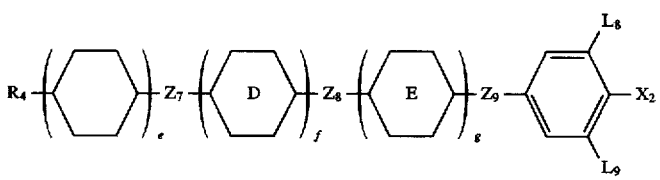
(7)

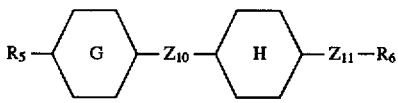
(8)

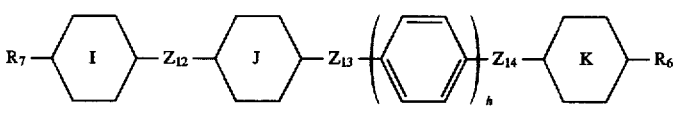
(9)

wherein, in the formula (5), $R_2$ represents F, an alkyl group of 1 to 10 carbon atoms or an alkenyl group of 2 to 10 carbon atoms, and any methylene group (—$CH_2$—) in the alkyl group or the alkenyl group may be replaced by an oxygen atom (—O—), but two or more adjacent methylene groups are not replaced by oxygen atoms; ring A represents trans-1,4-cyclohexylene group, 1,4-phenylene group, pyrimidine-2,5-diyl group or 1,3-dioxane-2,5-diyl group; ring B represents trans-1,4-cyclohexylene group, 1,4-phenylene group or pyrimidine-2,5-diyl group; ring C represents trans-1,4-cyclohexylene group or 1,4-phenylene group; $Z_6$ represents —$(CH_2)_2$—, —COO— or a covalent bond; $L_5$ and $L_6$ each independently represent H or F; b and c each independently represent 0 or 1, in the formula (6), $R_3$ represents an alkyl group of 1 to 10 carbon atoms; $L_7$ represents H or F; and d represents 0 or 1, in the formula (7), $R_4$ represents an alkyl group of 1 to 10 carbon atoms; rings D and E each independently represent trans-1,4-cyclohexylene group or 1,4-phenylene group; $Z_7$ and $Z_8$ each independently represent —COO— or a covalent bond; $Z_9$ represents —COO— or —C≡C—; $L_8$ and $L_9$ each independently represent H or F; $X_2$ represents F, $OCF_3$, $OCF_2H$, $CF_3$, $CF_2H$ or $CFH_2$, but when $X_2$ represents $OCF_3$, $OCF_2H_2$, $CF_3$, $CF_2H$ or $CFH_2$, $L_8$ and $L_9$ both represent H; and e, f and g each independently represent 0 or 1, in the formula (8), $R_5$ and $R_6$ each independently represent an alkyl group of 1 to 10 carbon atoms or an alkenyl group of 2 to 10 carbon atoms, and any methylene group (—$CH_2$—) in the alkyl group or the alkenyl group may be replaced by an oxygen atom (—O—), but two or more adjacent methylene groups are not replaced by oxygen atoms; ring G represents trans-1,4-cyclohexylene group, 1,4-phenylene group or pyrimidine-2,5-diyl group; ring H represents trans-1,4-cyclohexylene group or 1,4-phenylene group; $Z_{10}$ represents —C≡C—, —COO—, —$(CH_2)_2$—, —CH=CH—C≡C— or a covalent bond; and $Z_{11}$ represents —COO— or a covalent bond, and in the formula (9), $R_7$ and $R_8$ each independently represent an alkyl group of 1 to 10 carbon atoms or an alkenyl group of 2 to 10 carbon atoms, and any methylene group (—$CH_2$—) in the alkyl group or the alkenyl group may be replaced by an oxygen atom (—O—), but two or more adjacent methylene groups are not replaced by oxygen atoms; ring I represents trans-1,4-cyclohexylene group, 1,4-phenylene group or pyrimidine-2,5-diyl group; ring J represents trans-1,4-cyclohexylene group, or 1,4-phenylene group, or pyrimidine-2,5-diyl group, one or more hydrogen atoms on the rings of which groups may be replaced by F, ring K represents trans-1,4-cyclohexylene group or 1,4-phenylene group; $Z_{12}$ and $Z_{14}$ each independently represent —COO—, —$(CH_2)_2$— or a covalent bond; $Z_{13}$ represents —CH=CH—, —C≡C—, —COO— or a covalent bond; and h represents 0 or 1.

15. A liquid crystal display element comprising a liquid crystal composition set forth in claim 14.

16. A liquid crystal display element comprising a liquid crystal composition set forth in claim 12.

17. A phenol derivative expressed by the formula (1-a):

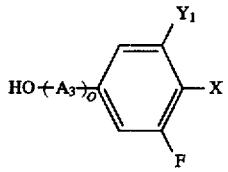
(1-a)

wherein $A_3$ represents trans-1,4-cyclohexylene group or 1,4-phenylene group, one or more hydrogen atoms on the ring of which group may be replaced by F, X represents $CF_2H$, $CFH_2$, $OCF_3$ or $OCF_2H$, $Y_1$ represents H or F, and o represents an integer of 0 or 1.

* * * * *